US012811817B2

(12) United States Patent
Daredia et al.

(10) Patent No.: US 12,811,817 B2
(45) Date of Patent: Nov. 24, 2026

(54) GENERATING IMPROVED DIGITAL TRANSCRIPTS UTILIZING DIGITAL TRANSCRIPTION MODELS THAT ANALYZE DYNAMIC MEETING CONTEXTS

(71) Applicant: Dropbox, Inc., San Francisco, CA (US)

(72) Inventors: Shehzad Daredia, San Francisco, CA (US); Behrooz Khorashadi, Mountain View, CA (US)

(73) Assignee: Dropbox, Inc., San Francisco, CA (US)

( * ) Notice: Subject to any disclaimer, the term of this patent is extended or adjusted under 35 U.S.C. 154(b) by 78 days.

(21) Appl. No.: 18/941,541

(22) Filed: Nov. 8, 2024

(65) Prior Publication Data

US 2025/0070994 A1 Feb. 27, 2025

Related U.S. Application Data

(63) Continuation of application No. 18/770,400, filed on Jul. 11, 2024, which is a continuation of application
(Continued)

(51) Int. Cl.
*H04L 12/18* (2006.01)
*G06F 16/34* (2025.01)
(Continued)

(52) U.S. Cl.
CPC ........ *H04L 12/1831* (2013.01); *G06F 16/345* (2019.01); *G06N 20/00* (2019.01);
(Continued)

(58) Field of Classification Search
CPC .......................... H04L 12/1831; G06F 16/345
See application file for complete search history.

(56) References Cited

U.S. PATENT DOCUMENTS 5,384,703 A 1/1995 Withgott et al.
5,664,227 A 9/1997 Mauldin et al.
(Continued)

FOREIGN PATENT DOCUMENTS

EP 0899952 A2 3/1999
EP 2677743 A1 12/2013

OTHER PUBLICATIONS

Final Office Action from U.S. Appl. No. 18/425,777 mailed on Apr. 20, 2026, 19 pages.
(Continued)

*Primary Examiner* — Bryan Y Lee
(74) *Attorney, Agent, or Firm* — Keller Preece PLLC

(57) ABSTRACT

The present disclosure relates to systems, non-transitory computer-readable media, and methods for improving digital transcripts of a meeting based on user information. For example, a digital transcription system creates a digital transcription model to automatically transcribe audio from a meeting based on documents associated with meeting participants, event details, user features, and other meeting context data. In one or more embodiments, the digital transcription model creates a digital lexicon based on the user information, which the digital transcription system uses to generate the digital transcript. In some embodiments, the digital transcription model trains and utilizes a digital transcription neural network to generate the digital transcript.

20 Claims, 24 Drawing Sheets

Related U.S. Application Data

No. 18/316,040, filed on May 11, 2023, now Pat. No. 12,040,908, which is a continuation of application No. 16/587,408, filed on Sep. 30, 2019, now Pat. No. 11,689,379.

(60) Provisional application No. 62/865,614, filed on Jun. 24, 2019.

(51) Int. Cl.
*G06N 20/00* (2019.01)
*G10L 15/08* (2006.01)

(52) U.S. Cl.
CPC ........ *G10L 15/083* (2013.01); *H04L 12/1818* (2013.01); *H04L 12/1822* (2013.01); *G10L 2015/088* (2013.01)

(56) References Cited

U.S. PATENT DOCUMENTS 5,884,258 A 3/1999 Rozak et al.
6,289,304 B1 9/2001 Grefenstette
6,298,326 B1 10/2001 Feller
6,415,258 B1 7/2002 Reynar et al.
6,473,778 B1 10/2002 Gibbon
6,789,228 B1 9/2004 Merril et al.
6,795,806 B1 9/2004 Lewis et al.
7,280,738 B2 10/2007 Kauffman et al.
7,458,013 B2 11/2008 Fruchter et al.
8,095,120 B1 1/2012 Blair et al.
8,447,608 B1 5/2013 Chang et al.
8,670,977 B2 3/2014 Saraclar et al.
8,712,776 B2 4/2014 Bellegarda et al.
8,745,501 B2 6/2014 Krantz et al.
8,792,863 B2 7/2014 De Oliveira et al.
8,862,467 B1 10/2014 Casado et al.
9,251,532 B2 2/2016 Ho et al.
9,275,635 B1 3/2016 Beaufays et al.
9,324,323 B1 4/2016 Bikel et al.
9,560,152 B1 1/2017 Jamdar et al.
9,641,563 B1 5/2017 Kitada et al.
9,672,827 B1 6/2017 Jheeta
9,754,320 B2 9/2017 Calman et al.
9,785,707 B2 10/2017 Bayer et al.
9,875,225 B1 1/2018 Grueneberg et al.
9,977,779 B2 5/2018 Winer
10,129,392 B1 11/2018 Hodge
10,229,148 B1 3/2019 Nguyen et al.
10,248,626 B1 4/2019 Zhang et al.
10,275,444 B2 4/2019 Bogdan et al.
10,382,370 B1 8/2019 Labarre et al.
2002/0103864 A1 8/2002 Rodman et al.
2002/0107853 A1 8/2002 Hofmann et al.
2002/0111968 A1 8/2002 Ching
2002/0116291 A1 8/2002 Grasso et al.
2003/0158724 A1 8/2003 Uchida
2004/0111467 A1 6/2004 Willis
2004/0250201 A1 12/2004 Caspi
2005/0039114 A1 2/2005 Naimat et al.
2005/0076328 A1 4/2005 Berenbach et al.
2005/0125246 A1 6/2005 Muller et al.
2005/0144179 A1 6/2005 Maruhashi et al.
2006/0074656 A1 4/2006 Mathias et al.
2006/0167994 A1 7/2006 Chen et al.
2007/0078930 A1 4/2007 Ludwig et al.
2007/0116225 A1 5/2007 Zhao et al.
2007/0153989 A1 7/2007 Howell et al.
2007/0240060 A1 10/2007 Berenbach et al.
2007/0260968 A1 11/2007 Howard et al.
2007/0299665 A1 12/2007 Koll et al.
2008/0059152 A1 3/2008 Fridman et al.
2008/0086305 A1 4/2008 Lewis et al.
2008/0120101 A1 5/2008 Johnson et al.
2008/0228479 A1 9/2008 Prado
2009/0048845 A1 2/2009 Burckart et al.
2009/0083256 A1 3/2009 Thompson et al.
2009/0099845 A1 4/2009 George
2009/0144051 A1 6/2009 Lee et al.
2009/0150827 A1 6/2009 Meyer et al.
2009/0177469 A1 7/2009 Findlay
2009/0177511 A1 7/2009 Shaw et al.
2009/0260060 A1 10/2009 Smith et al.
2009/0271438 A1 10/2009 Agapi et al.
2009/0307213 A1 12/2009 Deng et al.
2010/0095198 A1 4/2010 Bultrowicz et al.
2010/0158213 A1 6/2010 Mikan et al.
2010/0241512 A1 9/2010 Tirpak et al.
2010/0246784 A1 9/2010 Frazier et al.
2010/0284310 A1 11/2010 Shaffer et al.
2011/0013756 A1 1/2011 Davies et al.
2011/0043602 A1 2/2011 Lee
2011/0099006 A1 4/2011 Sundararaman et al.
2011/0167357 A1 7/2011 Benjamin et al.
2011/0268263 A1 11/2011 Jones et al.
2011/0271205 A1 11/2011 Jones et al.
2011/0296374 A1 12/2011 Wu et al.
2011/0320958 A1 12/2011 Kashi
2012/0030272 A1 2/2012 Bristow et al.
2012/0069134 A1 3/2012 Garcia, Jr. et al.
2012/0128146 A1 5/2012 Boss et al.
2012/0131060 A1 5/2012 Heidasch
2012/0166924 A1 6/2012 Larson et al.
2012/0254318 A1 10/2012 Poniatowskl
2012/0284640 A1 11/2012 Sloyer et al.
2012/0311090 A1 12/2012 Locker et al.
2012/0323572 A1 12/2012 Koll et al.
2012/0323575 A1 12/2012 Gibbon et al.
2013/0055076 A1 2/2013 Assadollahi
2013/0058471 A1 3/2013 Garcia
2013/0144603 A1 6/2013 Lord et al.
2013/0151233 A1 6/2013 Gande et al.
2014/0009677 A1 1/2014 Homyack et al.
2014/0063177 A1 3/2014 Tian et al.
2014/0108544 A1 4/2014 Lewis et al.
2014/0157150 A1 6/2014 Durvasula et al.
2014/0163977 A1 6/2014 Hoffmeister et al.
2014/0244252 A1 8/2014 Dines et al.
2014/0325335 A1 10/2014 Paulik et al.
2014/0337346 A1 11/2014 Barthel et al.
2014/0359559 A1 12/2014 Qi et al.
2015/0002611 A1 1/2015 Thapliyal et al.
2015/0003595 A1 1/2015 Yaghi et al.
2015/0006152 A1 1/2015 Dong et al.
2015/0012270 A1 1/2015 Reynolds
2015/0012844 A1 1/2015 Paulik et al.
2015/0016661 A1 1/2015 Lord
2015/0019200 A1 1/2015 Woodward et al.
2015/0063553 A1 3/2015 Gleim
2015/0113410 A1 4/2015 Bradley et al.
2015/0117626 A1 4/2015 Nord
2015/0120278 A1 4/2015 Waibel
2015/0120302 A1 4/2015 Mccandless et al.
2015/0142800 A1 5/2015 Thapliyal
2015/0149540 A1 5/2015 Barker et al.
2015/0154185 A1 6/2015 Waibel
2015/0154960 A1 6/2015 Ai et al.
2015/0201082 A1 7/2015 Zhao et al.
2015/0277725 A1 10/2015 Masterson et al.
2015/0286718 A1 10/2015 Wang et al.
2015/0310571 A1 10/2015 Brav et al.
2015/0339390 A1 11/2015 Urdiales et al.
2016/0019202 A1 1/2016 Adams et al.
2016/0026716 A1 1/2016 Yeager et al.
2016/0027442 A1 1/2016 Burton et al.
2016/0065742 A1 3/2016 Nasir et al.
2016/0078131 A1 3/2016 Venugopal et al.
2016/0117624 A1 4/2016 Flores et al.
2016/0165044 A1 6/2016 Chan
2016/0239272 A1 8/2016 Petri
2016/0275952 A1 9/2016 Kashtan et al.
2016/0352788 A1 12/2016 Sawhney et al.
2016/0357749 A1 12/2016 Fan et al.
2017/0011740 A1 1/2017 Gauci

(56) References Cited

U.S. PATENT DOCUMENTS

| | | | | |
|---|---|---|---|---|
| 2017/0034200 | A1 | 2/2017 | Costin et al. | |
| 2017/0046339 | A1 | 2/2017 | Bhat et al. | |
| 2017/0046659 | A1 | 2/2017 | Inomata et al. | |
| 2017/0060230 | A1 | 3/2017 | Faaborg et al. | |
| 2017/0132208 | A1 | 5/2017 | Adavelli et al. | |
| 2017/0161258 | A1* | 6/2017 | Astigarraga | G06Q 10/10 |
| 2017/0163813 | A1 | 6/2017 | Young et al. | |
| 2017/0169816 | A1 | 6/2017 | Blandin et al. | |
| 2017/0177928 | A1 | 6/2017 | Cunico et al. | |
| 2017/0186432 | A1 | 6/2017 | Aleksic et al. | |
| 2017/0293618 | A1 | 10/2017 | Gorrepati et al. | |
| 2017/0315985 | A1 | 11/2017 | Fitterer et al. | |
| 2018/0011908 | A1 | 1/2018 | Aggarwal et al. | |
| 2018/0018959 | A1 | 1/2018 | Des Jardins et al. | |
| 2018/0077099 | A1 | 3/2018 | Silva et al. | |
| 2018/0090154 | A1 | 3/2018 | Aaron et al. | |
| 2018/0101761 | A1 | 4/2018 | Nelson et al. | |
| 2018/0101824 | A1* | 4/2018 | Nelson | H04L 12/1831 |
| 2018/0130496 | A1 | 5/2018 | Mahapatra et al. | |
| 2018/0143956 | A1 | 5/2018 | Skarbovsky et al. | |
| 2018/0143970 | A1 | 5/2018 | Skarbovsky et al. | |
| 2018/0158365 | A1 | 6/2018 | Roche | |
| 2018/0160200 | A1 | 6/2018 | Goel et al. | |
| 2018/0191907 | A1 | 7/2018 | Herrin et al. | |
| 2018/0301046 | A1 | 10/2018 | Nedivi | |
| 2018/0315429 | A1 | 11/2018 | Taple et al. | |
| 2018/0315438 | A1 | 11/2018 | Davies et al. | |
| 2018/0336001 | A1 | 11/2018 | Abuelsaad et al. | |
| 2018/0342237 | A1 | 11/2018 | Lee et al. | |
| 2018/0342249 | A1 | 11/2018 | Ohashi | |
| 2018/0349086 | A1 | 12/2018 | Chakra et al. | |
| 2018/0365232 | A1 | 12/2018 | Lewis et al. | |
| 2018/0373724 | A1* | 12/2018 | Novak | G06F 16/338 |
| 2019/0005023 | A1 | 1/2019 | Olsen et al. | |
| 2019/0051301 | A1 | 2/2019 | Locascio et al. | |
| 2019/0068477 | A1 | 2/2019 | Faulkner | |
| 2019/0095803 | A1 | 3/2019 | Raskovic et al. | |
| 2019/0139543 | A1 | 5/2019 | Rahmel et al. | |
| 2019/0179501 | A1 | 6/2019 | Seeley et al. | |
| 2019/0200121 | A1 | 6/2019 | Sinkov et al. | |
| 2019/0220177 | A1 | 7/2019 | Guido et al. | |
| 2019/0259387 | A1 | 8/2019 | Mertens et al. | |
| 2019/0272559 | A1 | 9/2019 | Lee et al. | |
| 2019/0327103 | A1 | 10/2019 | Niekrasz | |
| 2019/0341050 | A1 | 11/2019 | Diamant et al. | |
| 2020/0065342 | A1 | 2/2020 | Panuganty | |
| 2020/0065387 | A1 | 2/2020 | Matthews et al. | |
| 2020/0092339 | A1 | 3/2020 | Rakshit et al. | |
| 2020/0186958 | A1 | 6/2020 | Husain et al. | |
| 2020/0211537 | A1 | 7/2020 | Scheiner et al. | |
| 2020/0211561 | A1 | 7/2020 | Degraye et al. | |
| 2020/0228358 | A1 | 7/2020 | Rampton | |
| 2020/0251089 | A1 | 8/2020 | Pinto | |
| 2020/0251116 | A1 | 8/2020 | Sachdev et al. | |
| 2020/0273453 | A1 | 8/2020 | Mody et al. | |
| 2020/0293616 | A1 | 9/2020 | Nelson et al. | |
| 2020/0296176 | A1 | 9/2020 | Bastide et al. | |
| 2020/0394935 | A1 | 12/2020 | Ray et al. | |

OTHER PUBLICATIONS

Notice of Allowance from U.S. Appl. No. 18/770,400 mailed Apr. 14, 2026, 5 pages.
Non-Final Office Action from U.S. Appl. No. 18/770,400, mailed Jan. 7, 2026, 15 pages.
Advisory Action from U.S. Appl. No. 16/587,647, mailed Mar. 12, 2021, 2 pages.
Advisory Action from U.S. Appl. No. 15/900,414, mailed Apr. 28, 2020, 3 pages.
Bestpractices, "Cloud Speech-to-Text," retrieved from https://cloud.google.com/speech-to-Text/docs/best-practices, on Oct. 17, 2019, 3 Pages.
Blood S., et al., "Contextualizing Virtual Assistants for More Effective Meetings in the Digital Workplace," Mar. 22, 2017, Gartner Research Note, retrieved from https://www.dropbox.com/s/k8m69qbsbry8niu/GARTContextualizing%20Virtual%20Assistants%20for%20More%20Effective%20Meetings%20in%20th%20Digital%20Workplace_March%202017.pdf?dl=O, 12 Pages.
Dropbox Paper "Scriba: Y Combinator Funding Application," retrieved from https://paper.dropbox.com/doc/Scriba-Y-Combinator-Funding-Application--AlwgyvHSgUI_HAgZOfFQ1SR8Ny2fjiQXp63o, on Sep. 30, 2019, 5 Pages.
Final Office Action from U.S. Appl. No. 15/900,399, mailed Dec. 5, 2019, 17 pages.
Final Office Action from U.S. Appl. No. 15/900,414, mailed Feb. 6, 2020, 21 pages.
Final Office Action from U.S. Appl. No. 15/900,414, mailed Feb. 24, 2022, 19 pages.
Final Office Action from U.S. Appl. No. 15/900,414, mailed Mar. 31, 2021, 20 pages.
Final Office Action from U.S. Appl. No. 16/587,408, mailed Dec. 17, 2021, 24 pages.
Final Office Action from U.S. Appl. No. 16/587,424, mailed Apr. 9, 2021, 22 pages.
Final Office Action from U.S. Appl. No. 16/587,424, mailed Jan. 14, 2022, 28 pages.
Final Office Action from U.S. Appl. No. 16/587,424 mailed Nov. 21, 2024, 55 pages.
Final Office Action from U.S. Appl. No. 16/587,647, mailed Dec. 2, 2020, 25 pages.
Final Office Action from U.S. Appl. No. 16/587,647, mailed Feb. 24, 2022, 44 pages.
Final Office Action from U.S. Appl. No. 16/587,647, mailed Oct. 6, 2022, 34 pages.
Final Office Action from U.S. Appl. No. 17/961,814, mailed Nov. 1, 2023, 17 pages.
Final Office Action from U.S. Appl. No. 18/316,040, mailed Mar. 27, 2024, 5 pages.
Geitgey A., "Machine Learning is Fun Part 6: How to do Speech Recognition with Deep Learning," Dec. 23, 2016, retrieved from https://medium.com/@ageitgey/machine-learning-isfun-part6-how-to-do-speech-recognition-with-deep-learning-28293c162f7a, on Oct. 17, 2019, 15 Pages.
Habibi M., et al., "Keyword Extraction and Clustering for Document Recommendation in Conversations", Apr. 2015, vol. 23 (9), pp. 746-759.
Hoffman R., "Using Artficial Intelligence to Set Information Free," Jun. 14, 2016, retrieved from https://sloanreview.mit.edu/article/using-artificial-intelligence-to-humanize-management-and-set-information-free/, on Sep. 30, 2019, 4 Pages.
Jon Fingas, "Google AI can pick out voices in a crowd," Apr. 12, 2018, retrieved from https://www.engadget.com/2018/04/12/google-ai-looking-to-listen-voice-separation/?guccounter=1, on Oct. 17, 2019, 3 Pages.
Kurt Varner, "Paper Strategy Update," Aug. 29, 2017, Quarterly Strategy Review, 56 Pages.
Mckinley D, "Design for Continuous Experimentation," https://mcfunley.com//continuous-experimentation/, on Sep. 30, 2019, 21 Pages.
Maskey S., et al., "Summarizing Speech without Text Using Hidden Markov Models," Proceedings of the Human Language Technology Conference of the North American Chapter of the ACL, Association Computational Linguistic, Jun. 2006, pp. 89-92.
Non-Final Office Action from U.S. Appl. No. 16/587,424, mailed Jun. 17, 2022, 32 pages.
Non-Final Office Action from U.S. Appl. No. 15/900,399, mailed Aug. 30, 2019, 16 Pages.
Non-Final Office Action from U.S. Appl. No. 15/900,414, mailed Dec. 21, 2020, 18 pages.
Non-Final Office Action from U.S. Appl. No. 15/900,414, mailed Nov. 5, 2021, 18 pages.
Non-Final Office Action from U.S. Appl. No. 15/900,414, mailed Sep. 4, 2019, 17 pages.
Non-Final Office Action from U.S. Appl. No. 16/587,408, mailed May 18, 2022, 28 pages.
Non-Final Office Action from U.S. Appl. No. 16/587,408, mailed May 21, 2021, 20 pages.

(56) References Cited

OTHER PUBLICATIONS

Non-Final Office Action from U.S. Appl. No. 16/587,424, mailed Dec. 2, 2020, 17 pages.
Non-Final Office Action from U.S. Appl. No. 16/587,424, mailed Jan. 17, 2023, 59 pages.
Non-Final Office Action from U.S. Appl. No. 16/587,424 mailed Jun. 11, 2024, 53 pages.
Non-Final Office Action from U.S. Appl. No. 16/587,424, mailed Sep. 3, 2021, 19 pages.
Non-Final Office Action from U.S. Appl. No. 16/587,647, mailed Jul. 10, 2020, 20 pages.
Non-Final Office Action from U.S. Appl. No. 16/587,647, mailed Jun. 9, 2022, 42 pages.
Non-Final Office Action from U.S. Appl. No. 16/587,647, mailed Sep. 2, 2021, 35 pages.
Non-Final Office Action from U.S. Appl. No. 16/657,185, mailed Aug. 19, 2020, 7 pages.
Non-Final Office Action from U.S. Appl. No. 17/114,739, mailed Sep. 28, 2021, 12 pages.
Non-Final Office Action from U.S. Appl. No. 17/961,814 , mailed May 11, 2023, 22 pages.
Non-Final Office Action from U.S. Appl. No. 18/316,040, mailed Dec. 13, 2023, 17 pages.
Non-Final Office Action from U.S. Appl. No. 18/425,777, mailed Oct. 1, 2024, 13 pages.
Notice of Allowance from U.S. Appl. No. 15/900,399, mailed Apr. 7, 2020, 2 pages.
Notice of Allowance from U.S. Appl. No. 16/657,185, mailed Jan. 25, 2021, 5 pages.
Notice of Allowance from U.S. Appl. No. 16/657,185, mailed Oct. 21, 2020, 6 pages.
Notice of Allowance from U.S. Appl. No. 17/114,739, mailed Feb. 3, 2022, 2 pages.
Notice of Allowance from U.S. Appl. No. 17/114,739, mailed Jan. 20, 2022, 6 pages.
Notice of Allowance from U.S. Appl. No. 15/900,399, mailed Feb. 28, 2020, 19 pages.
Notice of Allowance from U.S. Appl. No. 15/900,414, mailed Sep. 15, 2022, 9 pages.
Notice of Allowance from U.S. Appl. No. 16/587,408 mailed Feb. 14, 2023, 20 pages.
Notice of Allowance from U.S. Appl. No. 18/316,040, mailed May 1, 2024, 7 pages.
Office Action for U.S. Appl. No. 15/900,409 mailed on Apr. 18, 2019, 9 pages.
Sharma G., "Voice Is the New Platform and the Future of Search, Commerce, and Payments," Jul. 16, 2016, retrieved from https://medium.com/@gaurav.sharma/voice-is-thenew-o-s-and-the-future-of-search-commerce-and-payments-64fc8cc848f6, on Sep. 30, 2019, 15 Pages.
Shin H.V., et al., "Dynamic Authoring of Audio with Linked Scripts," ACM, Oct. 2016, pp. 509-516.
Vega-Oliveros D.A., et al., ""This Conversation Will Be Recorded": Automatically Generating Interactive Documents from Captured Media," ACM, Sep. 2010, pp. 37-40.
"What Meetings Are Really Costing You," Oct. 17, 2019, retrieved from https://www.readytalk.com/sites/default/files/infographic-what-meetings-are-really-costingyou.pdf, on Oct. 17, 2019, 1 Page.
Yu Z., et al., "Smart Meeting Systems: A Survey of State-of-the-Art and Open Issues", Feb. 2010, ACM Computing Surveys (CSUR), vol. 42 (2), pp. 1-20.
Final Office Action from U.S. Appl. No. 18/425,777 mailed on May 6, 2025, 18 pages.
Non-Final Office Action from U.S. Appl. No. 18/425,777, mailed on Sep. 25, 2025, 18 pages.

* cited by examiner

GENERATING IMPROVED DIGITAL TRANSCRIPTS UTILIZING DIGITAL TRANSCRIPTION MODELS THAT ANALYZE DYNAMIC MEETING CONTEXTS

CROSS-REFERENCE TO RELATED APPLICATIONS

This application is a continuation of U.S. patent application Ser. No. 18/770,400 filed Jul. 11, 2024, which is a continuation of U.S. patent application Ser. No. 18/316,040, filed May 11, 2023, which is a continuation of U.S. patent application Ser. No. 16/587,408, filed on Sep. 30, 2019, issued as U.S. Pat. No. 11,689,379, which claims the priority to and the benefit of U.S. Provisional Patent Application No. 62/865,614, filed Jun. 24, 2019. Each of the aforementioned applications is hereby incorporated by reference in its entirety.

BACKGROUND

Technological advances allow many different ways of holding meetings in person and remotely via audio/video streams. As a result, companies and individuals are increasingly using available technologies to conduct meetings on a daily basis. Unfortunately, many meetings are ineffective and unproductive, wasting what could otherwise be productive time for the participants. Additionally, even for effective meetings, many participants are unable to both focus on and understand the content of the meeting, while simultaneously taking notes regarding information covered in the meeting and any resulting action items required of the participants once the meeting is complete. Accordingly, traditional human methods for conducting meetings result in a number of inefficiencies.

To allow post-meeting access to meeting materials, many conventional systems for sharing/storing information for meetings use recorded audio and/or video of meetings. People wishing to review details of the meetings can then access the recordings and listen to/view all of the recordings or only portions of the recordings. While recording the audio and video allow for later review, the review can be a time-consuming process that requires participants to listen to or view the entire meeting a second time in order to find the portions of the recordings relevant to the participants. Specifically, finding specific information in an audio or video recording involves knowing where the information is located within a chronological timeline beforehand or manually searching the recording to find the information.

To address this, some conventional systems provide transcriptions of audio or video recordings of meetings. The audio/video transcriptions can include text documents that allow people to more easily identify relevant information from the recordings by skimming and/or searching the transcriptions. While transcriptions of audio or video recordings can improve the ability of people to find relevant information, finding the information many times requires knowing where the information is located in the text or knowing proper search terms when searching the text. Additionally, transcription software using language processing can often be inaccurate, leading to portions of transcribed text with incorrect words or even entire sentences, particularly when there is a lot of crosstalk during a meeting. Thus, conventional systems that rely primarily on transcriptions still typically require that participants review the full audio/video recordings to verify the accuracy of the transcription and/or locate the relevant portions of the transcription. Accordingly, a number of disadvantages are present with regard to conventional systems for conducting and reviewing information from meetings.

Also, recent years have seen significant technological improvements in hardware and software platforms for facilitating meetings across computer networks. For example, conventional digital event management systems can coordinate digital calendars, distribute digital documents, and monitor modifications to digital documents across computer networks before, during, and after meetings across various computing devices. Moreover, conventional speech recognition systems can generate digital transcripts from digital audio/video streams collected between various participants using various computing devices.

Despite these recent advancements in managing meetings across computer networks, conventional systems have a number of problems in relation to accuracy, efficiency, and flexibility of operation. As one example, conventional systems regularly generate inaccurate digital transcriptions. For instance, these conventional systems often fail to accurately recognize spoken words in a digital audio file of a meeting and generate digital transcripts with a large number of inaccurate (or missing) words. These inaccuracies in digital transcripts are only exacerbated in circumstances where participants utilize uncommon vocabulary terms, such as specialized industry language or acronyms.

Conventional systems also have significant shortfalls in relation to efficiency of implementing computer systems and interfaces. For example, conventional systems often generate digital transcripts with non-sensical terms throughout the transcription. Accordingly, many conventional systems provide a user interface that requires manual review of each word in the digital transcription to identify and correct improper terms and phrases. To illustrate, in many conventional systems a user must re-listen to audio and enter corrections via one or more user interfaces that include the digital transcription. Often, a user must correct the same incorrect word in a digital transcript each time the word is used. This approach requires significant time and user interaction with different user interfaces. Moreover, conventional systems waste significant computing resources in producing, reviewing, and resolving inaccuracies in digital transcripts.

In addition, conventional systems are inflexible. For instance, conventional systems that provide automatic transcription services have a predefined vocabulary. As a result, conventional systems rigidly analyze audio files from different meetings based on the same underlying language analysis. Accordingly, when participants use different words across different meetings, conventional systems misidentify words in the digital transcript based on the same rigid analysis.

These along with additional problems and issues exist with regard to conventional digital event management systems and speech recognition systems.

SUMMARY

One or more embodiments disclosed herein provide benefits and/or solve one or more of the foregoing and other problems in the art with systems, methods, and non-transitory computer readable storage media that provide customized meeting insights based on meeting media (e.g., meeting documents, audio data, and video data) and user interactions with client devices. For instance, the disclosed system uses audio data, video data, documents, and user inputs gathered by one or more client devices in connection with a meeting involving a plurality of users. The disclosed system analyzes the data, user inputs, and other information to determine portions of the gathered media data that are relevant to a specific user or to all meeting participants (e.g., based on timestamps of the user inputs and corresponding times in the media data). By analyzing the identified relevant portions, the disclosed system is able to generate meeting insights specific to the meeting and/or specific to attendees of the meeting. The meeting insights can include, for example, a summary of the meeting, a list of highlights from the information covered during the meeting, metrics regarding meeting management and participation, action items for individual participants of the meeting, and/or action items for automatic completion by the system itself. The system can further communicate the meeting insights to an organizer and/or participants in the form of electronic messages, notifications, documents, calendar items, reminders, and/or additions to to-do lists. The disclosed systems are thus able to improve the efficiency and productivity of meetings over conventional systems and traditional human methods.

Additionally, in one or more embodiments, the disclosed system uses data and documentation gathered from past meetings to provide automatic meeting insight generation for future meetings. For instance, the disclosed systems can utilize user-curated meeting insight data and corresponding meeting media to train a machine-learning model to output meeting insights for future meetings. Thus, during ongoing meetings or after completed meetings, the disclosed systems can use the trained machine-learning model to provide meeting insights to meeting participants in real time or without utilizing input to client devices in connection with the meetings.

Also, embodiments of the present disclosure provide benefits and/or solve one or more of the foregoing or other problems in the art with systems, non-transitory computer-readable media, and methods for improving efficiency and flexibility by using a digital transcription model that detects and analyzes dynamic meeting context data to generate accurate digital transcripts. For instance, the disclosed systems can analyze audio data together with digital context data for meetings (such as digital documents corresponding to meeting participants; digital collaboration graphs reflecting dynamic connections between participants, interests, and organizational structures; and digital event data reflecting context for the meeting). By utilizing a digital transcription model based on this dynamic meeting context data, the disclosed systems can generate digital transcripts having superior accuracy while also improving flexibility and efficiency relative to conventional systems.

For example, in various embodiments the disclosed systems generate and utilize a digital lexicon to aid in the generation of improved digital transcripts. For example, the disclosed systems utilize a digital transcription model that generates a digital lexicon (e.g., a specialized vocabulary list) based on meeting context data (e.g., based on collections of digital documents utilized by one or more participants). The disclosed systems can utilize this specialized digital lexicon to more accurately identify words in digital audio and generate more accurate digital transcripts.

In some embodiments, the disclosed systems train and employ a digital transcription neural network to generate digital transcripts. For instance, the disclosed systems can train a digital transcription neural network based on audio training data and meeting context training data. Once trained, the disclosed systems can utilize the trained digital transcription neural network to generate improved digital transcripts based on audio data input together with meeting context data.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
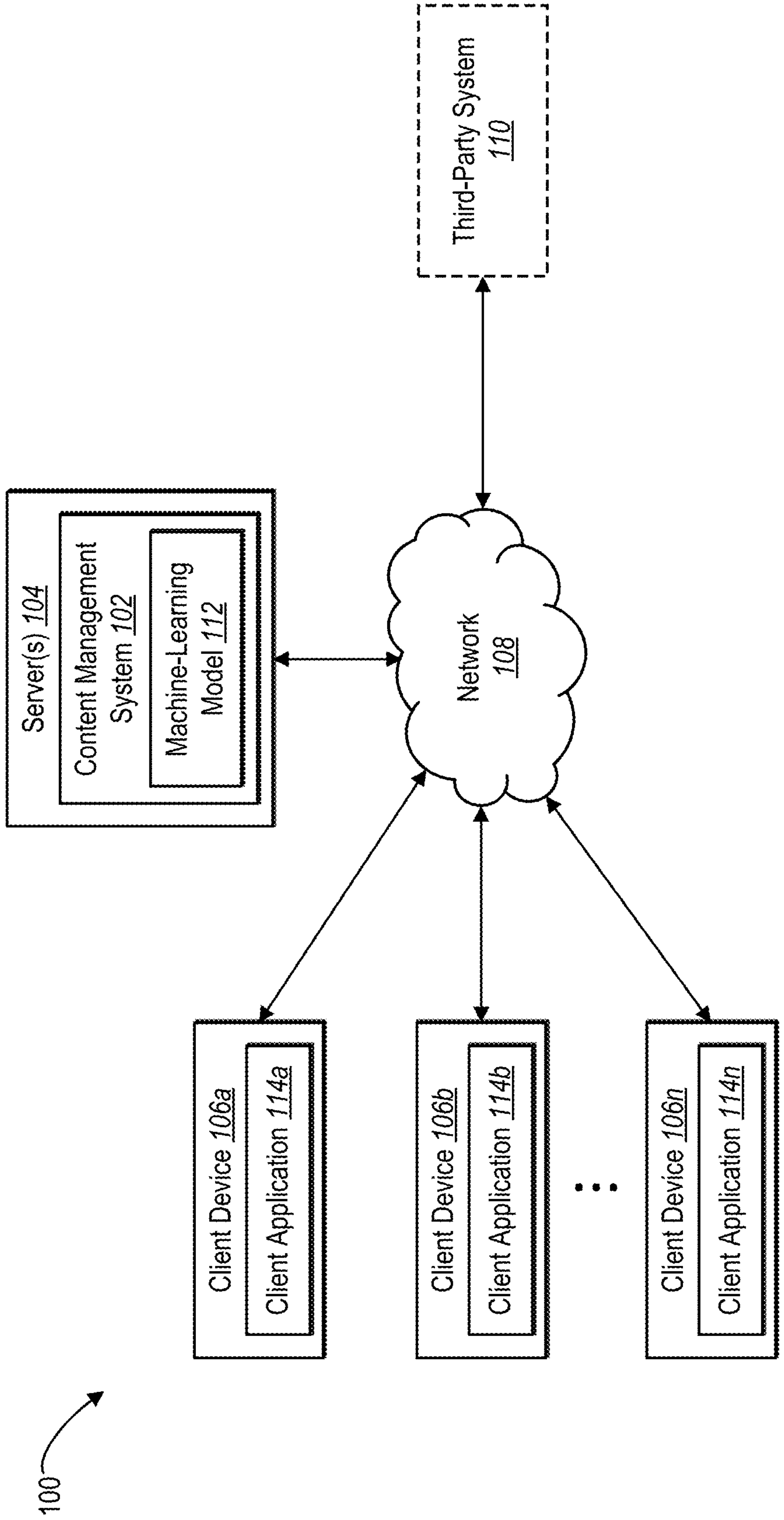
FIG. 1 illustrates a schematic diagram of an environment in which a content management system operates in accordance with one or more implementations.

One or more embodiments of the present disclosure include a digital content management system that generates meeting insights (e.g., summaries, highlights, or action items) for providing to one or more users based on media data, documentation, and user inputs to client devices associated with a meeting. For example, in some embodiments, the digital content management system (or simply "content management system") receives media data (e.g., audio data or video data) and information associated with user input(s) to client device(s) of users participating in a meeting (e.g., where the user inputs are provided by the users to indicate important or relevant portions of the meeting). The content management system then analyzes the media data (e.g., using natural language processing) in combination with the user inputs to determine portions of the media data (or other content items or materials) that correspond to the user inputs. If the content management system determines a portion of the meeting corresponds to at least one user input, the content management system generates a corresponding meeting insight, such as an electronic message to provide to a user including content related to the relevant portion of the meeting. The content management system can thus accurately and efficiently identify content or information from the meeting data (e.g., audio data, video data, documentation, and presentation materials) that is relevant to a user for quick and easy review.

Furthermore, the content management system can use past meeting data for automatically generating meeting insights for future meetings. Specifically, the content management system can use curated meeting insights (e.g., meeting insights that one or more users have generated or verified for accuracy and completion) to train a machine-learning model. The content management system can then use the machine-learning model to automatically output meeting insights (e.g., highlights, summaries, or action items) for future meetings either while the meetings are ongoing or after the meetings are finished. Thus, the content management system can generate and provide meeting insights to users even in the absence of user inputs to client devices.

As mentioned, the content management system analyzes media data, such as audio data associated with a meeting. In particular, one or more computing devices can record audio for a meeting and then communicate the audio data to the content management system. The content management system can analyze the audio data using, for example, natural language processing to determine what was said or done during the meeting. The content management system can also use the audio data to determine points in time corresponding to specific information from the meeting. In addition to audio data, the system can also analyze any other media associated with a meeting. For example, the system can analyze video of a meeting, documentation associated with a meeting, and/or electronic communications related to the meeting, to intelligently identify meeting insights to provide to meeting attendees.

In addition, the content management system analyzes user inputs to client devices in connection with the meeting to determine relevant portions of the meeting (e.g., relevant portions of an audio recording of the meeting). For instance, the content management system can communicate with one or more client devices to determine whether a user interacts with a client device during a meeting to mark a portion of the meeting that is relevant to the user by, for example, tapping on the client device (e.g., a tap or movement detected by an accelerometer of the client device). In additional embodiments, the content management system also uses data detected by one or more sensors or input devices to the client device, including a mouse, a keyboard, a camera (or other image capture device), a microphone, or a biometric sensor. The content management system can then determine a portion of the meeting that corresponds to a time when a detected user input occurred to identify the portion as relevant to the user.

As indicated above, in some embodiments, the user provides input to mark portions of a meeting that are relevant to the user for processing by the content management system. In yet further embodiments, different user inputs (e.g., a single tap vs. a double tap) can trigger different actions by the content management system. To illustrate, a first user input can signal to the system to highlight a portion of the meeting for the user, a second user input can signal to the system to create an action item for the user, a third user input can signal to the system to extract a portion of audio data for later review by the user, and so on. Accordingly, using minimal user inputs, the content management system automatically provides customized functionality to a user without requiring significant time or focus from the user.

In some embodiments, after identifying portions of a meeting (and corresponding portions of audio or other data associated with the meeting), the content management system generates meeting insights for a user or multiple users. The generated meeting insights can include content based on the analyzed data associated with the meeting. For example, a meeting insight can include a meeting summary, highlights from the meeting, action items, etc., as will be explained in more detail below. The content management system can deliver meeting insights to users by way of electronic messages, electronic documents (e.g., online collaborative documents), storage folders, notifications, calendar items, additions to a to-do list, or other content items, etc. To illustrate, in some embodiments, the system generates an electronic message based on a portion of audio (e.g., based on speech identified in the portion of audio) corresponding to a relevant portion of a meeting and generates an electronic message for the user including content related to isolated speech from the portion of audio. The content management system can also identify documents (e.g., slides, images, notes) or video corresponding to a relevant portion of the meeting and generate a message for the user including content from the identified documents. Additionally, the content management system can generate a document, notification, or other electronic message that includes a description of the relevant portion, a transcription of the relevant portion, an audio clip of the relevant portion, or other content related to the relevant portion. The content management system can then provide the generated content to the user, store the generated content in association with an account of the user, or otherwise provide the user access to the generated content.

Furthermore, the content management system can provide real-time meeting assistance and feedback based on meeting materials, audio data, and/or inputs to user devices. For instance, the content management system can provide information, statistics, prompts, and updates to a meeting presenter in real-time during a meeting and also after a meeting is complete by analyzing content items (e.g., documents, audiovisual media, or other digital files) and user input related to or gathered from the meeting. To illustrate, the content management system can analyze a meeting agenda and corresponding audio data for a meeting to determine, for example, that the meeting presenter has forgotten or skipped an agenda item. Based on this determination, the system can provide a notification to the presenter to remind the presenter to cover the skipped agenda item. In addition to real-time feedback and assistance, the content management system can also provide feedback to the meeting presenter in the form of various metrics or insights related to the presenter's performance and/or the effectiveness of the meeting once the meeting is complete. As another example, the content management system can analyze audio data, video data, biometric data, and/or user input data to determine a sentiment score for each meeting attendee. Based on the sentiment scores, the system can determine an effectiveness of a meeting moderator/presenter or a particular topic/media being presented, and then provide real-time feedback to help improve the effectiveness of the meeting or the engagement of meeting attendees (e.g., by suggesting a change in topic or presentation style).

In one or more embodiments, as mentioned, the content management system also uses data from past meetings to train a machine-learning model to automatically tag or suggest insights for meetings. In particular, the content management system can use a training dataset including manually-labeled insight data corresponding to past meetings to train the machine-learning model. The content management system can then input audio data for a meeting into the trained machine-learning model, which outputs insights or suggestions by analyzing the audio data and other information associated with the later meeting. Furthermore, the machine-learning model, or another machine-learning model, can output analytics for a meeting (e.g., sentiment scores, attendance). The content management system can also use machine-learning to determine whether to schedule/cancel future meetings based on feedback associated with past meetings indicating an effectiveness of the past meetings.

As briefly mentioned, the content management system described herein provides advantages over conventional systems. Specifically, the content management system improves the accuracy of analyzing data related to meetings and generating corresponding content (e.g., meeting insights) for use by meeting participants. For example, the content management system accurately analyzes the data to provide meetings insights without the need for user-generated insights and with added utility relative to conventional audio transcriptions. Additionally, the content management system improves the efficiency of computing devices that store and disseminate information related to meetings. For instance, the content management system improves efficiency by leveraging both user input data and media data to automatically generate succinct summaries or other content items that are quickly reviewable and require less storage space. The content management system can also improve flexibility by allowing for personalization of insight data per recipient user. In contrast, as described above, conventional systems merely provide audio/video data or dense transcriptions that require excessive computer resources and also require users to manually scan/search through the materials to find relevant portions.

United States Provisional Application titled GENERATING IMPROVED DIGITAL TRANSCRIPTS UTILIZING DIGITAL TRANSCRIPTION MODELS THAT ANALYZE DYNAMIC MEETING CONTEXTS, filed Jun. 24, 2019, and Unites States Provisional Application titled UTILIZING VOLUME-BASED SPEAKER ATTRIBUTION TO ASSOCIATE MEETING ATTENDEES WITH DIGITAL MEETING CONTENT, filed Jun. 24, 2019, are each hereby incorporated by reference in their entireties.

Additional detail will now be provided regarding the content management system in relation to illustrative figures portraying exemplary implementations. To illustrate, FIG. 1 includes an embodiment of an environment 100, in which a content management system 102 can operate. In particular, the environment 100 includes server(s) 104 and client devices 106*a*-106*n* in communication via a network 108. Optionally, in one or more embodiments, the environment 100 also includes a third-party system 110. As illustrated, the content management system 102 includes a machine-learning model 112. Moreover, the client devices 106*a*-106*n* include client applications 114*a*-114*n*.

In one or more embodiments, the content management system 102 uses data related to a meeting obtained from the client devices 106*a*-106*n* to provide meeting insights to one or more users associated with a meeting. Specifically, the content management system 102 receives media data associated with a meeting, such as audio data including at least one audio recording of the meeting, from one or more of the client devices 106*a*-106*n*. For instance, a client device (e.g., client device 106*a*) can connect to the server(s) 104 to transmit a digital audio recording of meeting audio to the content management system 102. The client device can provide the digital audio recording to the content management system 102 in real-time (e.g., while the meeting is ongoing) or after the meeting is complete.

In one or more embodiments, the client device 106*a* utilizes a client application (e.g., client application 114*a*) to connect to the content management system 102 and communicate data to the content management system 102. For example, the client applications 114*a*-114*n* can include an online meeting application, video conference application, audio recording application, content management application, and/or other application that allows the client devices 106*a*-106*n* to manage content items associated with a meeting and record audio/video and transmit the recorded media to the content management system 102. According to at least one embodiment, a single client device (e.g., client device 106*a*) captures audio data to send to the content management system 102, while other client devices (e.g., client devices 106*b*-106*n*) capture data related to user inputs detected during the meeting. Alternatively, more than one client device can provide audio data to the content management system 102 and/or allow users to provide input during the meeting.

As used herein, the term "client device" refers to any device that collects or presents data associated with a meeting. In particular, a client device can include a personal device (e.g., phone/laptop computer/desktop computer), an image capture device (e.g., a digital camera or webcam), a microphone device, or a television/monitor. Furthermore, as used herein, the term "user input" refers to data collected from a user by a client device. Specifically, a user input can include direct interactions with a client device (e.g., touch inputs, keyboard inputs, mouse inputs), detected gestures (e.g., hand movements, eye movements, or other body movements), or audio inputs to a client device.

As used herein, the term "content item" refers to digital content that includes text or audiovisual data. Specifically, a content item can include a text document, one or more images, video, audio, or some combination of text, images, video, or audio. Accordingly, a content item can include information presented during a meeting or otherwise in connection with a meeting (e.g., information about a topic of the meeting). Additionally, the content management system 102 can store content items for individual users or groups of users locally (e.g., on individual user devices) or online (e.g., in a distributed environment).

In one or more embodiments, the client device 106*a* (or another client device) utilizes a client application to communicate additional media data or other content items to the content management system 102 in connection with a meeting. For instance, the client applications 114*a*-114*n* can send images, slides, text documents, video data, or other materials associated with a meeting to the content management system 102. To illustrate, a client device can send materials to the content management system 102 during a meeting or after the meeting. Materials can include documents or other media data presented during the meeting or generated during the meeting.

Additionally, each of the client devices 106*a*-106*n* can include a computing device associated with one or more users. For example, a client device can include a mobile device (e.g., smartphone, laptop, tablet), desktop computer, smart TV, digital conference phone, or other computing device capable of recording audio, communicating with the content management system 102, and/or displaying electronic messages from the content management system 102. Furthermore, depending on the type and use of the client devices 106*a*-106*n,* a client device may correspond to a single user or to a plurality of users. Additional detail for the client devices 106*a*-106*n* and for other computing devices is described in more detail below with respect to FIGS. 7-8.

As used herein, the term "electronic message" refers to a computer-based message that includes information or content related to relevant portions of meeting data. Specifically, an electronic message includes an application or operating system notification, a text document, an audio or video clip, or other content item. For example, an electronic message can include a text document with a bullet list of meeting highlights from a meeting or a summary of content presented/discussed during a meeting. Additionally, an electronic message can include an audio or video clip from audio or video data captured during a meeting or in presentation materials for a meeting.

As mentioned above, the content management system 102 determines relevant portions of meeting data (e.g., audio data) for one or more users. As used herein, the term "relevant portion" refers to a portion of digital audio data, documents, or other content items that include information that is useful or important to a user. For example, a relevant portion of audio data can include a portion of audio discussing a user's responsibilities, information that the user wants to review later, information regarding upcoming events relevant to a user, or any other information a user deems important. Additionally, a relevant portion of meeting data can include a portion of a digital representation of a document or media presented or generated during a meeting (e.g., slides, images, agendas, notes, video data) that is relevant to a user.

As further mentioned above, the content management system 102 generates meeting insights based on analyzed data associated with a meeting. As used herein, the term "meeting insights" refers to content generated by the content management system 102 based on an analysis of data related to a meeting. Meeting insights can include, for example, a meeting summary, highlights from the meeting (e.g., portions of the meeting marked by users as important), action items resulting from or discussed in the meeting, subsequent meetings scheduled during the meeting, a list of attendees of the meeting, metrics or analytics related to the meeting, or other information from the meeting that is of interest to one or more users. As used herein, the term "summary" refers to a text summary of recognized speech in audio data or a text summary of materials associated with a meeting. A summary can provide an overall description or listing of items and topics discussed during the meeting. Also as used herein, the term "action item" refers to a task or operation that is assigned to a user in connection with a meeting. For example, an action item can include a task discussed during a meeting for completion by a user after the meeting is complete. In some embodiments, an action item can be associated with one or more specific users. An action item can also be associated with a date or time, by which completion of the action item is required.

The content management system 102 can use natural language processing or other audio analysis to analyze audio data. In one or more embodiments, the content management system 102 utilizes computing devices of the server(s) 104 for performing audio analysis. In one or more alternative embodiments, the content management system 102 utilizes audio processing from a third-party system (e.g., third-party system 110) to analyze audio data. In yet additional examples, the content management system 102 can use audio processing on the server(s) 104 and on a third-party system (e.g., based on the size of audio data, language of audio in the audio data, or during separate stages of audio processing) to analyze audio data.

To determine relevant portions of meeting data, the content management system 102 analyzes audio data, meeting materials, and inputs to client devices. In one or more embodiments, in connection with audio data (and in some cases other meeting documentation or media) received from one or more of the client devices 106*a*-106*n,* the content management system 102 also receives input data for one or more of the client devices 106*a*-106*n*. Specifically, a client device can provide information about input to the client device during a meeting to the content management system 102. For instance, the client device can notify the content management system 102 in response to a keyboard input, mouse input, touch screen input, microphone input, video input, or sensor input (e.g., accelerometer/gyroscope, heart rate monitor or other biometric sensor) during the meeting. The content management system 102 can use the input information to identify specific portions of the audio data and then determine that those portions include relevant information for one or more users.

In one or more embodiments, the content management system 102 determines relevant portions of a meeting for a plurality of users. For example, the content management system 102 can determine portions that are relevant for attendees/invitees of a meeting. To illustrate, the content management system 102 can determine relevant portions for generating a summary of a meeting to all attendees/invitees of the meeting. Alternatively, the content management system 102 can determine different relevant portions for separate users or groups of users. To illustrate, the content management system 102 can determine a first relevant portion for generating a first summary to a first user and a second relevant portion for generating a second summary to a second user.

After generating summaries or other electronic messages based on relevant portion(s) of a meeting, the content management system 102 provides the generated content to the users. For instance, the content management system 102 can provide a notification, document, or other electronic message or content item to a client device (e.g., client device 106*a*) during and/or after the meeting. The client device can then use the client application to display the electronic message to a user.

As mentioned, the content management system 102 can include a machine-learning model 112. The content management system 102 can train the machine-learning model 112 to automatically identify meeting highlights, action items, and other meeting insight information using data from past meetings. The machine-learning model 112 can then output suggestions or meeting insights for future meetings, even in the absence of (or lack of sufficient) device input data. Additionally, the content management system 102 can train the machine-learning model 112 or another machine-learning model to output predictions of meeting moderation data or meeting analytics (e.g., sentiment predictions, attendance) for future meetings based on analytics for past meetings. The content management system 102 can thus use machine-learning for a variety of different automated and predictive operations.

Although the environment 100 of FIG. 1 is depicted as having various components, the environment 100 may have any number of additional or alternative components (e.g., server(s) 104, client devices 106*a*-106*n*, and third-party system 110). For example, the content management system 102 can receive audio data, device inputs, content items, or other meeting data from any number of client devices. Furthermore, the content management system 102 can communicate with (or include) any number of machine-learning models to analyze audio data/meeting materials and generate predictions, suggestions, or automated operations in connection with providing meeting insights. Additionally, more than one component or entity in the environment 100 can implement the operations of the content management system 102 described herein. For instance, the content management system 102 can alternatively be implemented entirely (or in part) on a single computing device.

Figure 2:
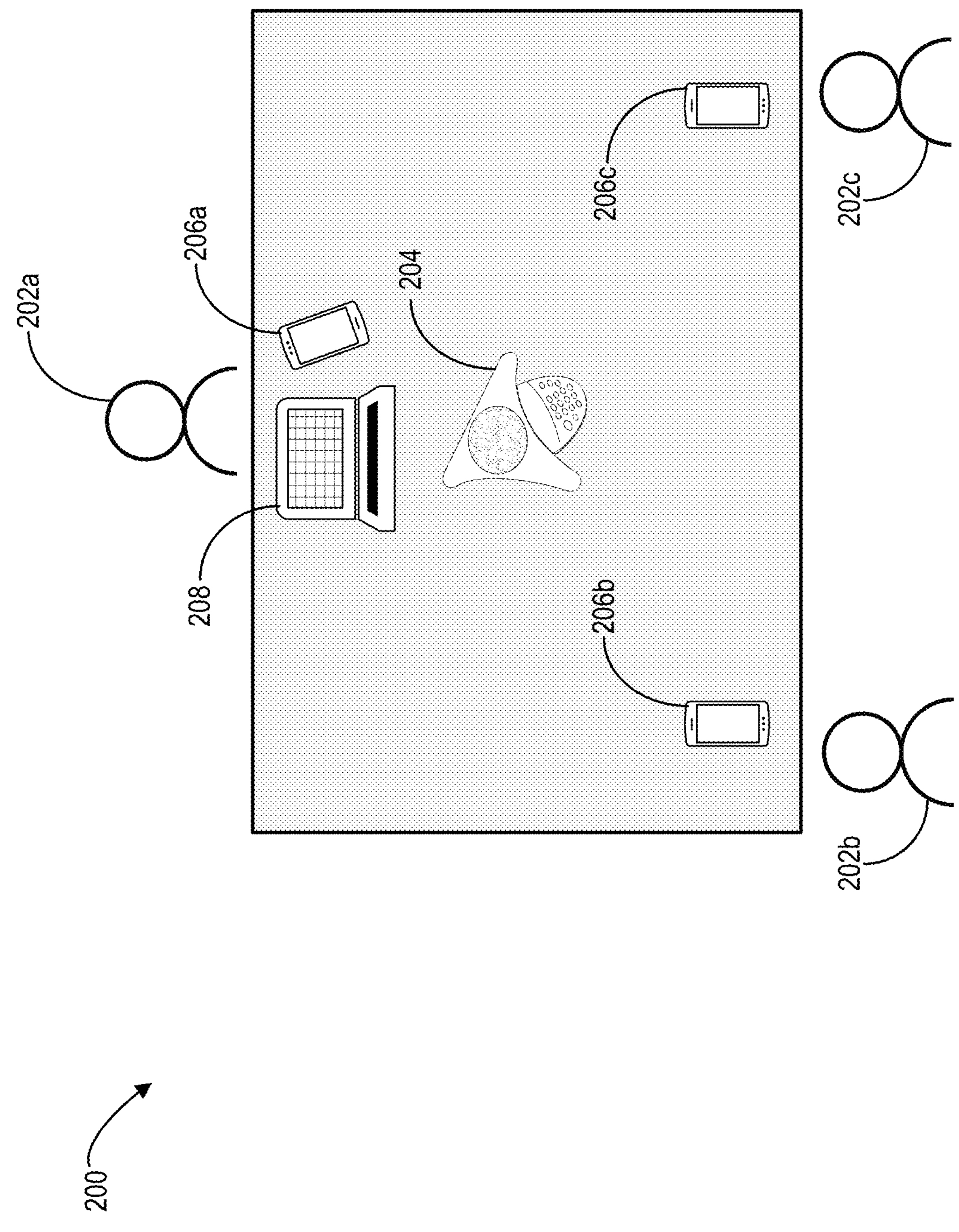
FIG. 2 illustrates a diagram of a physical environment in which a meeting involving a plurality of users occurs in accordance with one or more implementations.

As discussed, the content management system 102 can generate meeting insights for a meeting involving a plurality of users. FIG. 2 illustrates an example of a meeting environment 200 in which a plurality of users 202*a*-202*c* is involved in a meeting. During the meeting, each of the users 202*a*-202*c* can use one or more client devices during the meeting to record audio data and monitor user inputs or other inputs to the client devices. For example, the meeting environment 200 can include a first client device 204 such as a conference phone device capable of connecting a call between the users 202*a*-202*c* and at least one remote user. The users 202*a*-202*c* can thus hold a meeting with remote user(s) by communicating via a client device.

Additionally, the meeting environment 200 can also include additional client devices associated with one or more of the users 202*a*-202*c*. In particular, each user can use at least one client device (e.g., client devices 206*a*-206*c*) to view details associated with the meeting. For example, a user can use a client device to run a client application with streaming video, streaming audio, media presentation, instant messaging or other text communications, collaborative content items (e.g., online, shared text/media documents), and/or other digital communication methods for sharing information during the meeting. The users can thus use the client devices 206*a*-206*c* to provide supplemental materials or content as part of the meeting.

As shown, a user can also be associated with more than one client device. For instance, a user (e.g., user 202*a*) can use more than one client device (e.g., client device 206*a* and client device 208) during a meeting to perform one or more different functions with each client device. To illustrate, a user can use a first device to display information associated with the meeting and a second device to provide input in connection with the meeting. More specifically, a meeting presenter can use a laptop or tablet (e.g., client device 208) to display information that the meeting presenter is presenting during the meeting, including slides or other content. The meeting presenter can also use a smartphone (e.g., client device 206*a*) to record audio, communicate with one or more other users, or perform an action to communicate information to the content management system 102.

In one or more embodiments, the content management system 102 communicates with a client application on a client device to obtain input information associated with a meeting. For example, the client devices 206*a*-206*c* and/or client device 208 include one or more client applications that allow users to provide feedback or other input regarding the meeting to the content management system 102. Specifically, as mentioned, the content management system 102 uses input to client devices in combination with analysis of data (e.g., audio data) to determine relevant portions of media or documentations for a user. For instance, the content management system 102 can determine when a user (e.g., user 202*b*) interacts with a client device (e.g., client device 206*b*) during the meeting. The content management system 102 can then determine a specific time or portion of the audio data (or a specific portion of other materials associated with the meeting) corresponding to the user input and determine that the corresponding portion of audio data contains relevant information for the user or for one or more other users.

For example, the client devices 206*a*-206*c* and/or client device 208 include one or more client applications that can detect certain user inputs. To illustrate, a client device (e.g., client device 206*a*) can include a client application that allows the client device to detect when a user taps on the device. The client application can use information from an accelerometer, touchscreen, or gyroscope to detect the tap. The client application can be running in the background of the client device during the meeting so that the client device can detect the interaction even if the client device is in standby/sleep mode. For instance, during the meeting, the user can tap, move, or otherwise interact with the client device to indicate an important point in the meeting.

Additionally, a client device (e.g., client device 208) can detect when a user types on a keyboard. The client device can determine that the user is typing on a keyboard within a client application (e.g., conferencing software, word processing software, note software) during a specific time period of the meeting. For example, the user can use the client application to take notes during the meeting if the user determines that the information discussed at that point in time is important.

Furthermore, a client device (e.g., any of the client devices 204, 206*a*-206*c*, 208 in FIG. 2) can detect voice commands related to information discussed in a meeting. In particular, the client device can allow a user to provide voice commands in connection with items discussed in a meeting. The voice command can be in relation to something the user or another user said. For instance, a user can say phrases or words such as "Note this," or "Remind me later," that indicate an important topic or action item discussed in a meeting.

In additional embodiments, the client device detects inputs from any number of input devices to the client device during a meeting. For instance, the client device can detect inputs from a mouse to determine when a user clicks or moves the mouse in a certain way indicating a relevant portion of a meeting. The client device can also analyze video data to detect a user input (e.g., a specific motion, facial movements, body language of a user), materials displayed within the video data, or other visual cues to determine input data indicating relevant portions of a meeting. Additionally, the client device can detect inputs from other sensors or input devices such as heart rate monitors or other biometric sensors that can indicate relevant information of a meeting.

After detecting a user input, a client device can send the input data to the content management system 102. For instance, some or all of the client devices 204, 206*a*-206*n*, 208 can include a client application that causes the client devices 204, 206*a*-206*n*, 208 to communicate with the content management system 102. The client application can be dependent on the type of each client device, such that different types of client devices are running different client applications (e.g., mobile application on a smartphone, desktop application on a laptop or desktop computing device) that cause the client devices to communicate with the content management system 102. Alternatively, at least one client device can communicate with another client device in the vicinity (e.g., via a wireless communications technology such as Bluetooth or other local wireless communications technology) to send data to the content management system 102.

In one or more embodiments, the client devices 204, 206*a*-206*c*, 208 communicate with the content management system 102 to provide device input data and audio data in real-time. Specifically, the content management system 102 can receive device input data and audio data while the meeting is ongoing. The content management system 102 can then analyze the data and provide feedback and/or provide other message insights to one or more of the client devices 204, 206*a*-206*c*, 208 in real-time. For example, the content management system 102 can determine relevant portions of meeting data as the meeting data is received in response to receiving device input data during specific portions of the meeting data.

In alternative embodiments, the content management system 102 receives meeting data and/or device input data after a meeting is complete. Specifically, a client device can generate data (e.g., recorded audio data) from a meeting and then synchronize the meeting data with the content management system 102. For example, the client device can synchronize audio data with the content management system 102 in response to a user selecting an option to upload the audio data to the content management system 102 using a content management application (e.g., by storing an audio data file in a folder that synchronizes with the content management system 102). Additionally, the client device can also provide the device input data during or after the meeting is complete. The device input data can include a timestamp so that the content management system 102 can determine the corresponding time in the audio data or other meeting data.

Once the content management system 102 has meeting data and device input data, the content management system 102 can use the data to generate meeting insights. In particular, the content management system 102 analyzes the meeting data to determine content (e.g., determine what is being said, generated, or presented) for the meeting. For instance, the content management system 102 can utilize natural language processing to generate a transcription for audio data. The content management system 102 can store the transcription in memory and/or with one or more user accounts of one or more users associated with the meeting.

The content management system 102 can then analyze the transcription to identify information associated with the audio content. For example, the content management system 102 can identify one or more users (e.g., using voice recognition technology) during the meeting and determine what each user says during the meeting. The content management system 102 can also identify a context of the audio data based on what the one or more users discuss, including one or more subject matters being discussed during one or more portions of the meeting. The content management system 102 can also determine times of different items being discussed during the meeting.

Furthermore, the content management system 102 can analyze content items associated with a meeting to identify relevant information from the associated content items. To illustrate, the content management system 102 can analyze text or metadata of content items generated and synchronized with the content management system 102 to determine text content relative to audio data for the meeting. The content management system 102 can also use video/image analysis to determine content of materials presented or generated (e.g., on a screen, whiteboard, or writing material) during the meeting.

The content management system 102 also correlates identified portions of audio data, meeting materials, or other meeting data with device input data from one or more client devices associated with the meeting. Specifically, in response to determining that a client device received an input from a user at a specific time during the meeting, the content management system 102 determines a portion of the audio data or other materials corresponding to the specific time of the input to the client device. To illustrate, if a user provides an input to a client device at a specific time during a meeting, the content management system 102 can mark the portion of the audio data, document, or other content item corresponding to the device input as relevant based on a timestamp of the device input and a corresponding timestamp of the relevant portion of the audio data or other materials. The content management system 102 can then extract text, images, audio, or video from a portion of meeting data marked as relevant to use in generating meeting insights.

The content management system 102 generates meeting insights for meeting data to send to one or more client devices of one or more users associated with a meeting. For instance, the content management system 102 can determine one or more users associated with the meeting. To identify users associated with the meeting, the content management system 102 can utilize information about the meeting provided by one or more client devices including, but not limited to, a list of users who were invited to the meeting, client devices providing data to the content management system 102 for the meeting, and client devices located in a vicinity of a location for the meeting.

Furthermore, the content management system 102 can provide meeting highlights to users who may not have attended the meeting (in person or via network connection). For instance, the content management system 102 may determine that one or more portions of the meeting data are relevant to a user that did not attend the meeting based on an organizational structure of a business account with the content management system 102. To illustrate, the content management system 102 can determine that a meeting is relevant to a plurality of users based on the users being a part of a department (e.g., "engineering") associated with the meeting, even if one or more of the users did not attend the meeting. Additionally, the content management system 102 can determine that the meeting data may be relevant to another user based on the user being involved in previous meetings on a similar subject matter.

The content management system 102 then generates meeting insights to provide to identified users (e.g., to one or more client devices associated with the identified users) based on relevant portions of meeting data. Specifically, the content management system 102 uses identified content of a relevant portion (e.g., text created from audio data using natural language processing) to generate an electronic message. For example, the content management system 102 can generate a summary document for the user including the identified content, or otherwise describing the identified content, of the relevant portion. As described in more detail below with respect to FIGS. 4E and 5A-5B, a summary document can include information (e.g., summaries, highlights, action items) generally relevant to a plurality of users or customized for a given user.

The content management system 102 can alternatively generate a notification for display within a client application or on an operating system of a client device of an identified user. For example, as described in more detail below with respect to FIG. 4C, the content management system 102 can generate notifications for providing meeting moderation to a meeting presenter while the meeting is ongoing. Additionally, the content management system 102 can provide a message to a meeting presenter indicating meeting feedback for a meeting, as described in more detail with respect to FIG. 4D.

While the embodiments described herein include meeting insights such as meeting summaries, highlights, action items, meeting moderation, and meeting feedback, the content management system 102 can also perform other functions related to a meeting. For instance, the content management system 102 can automatically complete one or more operations associated with a meeting. To illustrate, the content management system 102 can disseminate content items to one or more users or provide suggestions to one or more users to share the content items with one or more other users.

In one or more embodiments, the content management system 102 also synchronizes data across a plurality of client devices. For example, the content management system 102 can synchronize content across devices associated with a user account. To illustrate, as shown in FIG. 2, a user 202*a* can be associated with a plurality of client devices (client device 206*a*, client device 208). The user 202*a* can sign into a user account maintained by the content management system 102 on each of the client devices. The content management system 102 can synchronize content across both client devices so that the user 202*a* is able to access the content from each client device. Accordingly, the user 202*a* can access audio data, audio transcripts, content items associated with the meeting (e.g., presentation materials), meeting insights, or other content stored by the content management system 102 on each of the client devices.

Figure 3:
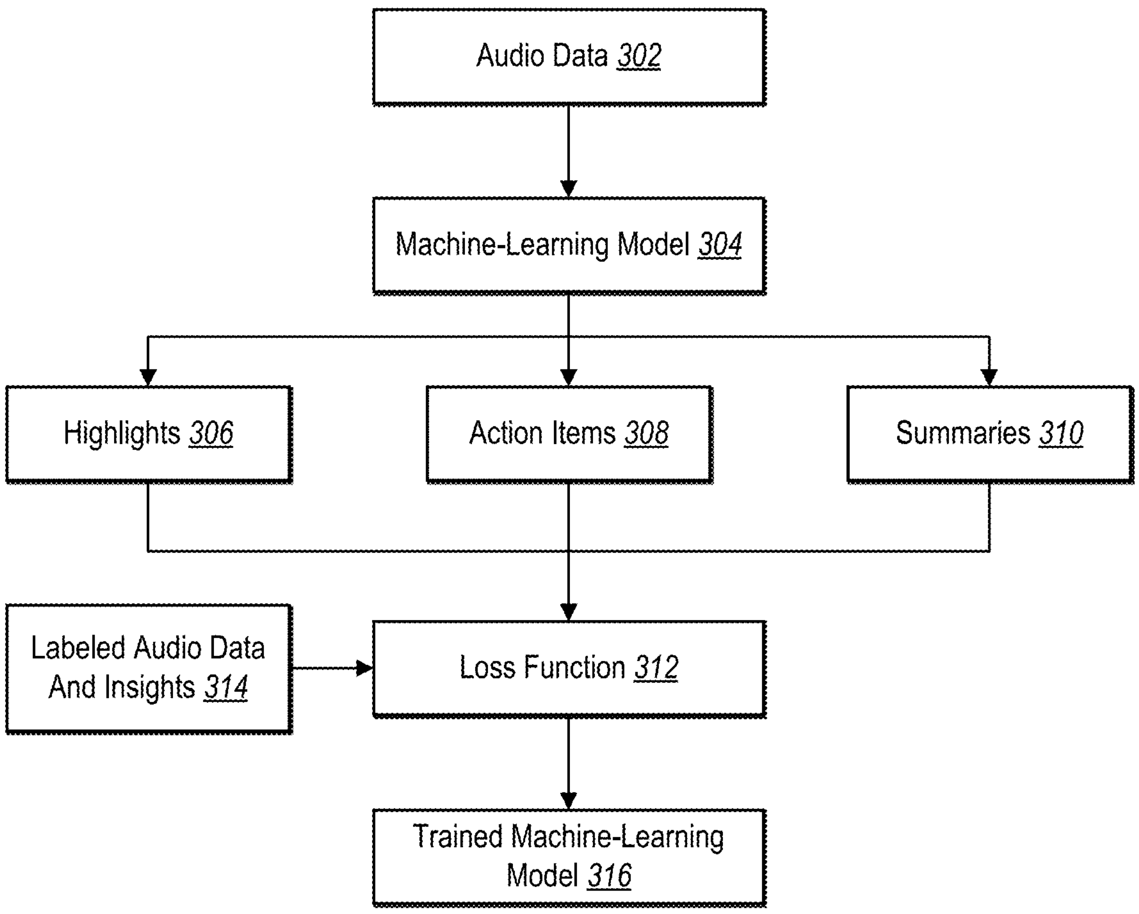
FIG. 3 illustrates a flow diagram illustrating operations for training a machine-learning model to generate meeting insights in accordance with one or more implementations.

The content management system 102 can also use the information from past meetings to train one or more machine-learning models for use in generating meeting insights for future meetings. FIG. 3 illustrates a diagram of a flowchart of a series of acts 300 for training a machine-learning model to automatically generate meeting insights for a meeting. As an overview, training the machine-learning model includes applying a machine-learning model to data associated with a meeting to output automatically generated meeting insights. The content management system 102 then uses curated data associated with the meeting to refine the machine-learning model so that the machine-learning model outputs more accurate meeting insights for future meetings.

As shown in FIG. 3, the content management system 102 uses audio data 302 associated with a meeting as an input to a machine-learning model 304. In particular, the content management system 102 can obtain audio data stored in a content database that includes content provided by one or more client devices associated with one or more users. For example, one or more client devices can record audio data for a meeting and then provide the audio data to the content management system 102. In one or more embodiments, the content management system 102 inputs audio data from a plurality of past meetings into the machine-learning model 304. Training the machine-learning model 304 on larger datasets of audio data improves accuracy by providing the machine-learning model 304 with exposure to a variety of scenarios involving a number of different subject matters, users, and client devices involved with the different meetings. Although FIG. 3 illustrates an example based on audio data, one will appreciate that the disclosed features can be implemented with other types of meeting data, such as video data, presentation materials, or documentation associated with meetings.

As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, etc. Thus, a machine-learning model makes high-level abstractions in data by generating data-driven predictions or decisions from the known input data.

The content management system 102 uses the machine-learning model 304 to generate meeting insights for a meeting based on audio data for the meeting. Specifically, the content management system 102 uses the machine-learning model 304 to output highlights 306, action items 308, and/or summaries 310 based on the audio data. For example, the machine-learning model 304 generates a predicted highlight corresponding to a portion of the audio data based on natural language processing or other audio analysis of the audio data to determine the context of the portion of the audio data. Accordingly, the machine-learning model 304 can determine that a portion of the audio data is of interest to one or more users associated with the meeting and then provide a highlight (e.g., a summarized bullet point for that portion of the audio).

Furthermore, the machine-learning model 304 can output action items 308 corresponding to one or more users. In particular, the machine-learning model 304 generates an action item to indicate that at least a portion of the audio data includes an indication of an action that one or more users should perform in accordance with a subject matter discussed within the meeting. For example, the machine-learning model 304 can identify phrases, words, or context in the audio data that indicates an operation to be performed and then generate a reminder, notification, or other content item that indicates to a user the operation to be performed.

Additionally, the machine-learning model 304 can output summaries 310 of audio data. For instance, the machine-learning model 304 can determine the content of one or more portions of audio data or of the audio data as a whole based on a transcription of the audio data. The machine-learning model 304 can then generate a summary of the content by generating a shorter version of the content that describes the content as a whole for the one or more portions of audio data. A summary can also include a content item with additional information, such as highlights or action items.

After the machine-learning model 304 generates highlights 306, action items 308, and summaries 310, the content management system 102 generates a loss function 312 for the machine-learning model 304. Specifically, the content management system 102 uses labeled audio data and insights 314 to create the loss function 312. More specifically, the content management system 102 uses curated audio data with portions of the audio data marked as relevant, in addition to using manually generated insights (e.g., manually generated highlights, action items, and summaries). The content management system 102 can compare the labeled audio data and insights 314 to the outputs of the machine-learning model 304 and then generate the loss function 312 based on the difference.

The content management system 102 uses the loss function 312 (e.g., the measure of loss resulting from the loss function 312) to train the machine-learning model 304. In particular, the content management system 102 utilizes the loss function 312 to correct parameters that resulted in incorrect predicted outputs from the machine-learning model 304. For instance, the machine-learning model 304 can use the loss function 312 to modify one or more functions or parameters in its prediction algorithms to minimize the loss function 312 and reduce the differences between the outputs (i.e., highlights 306, action items 308, and summaries 310) and the labeled audio data and insights 314. By minimizing the loss function 312, the machine-learning model 304 improves the accuracy of generating insight data for future meetings. Additionally, adjusting the machine-learning model 304 based on the loss function 312 results in a trained machine-learning model 316.

Furthermore, although not illustrated in FIG. 3, the content management system 102 can generate predicted meeting insights for future meetings based on further provided audio data. For example, the audio data 302 can include device input data from one or more client devices. In at least some embodiments, the content management system 102 may receive limited device input data and may therefore use the machine-learning model 304 to generate meeting insights using predictive algorithms in addition to the methods described above with respect to FIG. 2. The content management system 102 may thus generate meeting insights even with limited or no device input data.

Furthermore, as the content management system 102 generates meeting insights for audio data provided to the content management system 102 from one or more client devices and/or receives device input data from the one or more client devices, the machine-learning model 304 can continuously update to fine-tune the meeting insight generation process. For instance, the content management system 102 can generate meeting insights for separate audio data uploaded to the content management system 102 from one or more client devices. When the content management system 102 generates the new meeting insights for additional audio data, the machine-learning model 304 can use the new insights and curated insight data to update the loss function 312, and thus update the machine-learning model 304 itself.

In one or more additional embodiments, the content management system 102 utilizes additional meeting data as an input to the machine-learning model 304. Specifically, the content management system 102 can provide meeting documentation including presentation materials, documents, or other content items presented or generated during a meeting to the machine-learning model 304. For example, the content management system 102 can use meeting agendas, synchronized notes, video data, or other materials in connection with a meeting to train the machine-learning model 304 to output meeting insights for future meetings.

As mentioned previously, the content management system 102 can provide meeting insights to one or more users at one or more client devices during or after a meeting. FIGS. 4A-4E illustrate embodiments of a client device that uses the content management system 102 to provide meeting insights based on audio data or other meeting data associated with a meeting. Specifically, FIGS. 4A-4E illustrate graphical user interfaces of a client application running on a client device associated with a meeting presenter. The client device of the meeting presenter displays content associated with the meeting, provides data to the content management system 102, and displays meeting insights based on the data provided to the content management system 102.

Figure 4A:
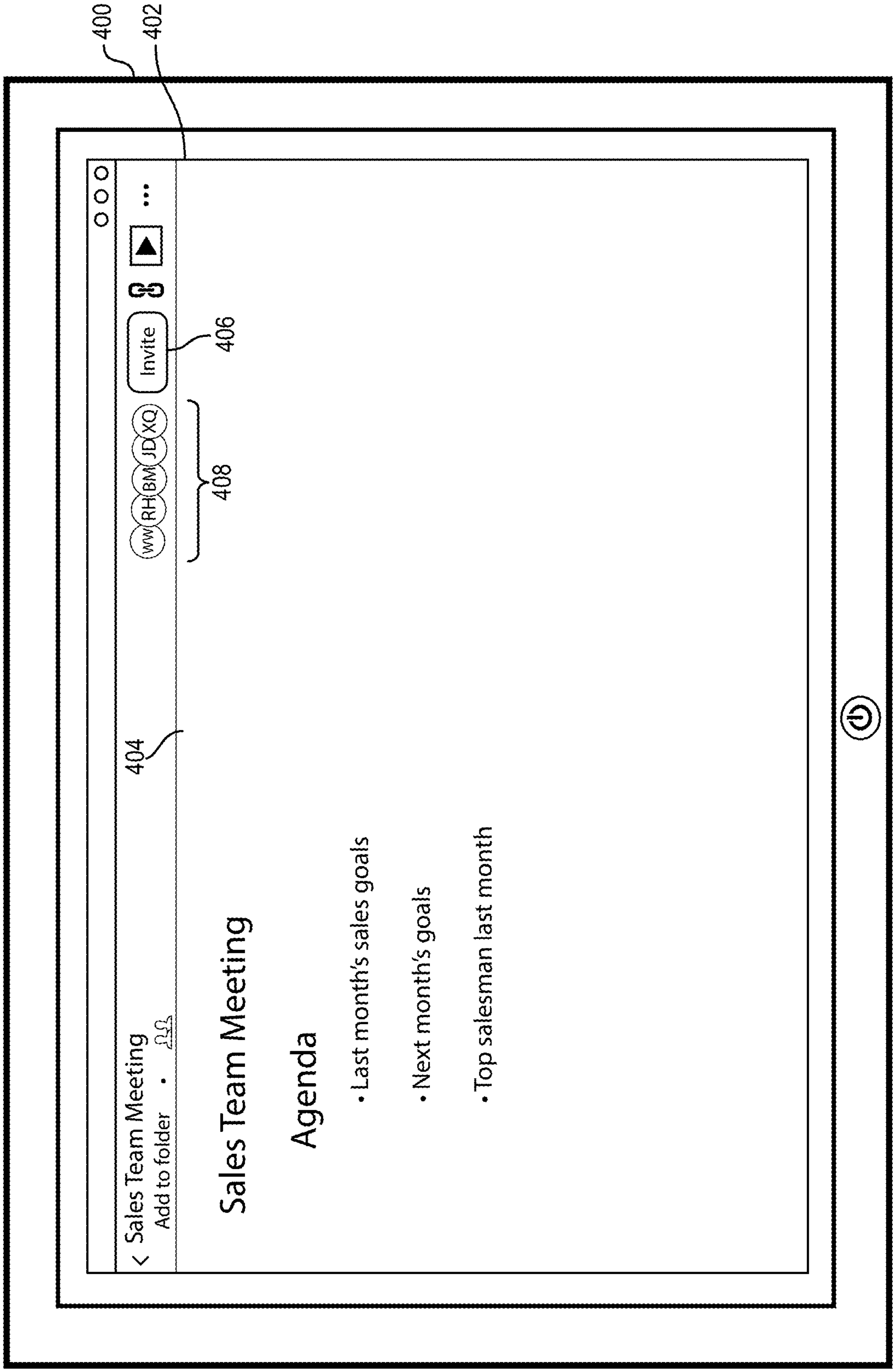
FIGS. 4A-4E illustrate example graphical user interfaces for conducting a meeting and generating meeting insights in accordance with one or more implementations.

FIG. 4A illustrates an embodiment of a client device 400 with a display screen presenting a user interface of a client application 402 associated with the content management system 102. As illustrated in FIG. 4A, the client device 400 is a desktop computing device including the client application 402 that allows the client device 400 to communicate with the content management system 102 and perform content management/creation operations in connection with the content management system 102. In one or more embodiments, the client application 402 includes an interface that allows a user to generate content and store the content in a cloud storage system. For instance, a user can use the client application 402 to generate word processing documents and store the documents in a cloud storage environment (e.g., server(s) 104 of FIG. 1).

The content management system 102 can also allow the user to view and edit content items already stored by the content management system 102. For instance, if the user uses another client device to create a content item, the content management system 102 can synchronize the content item to other client devices associated with the user account. Thus, the content management system 102 can synchronize content with the client device 400 so that the user can view the content and/or edit the content within the client application 402. Additionally, synchronization of content items can occur in real time, so that two or more users can view a content item and modifications/edits to the content item in real time, such as within a browser-based online collaborative application.

As shown, the client application 402 can allow a user to create a content item in connection with a meeting. To illustrate, the user can create a meeting agenda 404 for a meeting involving the user and one or more other users. In particular, the client application 402 can include word processing capabilities to allow the user to create the meeting agenda 404, view the meeting agenda 404, and/or edit the meeting agenda 404. The content management system 102 can synchronize the meeting agenda 404 with other client devices of the user (e.g., a smartphone) so that the user can access the meeting agenda 404 from any device associated with the user's account.

The content management system 102 can also allow the user to share content with other users. For example, the content management system 102 can allow the user to add other users to a list of users that have access to a content item by inviting the users to view and/or edit the content item using an invite option 406. The client application 402 can also display information about the users who are able to see and/or edit the content item (e.g., icons 408). As with the user, the content management system 102 can allow the other users invited to the content item to synchronize the content item across a plurality of devices.

As shown, the meeting agenda 404 can include details about a planned meeting. For example, the meeting agenda 404 can include a title indicating that the content item is an agenda for a specific meeting. The meeting agenda 404 can also include a plurality of bullet points that indicate topics the meeting presenter will discuss during the meeting. In one or more embodiments, a meeting agenda also includes other details about the meeting, including time, location, etc. These details may allow the content management system 102 to determine meeting insights during, or after, the meeting.

The meeting agenda 404 can also include metadata or other data that indicates to the content management system 102 that the meeting agenda 404 corresponds to a scheduled meeting. The content management system 102 can thus associate any data from the meeting with the meeting agenda 404 and other content associated with the meeting. To illustrate, the content management system 102 can associate audio data, video data, documents, device input data, feedback, meeting insights, user identifier, or other data with the meeting agenda 404 and with each other. In one example, the content management system 102 uses a meeting identifier to associate content with the meeting.

Figure 4B:
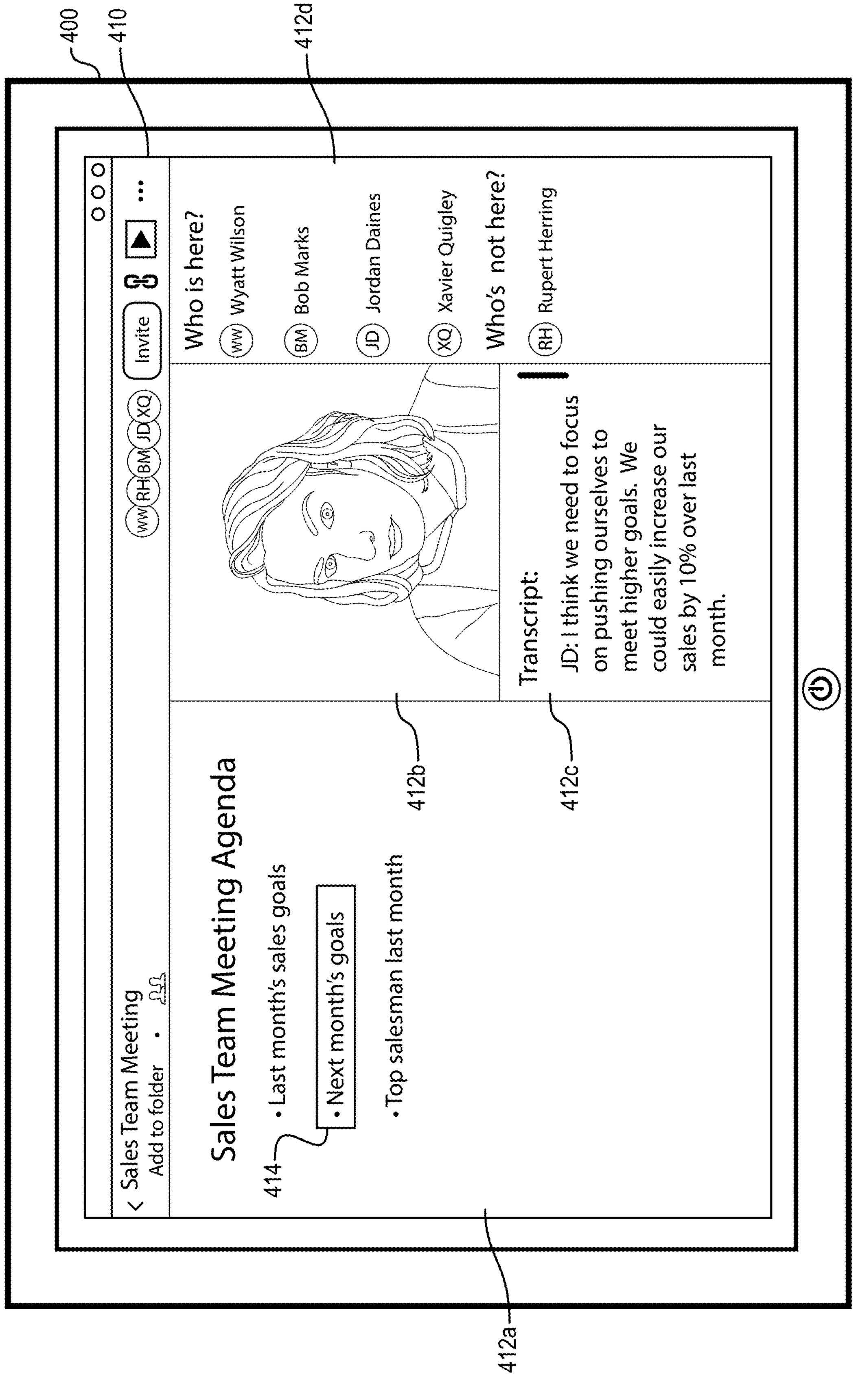

FIG. 4B illustrates a graphical user interface of a client application 410 on the client device 400. The client application 410 may be the same as client application 402 or a different application. The client application 410 includes a conferencing application that allows a plurality of users to hold a meeting in two or more different locations (e.g., not in person) over a network connection. The client application 410 can include a plurality of portions for displaying various content items associated with the meeting. For example, the client application 410 can include a document region 412*a*, a video region 412*b*, a transcript region 412*c*, and a user list 412*d*. The client application 410 can include other regions or other arrangements of the illustrated regions than those shown in FIG. 4B.

As mentioned, the client application 410 can include a document region 412*a* for displaying documents or other content items related to the meeting. For example, the document region 412*a* can display presentation items provided by the meeting presenter or by another user associated with the meeting. When displaying a content item in the document region 412*a*, the content management system 102 can synchronize the content displayed within the document region 412*a* across all of the client devices in the meeting. Alternatively, the content management system 102 can allow a user to select different content to view within the meeting than is displayed to another user.

According to one or more embodiments, the content management system 102 analyzes the content in the document region 412*a* for providing information to the user(s) within the client application 410. Specifically, in the case of a meeting agenda (e.g., meeting agenda 404) displayed within the document region 412*a*, the content management system 102 can analyze the meeting agenda to determine a sequence of topics to be discussed within the meeting. While analyzing the audio data for the meeting, the content management system 102 can determine that the meeting presenter or other users are discussing a given topic listed within the meeting agenda (e.g., using audio processing on the audio data provided to the content management system 102 for the meeting). The content management system 102 can then highlight the identified topic within the document region 412*a* (e.g., with a highlight box 414 or another highlight method).

In one or more embodiments, the content management system 102 allows users to use video conferencing during a meeting. In particular, the content management system 102 can provide a video feed for the meeting to the client device 400, which can display the video feed within the video region 412*b*. In one or more embodiments, the video region 412*b* can display a user currently talking. Alternatively, the video region 412*b* can display a selected video feed from a plurality of available video feeds for the meeting (e.g., in response to a selection by the user within the client application 410). The video region 412*b* can thus include a video feed that changes dynamically based on audio input to client devices or in response to user selection of a video feed. In yet additional implementations, the video region 412*b* is able to display a plurality of video feeds.

Furthermore, the client application 410 can include a transcript region 412*c* that displays a transcript of audio from the meeting. In one or more embodiments, the content management system 102 generates a transcript in real-time while the meeting is ongoing. Specifically, the content management system 102 can use language processing to analyze audio data (e.g., streaming audio data) that the client device 400 or another client device provides to the content management system 102. The transcript region 412*c* provides a text transcription of the audio data for the content management system 102 to analyze. The text transcription can also follow the highlight box 414 within the document region 412*a* and the video within the video region 412*b*. Furthermore, the transcription region 412*c* can allow a user to scroll through the text transcription to see what has been discussed.

The client application 410 can also include a user list 412*d* that includes details about the users in attendance at the meeting. In particular, the content management system 102 can identify a plurality of users invited to the meeting. The content management system 102 can use, for example, the users with access to the document(s) provided for display within the document region 412*a*. Additionally, the content management system 102 can determine user identifiers based on a meeting invite using the client application 410 or another application that shares information with the content management system 102 such as an email application. The user list 412*d* can display the users that are currently in attendance, as well as the users that were invited but are not in attendance.

Figure 4C:
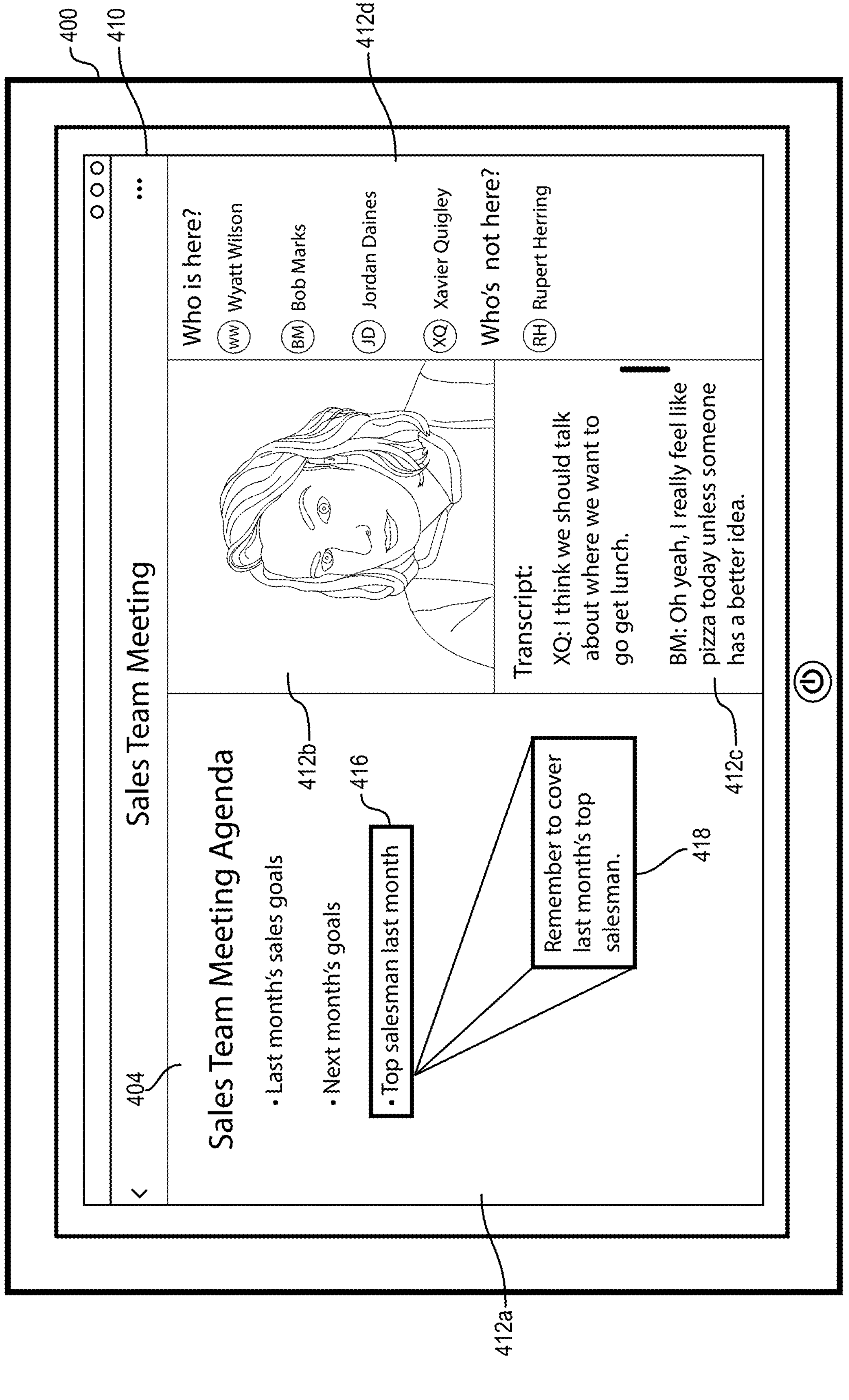

In one or more embodiments, as briefly mentioned previously, the content management system 102 provides real-time meeting moderation. Specifically, the content management system 102 can provide messages to a meeting presenter on a client device of the meeting presenter to assist in presenting the materials or otherwise improving presentation of the meeting. For example, FIG. 4C illustrates an embodiment in which the content management system 102 assists the meeting presenter by verifying that the meeting presenter is covering all of the materials.

As shown, the transcription region 412*c* continues to follow along with the audio data received from one or more client devices (e.g., the client device 400). Furthermore, the content management system 102 analyzes the materials associated with the meeting (e.g., the meeting agenda 404 in the document region 412*a*). As the content management system 102 transcribes the audio data and analyzes the materials associated with the meeting, the content management system 102 can determine when the meeting presenter or another user covers a topic from the meeting agenda 404 and moves to a subsequent topic. As mentioned above, the content management system 102 can highlight a currently or most recently discussed topic within the document region 412*a* using a highlight box 416 to indicate that the current topic has changed, as in FIGS. 4B and 4C.

In one or more embodiments, the content management system 102 tracks the discussed content to determine whether all of the materials are discussed. For example, the content management system 102 can track the topics discussed during the meeting and compare the discussed topics to the meeting materials (e.g., the meeting agenda 404). The content management system 102 can also note the order of discussed topics and determine whether any of the topics are discussed out of order, etc. For instance, if the content management system 102 determines that the meeting presenter has skipped a topic listed in the meeting agenda 404 and moved on to another topic, the content management system 102 can determine that the meeting presenter may have missed the topic.

If the content management system 102 determines that one or more topics from the meeting agenda 404 have not been covered by the meeting presenter or another user during the meeting, the content management system 102 can generate a message to provide to the meeting presenter. To assist the meeting presenter, the content management system 102 can generate a message including a topic, materials, or other content included in the meeting agenda 404 or other meeting materials that the content management system 102 has not found in the audio data. The content management system 102 can provide the message to the meeting presenter within the client application 410 as a popup notification 418, as in FIG. 4C. In one or more alternative embodiments, the content management system 102 provides meeting moderation messages in a messages pane, in a separate interface (e.g., window or application), or on a separate device (e.g., a device also in communication with the content management system 102).

In addition to messages regarding content that has been discussed, the content management system 102 can also provide additional meeting moderation by tracking a time associated with the meeting. For example, the content management system 102 can access details about the meeting (e.g., from a calendar event associated with the meeting or from a meeting invite) to determine a length of scheduled time for the meeting. The content management system 102 can track the time taken for an ongoing meeting and determine whether the meeting is on track to end on time.

To illustrate, the content management system 102 can analyze the meeting agenda 404 to determine whether the meeting is on track based on the percentage of the meeting agenda 404 remaining. For instance, the content management system 102 can assign a planned time for each agenda item based on the total number of items and the amount of time scheduled for the meeting. Alternatively, a user can customize the time for each agenda item by manually setting the times for the agenda items, such as by including the amount of time for each agenda item within the meeting agenda 404. In yet another example, the user can customize the time for each agenda item within the client application 410 during the meeting. If the content management system 102 detects that the meeting is likely to go over time, or that discussion of an agenda item has taken longer than its allotted time, the content management system 102 can provide a message to the meeting presenter indicating the time issue.

Figure 4D:
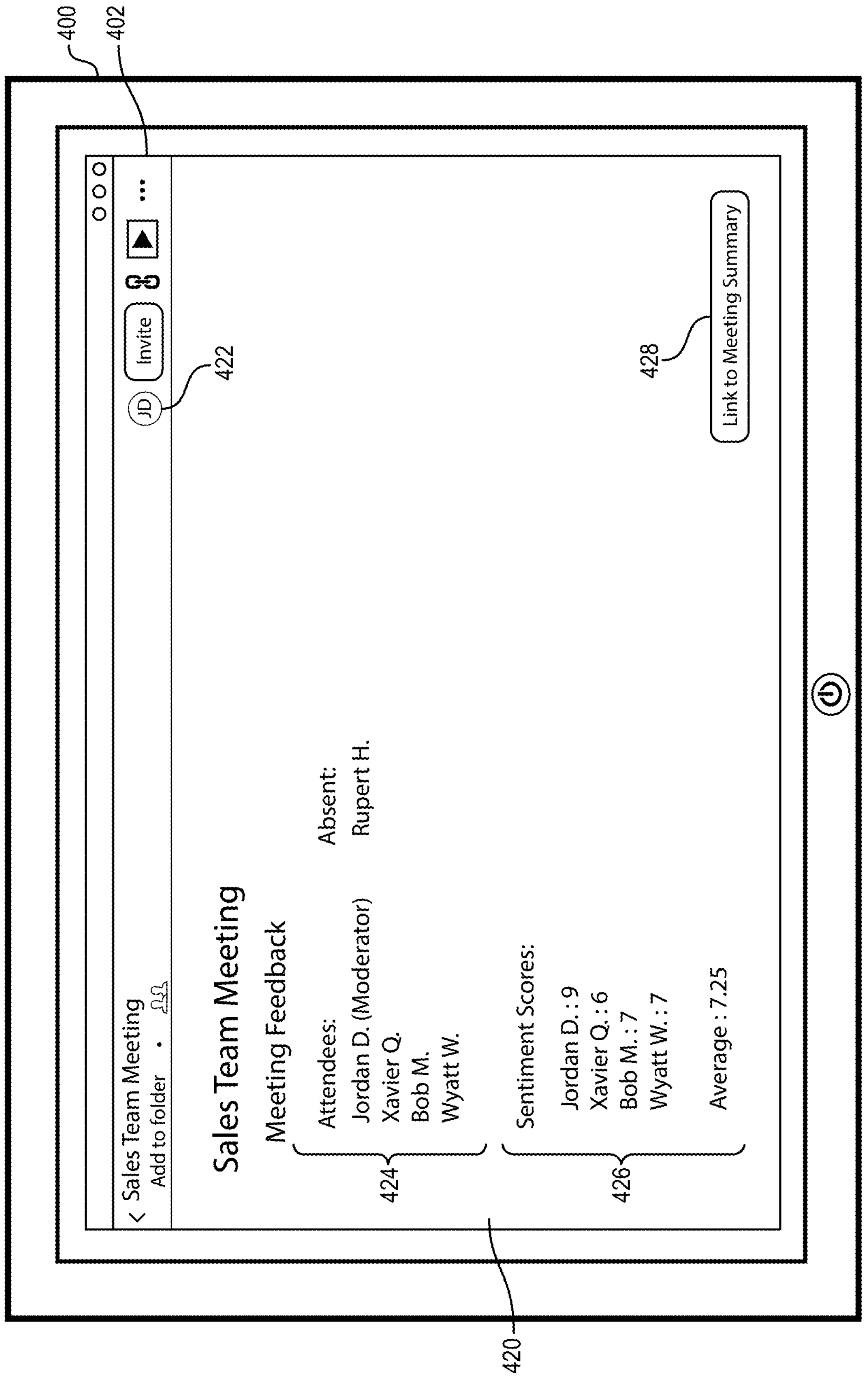

Once a meeting has ended, the content management system 102 can provide additional meeting insights associated with the meeting. In particular, the content management system 102 can provide meeting feedback and meeting summaries based on the meeting data for the meeting and device input data during the meeting. For example, FIG. 4D illustrates a user interface including meeting feedback for a meeting. In particular, the content management system 102 generates meeting feedback based on inputs from one or more client devices associated with one or more users attending the meeting.

In one or more embodiments, the content management system 102 provides a feedback document 420 to the meeting presenter. As shown, the client device 400 can display the feedback document 420 within the client application 402 of FIG. 4A, though the content management system 102 can provide the feedback document 420 for display within another client application. Furthermore, the content management system 102 can provide the feedback document 420 to only the meeting presenter ("Moderator," as in FIG. 4D). Accordingly, the client application 402 can include an indication that the meeting presenter is the only user to have access to the feedback document 420 with the icon 422.

According to one or more embodiments, the content management system 102 generates feedback for the meeting based on inputs to one or more client devices. For example, the content management system 102 can determine whether one or more users invited to a meeting attended the meeting based on information obtained from client device(s) associated with the invited users. To illustrate, the content management system 102 can determine that users who logged into a meeting interface (e.g., the interface described in relation to FIGS. 4B-4C) during the meeting attended the meeting. Similarly, the content management system 102 can determine that users who did not log into the meeting interface during the meeting did not attend the meeting. Once the content management system 102 has determined attendance for the meeting, the content management system 102 can include the attendance 424 in the feedback document 420.

Additionally, the content management system 102 can provide feedback related to meeting effectiveness/productiveness. Specifically, the content management system 102 can determine sentiment scores for users during the meeting as an indication of the meeting effectiveness. For example, the content management system 102 can utilize one or more cues associated with the meeting to determine a sentiment score for a user including, but not limited to explicit user feedback based on a user response to questions or other user input explicitly indicating the user's sentiment and implied user feedback based on video cues, audio cues, biometric data, or inferences from user inputs at their client devices (e.g., based on a user accessing other applications on a client device during the meeting). The content management system 102 can generate sentiment scores 426 including a sentiment score for each user and an averaged sentiment score for all users and then provide the sentiment scores 426 in the feedback document 420.

Figure 4E:
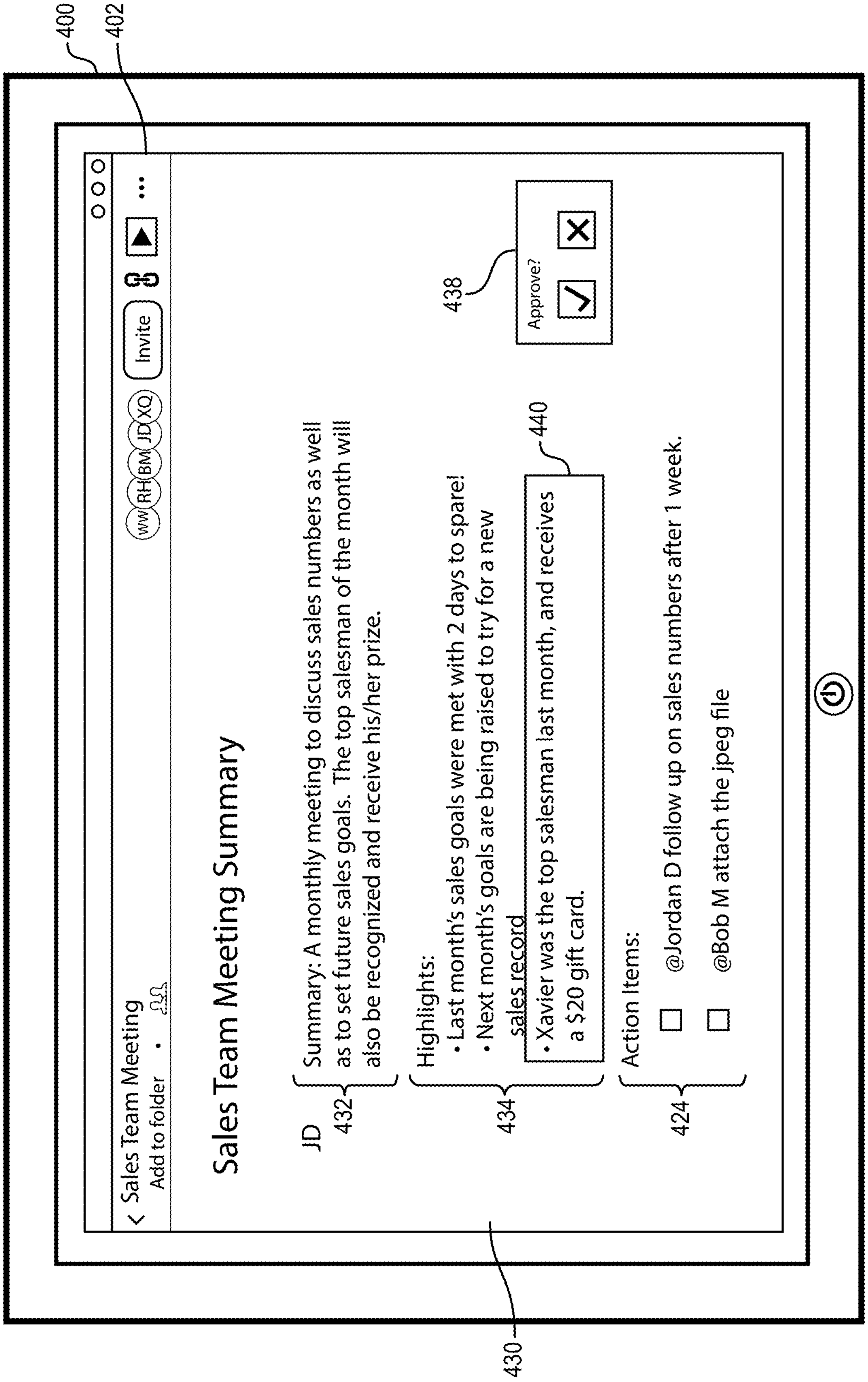

In addition to providing meeting feedback, the content management system 102 can provide a meeting summary to one or more users. FIG. 4D illustrates a summary option 428 within the feedback document 420 to view the meeting summary associated with the meeting. Selecting the summary option 428 can cause the client application 402 to display the corresponding meeting summary within the meeting interface, as illustrated in FIG. 4E. Alternatively, the content management system 102 can allow a user to access the meeting summary from a directory of content items associated with the user's account with the content management system 102.

As illustrated in FIG. 4E, the content management system 102 can provide a meeting summary 430 with additional meeting insights from the meeting. In one or more embodiments, the meeting summary 430 includes an overall summary 432, highlights 434, and action items 436. To illustrate, the overall summary 432 can include a summary of the purpose of the meeting. The content management system 102 can obtain the purpose of the meeting by extracting it from a meeting invite, from an agenda or other presentation materials, from a calendar event, or by using machine-learning to generate the summary based on the content of the audio data as a whole.

Additionally, the highlights 434 can include important/notable points discussed during the meeting. Specifically, the content management system 102 can analyze the audio data to determine content of the audio data (e.g., text transcription). The content management system 102 can then monitor inputs to client devices during the meeting to determine portions of the audio data that may be relevant based on the amount and/or type of input to the client devices. As previously mentioned, the content management system 102 can determine that a portion of audio data is relevant in response to detecting that one or more users have provided a touch/tap input or a motion input to a client device based on data from the client device's accelerometer/gyroscope.

In one or more additional embodiments, the content management system 102 detects that one or more users are taking notes during one or more portions of media data, indicating that those portions include important information. For example, the content management system 102 can determine relevant portions in response to detecting that any user is taking notes (e.g., typing while using a word processing or note-taking application, writing on a piece of paper, or using another note-taking medium). Alternatively, the content management system 102 can determine whether a threshold percentage of users is taking notes at any given time for identifying relevant portions of a meeting (e.g., based on meeting heuristics), which may help verify the importance of the portion of a meeting. As will be discussed in more detail below with respect to FIGS. 5A-5B, the content management system 102 can identify relevant portions generally or per individual.

According to one or more embodiments, the content management system 102 uses video data to determine whether a portion of a meeting is relevant. In particular, the content management system 102 can use video cues such as body language (facial expressions), eye movements (e.g., a wink), body movements (e.g., head nod, hand movements such as a thumbs up), or other body cues (e.g., touching a predetermined section of a table or area near a user labeled with physical or digital markers) to determine that a portion of the meeting is relevant to that user or to other users. The content management system 102 can synchronize the video data with audio data for the meeting to identify the portions of the meeting corresponding to the video cues that indicated relevant information.

The content management system 102 can use audio transcription text corresponding to the relevant portion(s) of the meeting. For instance, the content management system 102 can use a text transcription of audio data that the content management system 102 generated during or after the meeting. The content management system 102 can then identify the text corresponding to the relevant portions and paste the text or summarize/rephrase the text into the meeting summary 430 as highlights 434. The highlights 434 can include bullet points or other easily digestible representations of the discussion points from the meeting.

In one or more embodiments, determining the text to include in the highlights 434 includes reviewing the text corresponding to the relevant portions to determine how much of the text is included in the relevant portion. Specifically, when the content management system 102 detects a device input, the content management system 102 can review the portion of the audio data at the time of the device input. The content management system 102 can also review text chronologically near the time of the device input to determine whether the relevant portion includes a sentence, two sentences, a paragraph, the past twenty seconds of audio, the past thirty seconds of audio, etc., to determine the relevant portion of the audio data corresponding to the device input.

Similar to determining the highlights 434, the content management system 102 can determine the action items 436 based on meeting data and device input data. The content management system 102 can determine, for instance, that one or more users provides input to a touch screen, keyboard (e.g., notes, keyboard shortcut), or microphone (e.g., voice command) to mark a portion of the audio data or other meeting materials as relevant (e.g., in metadata of the audio data or other content items). The content management system 102 can determine that the relevant portion includes an operation or action for one or more users to perform based on the meeting using key words, phrases, or other indicators of operations/actions. The content management system 102 can then generate an action item by including the action to perform in the meeting summary 430. The content management system 102 can also tag one or more users in relation to an action item so that the action item is associated with the tagged user(s), and which may provide notifications/reminders of the action item at a later time.

When determining relevance of highlights or action items for one or more users, the content management system 102 can assign a confidence to each potential highlight/action item in the meeting data. For example, the content management system 102 can use information about past highlights/action items, including whether users reviewed or completed the highlights/action items, to determine a confidence level for highlights/action items in the present meeting data. If the confidence for a given item meets a threshold, the content management system 102 can include the item in the meeting summary 430. Additionally, the content management system 102 can use confidence levels and past execution/review of items to prioritize similar items within the meeting summary 430. This can be particularly helpful in regularly occurring meetings dealing with review cycles, product launches, or other meetings that regularly include the same or similar action items.

In one or more embodiments, the meeting summary 430 provided to the meeting presenter is a provisional meeting summary that allows the meeting presenter to approve or reject meeting insights prior to providing meeting insights to other users. In particular, the content management system 102 can provide an approval option 438 with each item in the meeting summary 430 to allow the user to approve or reject each item. For example, if the user hovers over an item (e.g., a highlight) within the client application 402, the client application can display the approval option 438 and present the highlight with a highlight box 440 indicating that the approval option 438 corresponds to the indicated highlight. Accordingly, the user can verify the accuracy of the highlight to the content management system 102 by selecting to approve (check mark) or reject ("x") the highlight and whether to include the highlight in meeting highlights provided to other users. After verifying the accuracy of the meeting summary 430, the content management system 102 can provide meeting insights to other users associated with the meeting.

While FIGS. 4A-4E illustrate meeting moderation and/or feedback provided to a meeting presenter, the content management system 102 can provide meeting moderation and/or feedback to other users, as may serve a particular implementation. For instance, the content management system 102 can determine that meeting moderation notifications or feedback can assist other users in improving a meeting, or future meetings, by presenting the information to other users in addition to the meeting presenter. The content management system 102 may determine whether to send such information to other users based on preferences of the meeting presenter and/or based on historical operations during past meetings.

For example, the content management system 102 can utilize information that is discussed during a meeting to provide real-time feedback or insight to attendees of a meeting. Specifically, the content management system 102 can detect keywords, phrases, or other content in a meeting and then take an action to display insights on one or more client devices associated with the meeting. To illustrate, in response to detecting an acronym being discussed during a meeting, the content management system 102 can identify a meaning of the acronym and then provide a message to one or more client devices including the identified meaning of the acronym. The content management system 102 can similarly provide real-time insights that include other information for individuals, groups, or other entity based on the context of the audio data or other meeting materials. For instance, the content management system 102 can detect when a user requests that the content management system 102 provide business intelligence information (e.g., performance statistics, asset information, planning information) to one or more client devices and/or one or more user accounts associated with the meeting.

In one or more embodiments, the content management system 102 also provides suggestions to one or more users (e.g., to the meeting presenter) to send meeting materials (summaries or other content items) to the one or more users or for including users in future meetings. In particular, the content management system 102 can identify users who may be interested in the meeting materials based on attendees/invitees associated with the meeting. The content management system 102 can determine user interest based on identifying that a user during the meeting is discussing a content item with another user during the meeting. The content management system 102 can also identify users who may be interested in meeting materials based on user account info, users in specific departments, subject matter of the meeting materials, participation in previous meetings, or other indicators of a correlation between the meeting subject matter and the users. The content management system 102 can also use machine-learning to determine potential user interest in meeting materials. Once the content management system 102 has determined users who may be interested, the content management system 102 can provide suggestions to the meeting presenter or to another user for sharing materials.

In one or more embodiments, as mentioned previously, the content management system 102 uses the feedback from the user to train a machine-learning model. Specifically, the feedback from the user can act as curation of the input data or training data to the machine-learning model so that the machine-learning model can generate more accurate insights for future meetings. For instance, based on the user feedback and the text content of the corresponding portion of audio data, the content management system 102 can treat similar content in audio data for future meetings consistently with the user feedback.

Figure 5A:
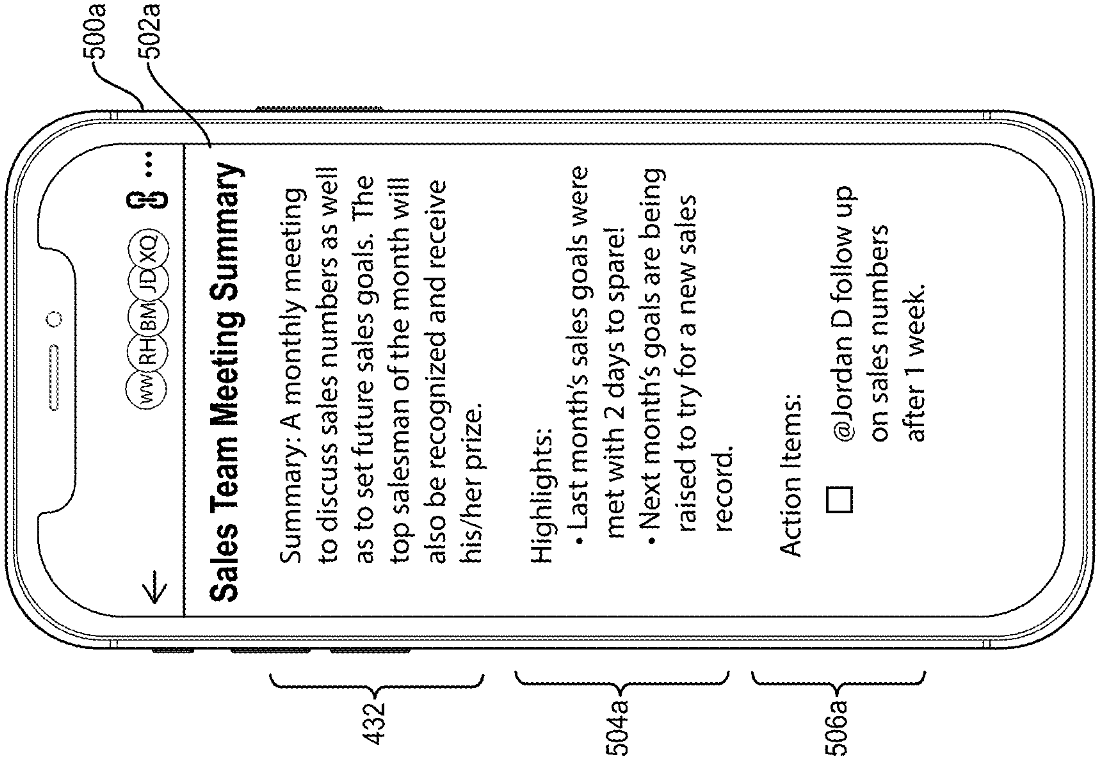
FIGS. 5A-5B illustrate example graphical user interfaces for providing customized meeting summaries in accordance with one or more implementations.
Figure 5B:
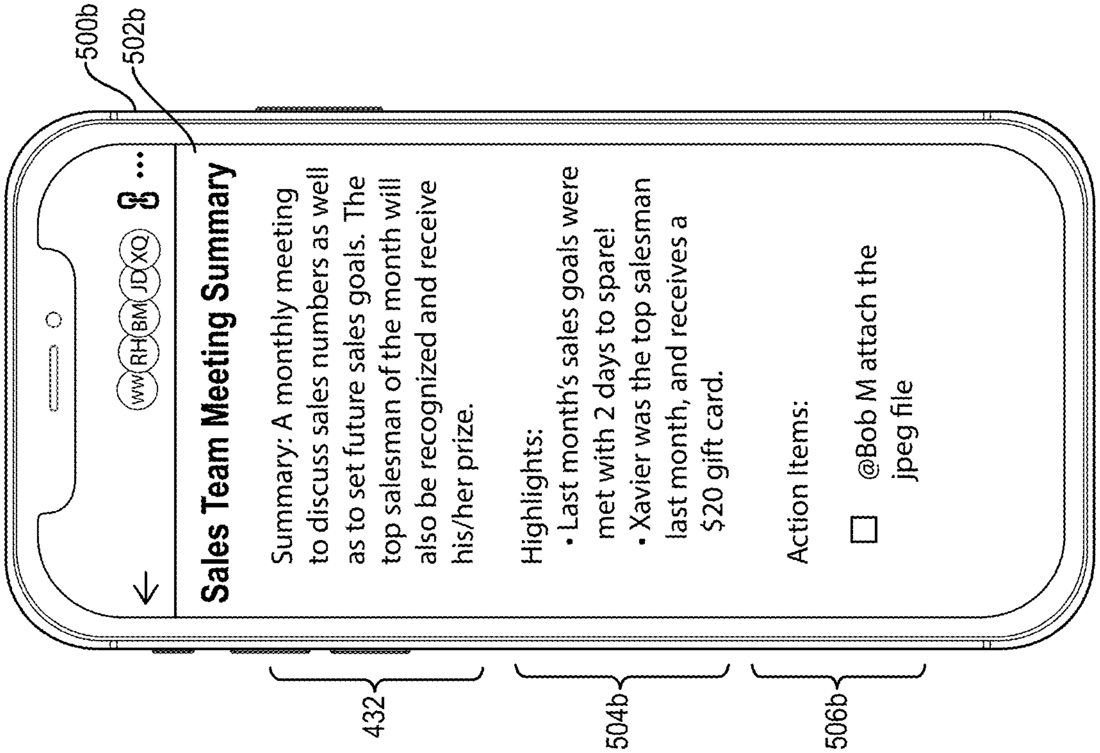

Additionally, the content management system 102 can provide customized meeting summaries to users based on information that is relevant to each specific user. FIGS. 5A-5B illustrate embodiments of graphical user interfaces displaying customized meeting summaries based on the meeting summary 430 of FIG. 4E. For example, FIG. 5A illustrates a first client device **500*a* displaying a first customized meeting summary 502*a* for a first user. Similarly, FIG. 5B illustrates a second client device 500*b* displaying a second customized meeting summary 502*b* for a second user. In each case, the content management system 102** identifies meeting insights that are relevant to each user and provides the corresponding relevant meeting insights in the separate customized meeting summaries.

As mentioned, FIG. 5A illustrates a first customized meeting summary **502*a* for a first user. As shown, the first customized meeting summary 502*a* includes the overall summary 432 from the meeting summary 430 of FIG. 4E. While the overall summary 432 is the same as in the meeting summary 430, the content management system 102 can determine that only a subset 504*a* of all highlights is relevant to the first user. Specifically, the content management system 102 can determine that the subset 504*a* of highlights is relevant based on device input from the first client device 500*a* (e.g., based on the user tapping or typing on the first client device 500*a* during the corresponding portions of a meeting). Additionally, the content management system 102 can determine the subset 504*a*** of highlights based on user account information for the user, including, but not limited to the user's job description and the subject matter of the portion(s) of the meeting or previous meetings involving the first user.

Furthermore, the content management system 102 can determine a subset **506*a* of action items relevant to the first user to include in the first customized meeting summary 502*a*. In particular, the content management system can utilize device input data, audio data (or other meeting data), and user account information to determine which action items are relevant to the user. In addition, the content management system 102 can determine that the subset 506*a* of action items is relevant to the user based on the action items including a tag of the user (e.g., "@Jordan D"). The content management system 102** can then include the subset

506*a* of action items relevant to the user within the first customized meeting summary 502*a* for display at the first client device 500*a*.

FIG. 5B illustrates a second customized meeting summary 502*b* for a second user. As shown, the second customized meeting summary 502*b* includes the overall summary 432 from the meeting summary 430 of FIG. 4E, as with the first customized meeting summary 502*a*. The content management system 102 can determine that only a subset 504*b* of all highlights is relevant to the second user. Specifically, the content management system 102 can determine that the subset 504*b* of highlights is relevant based on device input from the second client device 500*b* (e.g., based on the user tapping or typing on the second client device 500*b* during the corresponding portions of meeting data). Additionally, the content management system 102 can determine the subset 504*b* of highlights based on user account information for the user, including, but not limited to the user's job description and the subject matter of the portion(s) of the meeting data or previous meetings involving the second user.

Furthermore, the content management system 102 can determine a subset 506*b* of action items relevant to the second user to include in the second customized meeting summary 502*b*. In particular, the content management system can utilize device input data, meeting data, and user account information to determine which action items are relevant to the user. In addition, the content management system 102 can determine that the subset 506*b* of action items is relevant to the user based on the action items including a tag of the user (e.g., "@Bob M"). The content management system 102 can then include the subset 506*b* of action items relevant to the user within the first customized meeting summary 502*b* for display at the second client device 500*b*.

As shown in FIG. 5B, summary documents can also allow users to add content to the meeting summaries. For example, an action item within the second customized meeting summary 502*b* includes a request for the second user to attach a file to the second customized meeting summary 502*b*. To complete the action item, the second user can attach a corresponding file (e.g., a picture) to the second customized meeting summary 502*b*. The content management system 102 can then synchronize the attachment to the summaries of other users for which the attachment is relevant (e.g., based on the other users including a similar action item, highlight, or other insight).

Because the content management system 102 is able to generate generalized or customized summaries of meeting data, the content management system 102 can make these summary documents searchable within a cloud storage associated with one or more user accounts. For instance, the content management system 102 can store meeting summaries with users who attended a meeting so that each of the users can search within their online storage accounts to find content of the meeting summaries. Thus, when a user wants to find relevant information from a previous meeting, the user can leverage the content management system 102 to easily search for summaries, highlights, or action items that the content management system 102 determined were relevant to the user.

Additionally, the content management system 102 can index a user's content items to automatically provide reminders and other notifications to the user based on past meetings. For instance, the content management system 102 can analyze action items in meeting summaries associated with the user and then generate reminders (or other content items) or schedule follow-up meetings to complete the action items according to a timetable indicated during the meeting (if applicable). The content management system 102 can also allow the user to clear any action items that the user has completed so that the content management system 102 will mark them as completed and not provide any further notifications/reminders. In at least some embodiments, the content management system 102 can automatically complete certain action items involving generating content items, scheduling additional meetings, sending content items to one or more users, or other actions that the content management system 102 can perform.

In addition to providing meeting insights to users via applications managed by the content management system 102, the content management system 102 can provide meeting insights (e.g., one or more electronic messages) to a user via a third-party system. For instance, the content management system 102 can allow a user to authenticate a third-party application with the content management system 102 (e.g., using login credentials for the third-party system). When the content management system 102 identifies meeting content relevant to the user, the content management system 102 can generate one or more electronic messages to send to the user via the third-party application. To illustrate, the content management system 102 can automatically push action items corresponding to a user based on a recent meeting to a client device of the user via the third-party application.

Figure 6:
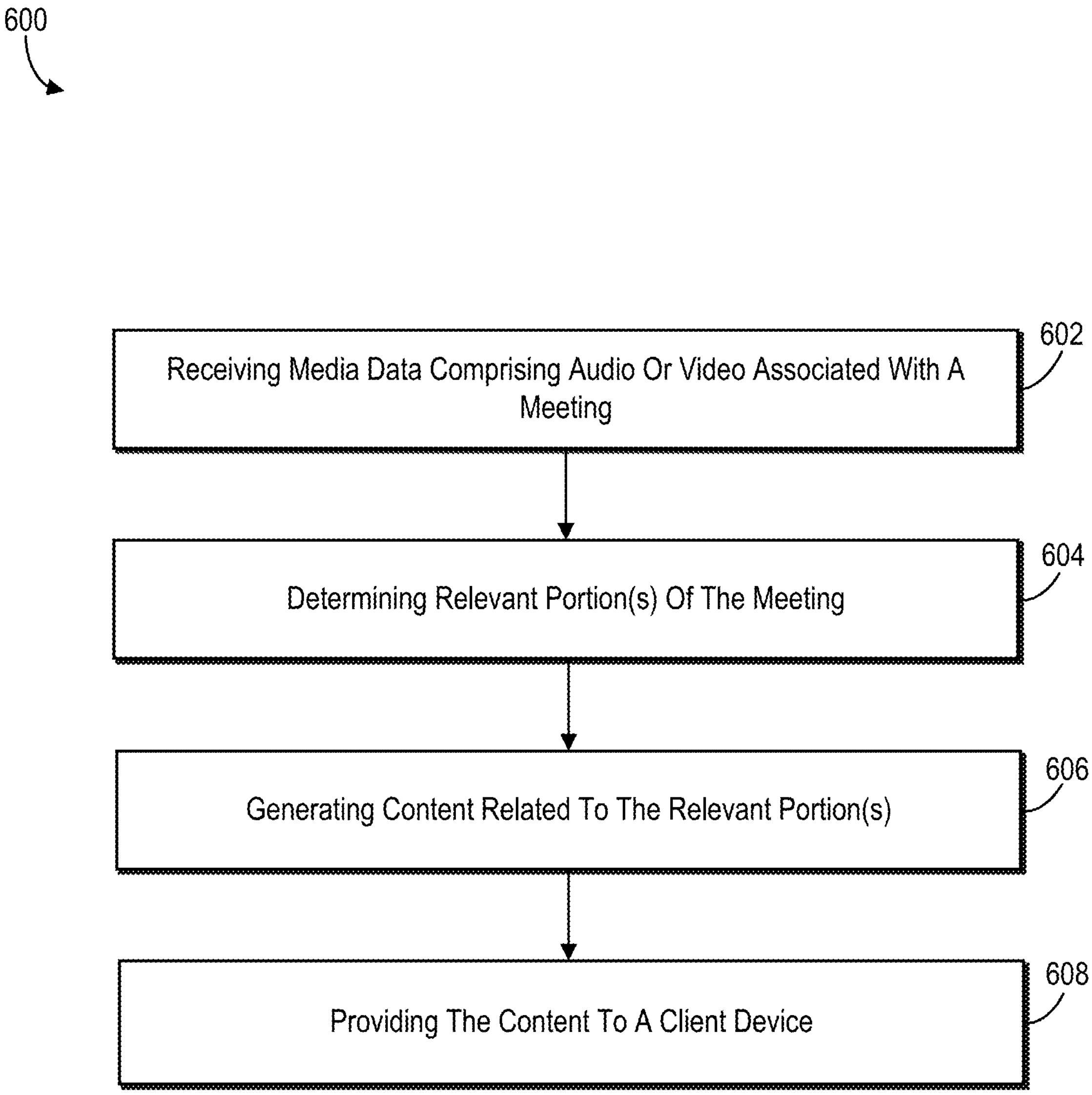
FIG. 6 illustrates a flowchart of a series of acts for generating meeting insights based on meeting data and client device inputs in accordance with one or more embodiments.

Turning now to FIG. 6, this figure illustrates a flowchart of a series of acts 600 of generating meeting insights from media data and device input data in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

The series of acts 600 includes an act 602 of receiving media data comprising audio or video associated with a meeting. For example, act 602 involves receiving, by a digital content management system, media data from one or more client devices, the audio data comprising at least one of audio or video associated with a meeting. The media data can include audio recorded by the one or more client devices during the meeting in connection with a client application associated with the digital content management system.

The series of acts 600 also includes an act 604 of determining relevant portion(s) of the meeting. For example, act 604 involves analyzing, by the digital content management system, the media data and one or more user inputs detected by one or more client devices during the meeting to determine one or more relevant portions of the meeting. For instance, act 604 can involve determining a portion of the media data that includes an action item for the user to perform based on at least one of a timing of a detected user input by the user, a mention of the user in the media data, or one or more comments made by the user in the media data. Act 604 can also involve determining a portion of the audio data that includes information for the user to review at a later time. For example, the one or more relevant portions of the meeting can comprise portions of media data specific to the user or marked as important by the user.

Act 604 can involve identifying a user input detected by a client device of the one or more client devices and determining a timing of the detected user input. Act 604 can then involve determining a portion of the media data corresponding to the timing of detected user input. Act 604 can then involve analyzing the portion of the media data corresponding to the timing of detected user input. The detected user input can include a touch input at the client device detected by an accelerometer during the meeting, a gesture or movement by a user detected by an image capture device of the client device during the meeting, or an audio indicator detected by a microphone device of the client device to mark a corresponding portion of the meeting as important to the user. Additionally, the one or more user inputs detected by the one or more client devices can include data from a touch screen, a mouse, a keyboard, or a biometric sensor of the one or more client devices.

Act 604 can involve identifying a plurality of user inputs detected by a plurality of client devices at an identified time of the meeting, the plurality of user inputs comprising keyboard inputs indicating that a plurality of attendees of the meeting are taking notes at the identified time. Act 604 can further involve determining a portion of the media data or materials for the meeting corresponding to the identified time, the materials comprising one or more content items presented during the meeting or generated during the meeting.

Act 604 can involve analyzing the media data using natural language processing to detect a word or phrase in the audio indicating information relevant to the user associated with the meeting. Act 604 can then involve determining a portion of the media data corresponding to the detected word or phrase and generating content related to the portion of the media data corresponding to the detected word or phrase.

Act 604 can also involve analyzing materials for the meeting comprising one or more content items presented during the meeting or generated during the meeting. For example, act 604 can involve analyzing text documents, video data, images, or slides associated with the meeting to determine one or more portions of the materials that are relevant to one or more users.

As part of act 604, or as an additional act, the series of acts 600 can include analyzing the media data using natural language processing to determine a context of the meeting. The series of acts 600 can then include selecting the user from a plurality of users based on a user profile of the user including information associated with the context of the meeting.

Additionally, the series of acts 600 includes an act 606 of generating content related to the relevant portion(s) of the meeting. For example, act 606 involves generating, by the digital content management system in response to determining the one or more relevant portions of the meeting, content related to the one or more relevant portions of the meeting. Act 606 can also involve generating a summary of the one or more relevant portions of the media data. Act 606 can involve generating customized summaries for a plurality of users based on different relevant portions of the media data for the plurality of users.

Furthermore, the series of acts 600 includes an act 608 of providing the content to a client device. For example, act 608 involves providing, by the digital content management system, the content related to the one or more relevant portions of the meeting to a client device of a user associated with the meeting. Act 608 can involve providing a notification including meeting moderation insights for display within a client application of a meeting presenter during the meeting.

The series of acts 600 can also include training a machine-learning model using a training dataset comprising media data and generated content associated with one or more meetings. Additionally, the series of acts 600 can include utilizing the trained machine-learning model to generate the content related to the one or more relevant portions of the media data. The series of acts 600 can then include generating one or more electronic messages to send to one or more client devices of the one or more users associated with the second meeting.

In addition or in the alternative to the foregoing, One or more embodiments of the present disclosure include a digital transcription system that generates improved digital transcripts by utilizing a digital transcription model that analyzes dynamic meeting context data. For instance, the digital transcription system can generate a digital transcription model to automatically transcribe audio from a meeting based on documents associated with meeting participants; digital collaboration graphs reflecting connections between participants, interests, and organizational structures; digital event data; and other user features corresponding to meeting participants. In some embodiments, the digital transcription system utilizes meeting context data to dynamically generate a digital lexicon specific to a particular meeting and/or participants and then utilizes the digital lexicon to accurately decipher audio data in generating a digital transcript. By utilizing meeting context data, the digital transcription system can efficiently and flexibly generate accurate digital transcripts.

To illustrate, in one or more embodiments, the digital transcription system receives an audio recording of a meeting between multiple participants. In response, the digital transcription system identifies a user that participated in the meeting. For the identified user (e.g., meeting participant), the digital transcription system determines digital documents (i.e., meeting context data) corresponding to the user. In addition, the digital transcription system utilizes a digital transcription model to generate a digital transcript based on the audio recording of the meeting and the digital documents of the user (and other users, as described below).

As mentioned, in some instances the digital transcription system utilizes a digital lexicon (e.g., lexicon list) to generate a digital transcript of a meeting. For example, the digital transcription system emphasizes words from the digital lexicon when transcribing an audio recording of the meeting. In various embodiments, the digital transcription model of the digital transcription system generates the digital lexicon from meeting context data (e.g., digital documents, client features, digital event details, and a collaboration graph) corresponding to one or more users that participated in the meeting. In alternative embodiments, the digital transcription system trains and utilizes a digital lexicon neural network to generate the digital lexicon.

In one or more embodiments, the digital transcription system dynamically generates multiple digital lexicons that correspond to different meeting subjects. Then, upon determining a given meeting subject for an audio recording (or portion of a recording), the digital transcription system can access and utilize the corresponding digital lexicon that matches the determined meeting subject. By having a digital lexicon that includes words that correspond to the context of a meeting, the digital transcription system can automatically create highly accurate digital transcripts of the meeting (i.e., with little or no user involvement).

In one or more embodiments, the digital transcription system utilizes the digital transcription model to generate the digital transcript directly from meeting context data (i.e., without generating an intermediate digital lexicon). For example, in one or more embodiments, the digital transcription system provides audio data of a meeting along with meeting context data to the digital transcription model. The digital transcription system then generates the digital transcript. To illustrate, in some embodiments, the digital transcription system trains a digital transcription neural network as part of the digital transcription model to generate a digital transcript based on audio data of the meeting as well as meeting context data.

When training a digital transcription neural network, in various embodiments, the digital transcription system generates training data from meeting context data. For example, utilizing digital documents gathered from one or more users of an organization, the digital transcription system can create synthetic text-to-speech audio data of the digital documents as training data. The digital transcription system feeds the synthetic audio data to the digital transcription neural network along with the meeting context data from the one or more users. Further, the digital transcription system compares the output transcript of the audio data to the original digital documents. In some embodiments, the digital transcription system continues to train the digital transcription neural network with user feedback.

As mentioned above, the digital transcription system can utilize meeting context data corresponding to a meeting participant (e.g., a user). Meeting context data for a user can include user digital documents maintained by a content management system. For example, meeting context data can include user features, such as a user's name, profile, job title, job position, workgroups, assigned projects, etc. Additionally, meeting context data can include meeting agendas, participant lists, discussion items, assignments, and/or notes as well as calendar events (i.e., meeting event items). In addition, meeting context data can include event details, such as location, time, duration, and/or subject of a meeting. Further, meeting context data can include a collaborative graph that indicate relationships between users, projects, documents, locations, etc. For instance, the digital transcription system identifies the meeting context data of other meeting participants based on the collaborative graph.

Upon transcribing a digital transcript, the digital transcription system can provide the digital transcript to one or more users, such as meeting participants. Depending on the permissions of the requesting user, the digital transcription system may determine to provide a redacted version of a digital transcript. For example, in some embodiments, while transcribing audio data of a meeting, the digital transcription system detects portions of the meeting that include sensitive information. In response to detecting sensitive information, the digital transcription system can redact the sensitive information from a copy of a digital transcript before providing the copy to the requesting user.

As explained above, the digital transcription system provides numerous advantages, benefits, and practical applications over conventional systems and methods. For instance, the digital transcription system can improve accuracy relative to conventional systems. More particularly, the digital transcription system can significantly reduce the number of errors in digital transcripts. Thus, by utilizing meeting context data, the digital transcription system can more accurately identify words and phrases from an audio stream in generating a digital transcript. For example, the digital transcription system can determine the subject of a meeting and utilize contextual relevant lexicons when transcribing the meeting. Further, the digital transcription system can recognize and correctly transcribe uncommon, unique, or made-up words used in a meeting.

As a result of the improved accuracy to digital transcripts, the digital transcription system also improves efficiency relative to conventional systems. In particular, the digital transcription system can reduce the amount of computational waste that conventional systems cause when generating digital transcripts and revising errors in digital transcripts. For instance, both processing resources and memory are preserved by generating accurate digital transcripts that require fewer user interactions and interfaces to review and revise. Further, the improved accuracy to digital transcripts reduces, and in many cases eliminates, the time and resources previously required for users to listen to and correct errors in the digital transcript.

Further, the digital transcription system provides increase flexibility over otherwise rigid conventional systems. More specifically, the digital transcription system can flexibly adapt to transcribe meetings corresponding to a wide scope of contexts while maintaining a high precision of accuracy. In contrast, conventional systems are limited to predefined vocabularies that commonly do not include (or flexibly emphasize) the subject matter discussed in particular meetings with particular participants. In addition, the digital transcription system can determine and utilize dynamic meeting context data that changes for particular participants, particular meetings, and particular times. For example, the digital transcription system can generate a first digital lexicon specific to a first set of meeting context data (e.g., a meeting with a participant and an accountant) and a second digital lexicon specific to second meeting context data (e.g., a meeting with the participant and an engineer).

As illustrated by the foregoing discussion, the present disclosure utilizes a variety of terms to describe features and advantages of the digital transcription system. Additional detail is now provided regarding these and other terms used herein. For example, as used herein, the term "meeting" refers to a gathering of users to discuss one or more subjects. In particular, the term "meeting" includes a verbal or oral discussion among users. A meeting can occur at a single location (e.g., a conference room) or across multiple locations (e.g., a teleconference or web-conference). In addition, while a meeting often includes verbal discussion among two or more speaking users, in some embodiments, a meeting includes one user speaking.

As mentioned, meetings include meeting participants. As used herein, the term "meeting participant" (or simply "participant") refers to a user that attends a meeting. In particular, the term "meeting participant" includes users who speak at a meeting as well as users that attend a meeting without speaking. In some embodiments, a meeting participant includes users that are scheduled to attend or have accepted an invitation to attend a meeting (even if those users do not attend the meeting).

The term "audio data" (or simply "audio") refers to an audio recording of at least a portion of a meeting. In particular, the term "audio data" includes captured audio or video of one or more meeting participants speaking at a meeting. Audio data can be captured by one or more computing devices, such as a client device, a telephone, a voice recorder, etc. In addition, audio data can be stored in a variety of formats.

Further, the term "meeting context data" refers to data or information associated with one or more meetings. In particular, the term "meeting context data" includes digital documents associated with a meeting participant, user features of a participant, and/or event details (e.g., location, time, etc.). In addition, meeting context data includes relational information between a user and digital documents, other users, projects, locations, etc., such as relational information indicated from a collaboration graph. Meeting context data can also include a meeting subject.

As used herein, the term "meeting subject" (or "subject") refers to the theme, content, purpose, and/or topic of a meeting. In particular, the term "meeting subject" includes one or more topics, items, assignments, questions, concerns, areas, issues, projects, and/or matters discussed in a meeting. In many embodiments, a meeting subject relates to a primary focus of a meeting which meeting participants discuss. Additionally, meeting subjects can vary in scope from broad meeting subjects to narrow meeting subjects depending on the purpose of the meeting.

As used herein, the term "digital documents" refers to one or more electronic files. In particular, the term "digital documents" includes electronic files maintained by a digital content management system that stores and/or synchronizes files across multiple computing devices. In many embodiments, a user (e.g., meeting participant) is associated with one or more digital documents. For example, the user creates, edits, accesses, and/or manages one or more digital documents maintained by a digital content management system. For instance, the digital documents include metadata that tag the user with permissions to read, write, or otherwise access a digital document. A digital document can also include a previously generated digital lexicon corresponding to a meeting or user.

Additionally, the term "user features" refers to information describing a user or characteristics of a user. In particular, the term "user features" includes user profile information for a user. Examples of user features include a user's name, company name, company location, job position, job description, team assignments, project assignments, project descriptions, job history, awards, achievements, etc. Additional examples of user features can include other user profile information, such as biographical information, social information, and/or demographical information. In many embodiments, gathering and utilizing user features is subject to consent and approval (e.g., privacy settings) set by the user.

As mentioned above, the digital transcription system generates a digital transcript. As used herein, the term "digital transcript" refers to a written record of a meeting. In particular, the term "digital transcript" includes a written copy of words spoken at a meeting by one or more meeting participants. In various embodiments, a digital transcript is organized chronologically as well as divided by speaker. A digital transcript is often stored in a digital document, such as a in text file format that can be searched by keyword or searched phonetically.

In various embodiments, the digital transcription system creates and/or utilizes a digital lexicon to generate a digital transcript of a meeting. As used herein, the term "digital lexicon" refers to a specialized vocabulary (e.g., terms corresponding to a given subject, topic, or group). In particular, the term "digital lexicon" refers to a list of words that correspond to a meeting and/or participant. For instance, a digital lexicon includes original and uncommon words or jargon-specific language relating to a subject, topic, or matter being discussed at a meeting (or used by a participant or entity). A digital lexicon can also include acronyms and other abbreviations.

As mentioned above, the digital transcription system can utilize machine learning and various neural networks in various embodiments to generate a digital transcript. The term "machine learning," as used herein, refers to the process of constructing and implementing algorithms that can learn from and make predictions on data. In general, machine learning may operate by building models from example inputs, such as audio data and/or meeting context data, to make data-driven predictions or decisions. Machine learning can include one or more machine-learning models and/or neural networks (e.g., a digital transcription model, a digital lexicon neural network, a digital transcription neural network, and/or a transcript redaction neural network).

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data (e.g., transcription training data) to tune parameters of the neural network. For example, a neural network can include a convolutional neural network, a recurrent neural network (e.g., an LSTM), or an adversarial neural network (e.g., a generative adversarial neural network).

United States Provisional Application titled GENERATING CUSTOMIZED MEETING INSIGHTS BASED ON USER INTERACTIONS AND MEETING MEDIA, filed Jun. 24, 2019, and Unites States Provisional Application titled UTILIZING VOLUME-BASED SPEAKER ATTRIBUTION TO ASSOCIATE MEETING ATTENDEES WITH DIGITAL MEETING CONTENT, filed Jun. 24, 2019, are each hereby incorporated by reference in their entireties.

Additional detail will now be provided regarding the digital transcription system in relation to illustrative figures portraying example embodiments and implementations of the digital transcription system. To illustrate, FIG. 7 includes an embodiment of an environment 700, in which a digital transcription system 704 can operate. As shown, the environment 700 includes a server device 701 and client devices 708*a*-708*n* in communication via a network 714. Optionally, in one or more embodiments, the environment 700 also includes a third-party system 716. Additional description regarding the configuration and capabilities of the computing devices included in the environment 700 are provided below in connection with FIG. 17.

As illustrated, the server device 701 includes a content management system 102 that hosts the digital transcription system 704. Further, as shown, the digital transcription system includes a digital transcription model 706. In general, the content management system 102 manages digital data (e.g., digital documents or files) for a plurality of users. In many embodiments, the content management system 102 maintains a hierarchy of digital documents in a cloud-based environment (e.g., on the server device 701) and provides access to given digital documents for users on local client devices (e.g., the client device 708*a*-708*n*). Examples of content management systems include, but are not limited to, DROPBOX, GOOGLE DRIVE, and MICROSOFT ONEDRIVE.

The digital transcription system 704 can generate digital transcripts from audio data of a meeting. In various embodiments, the digital transcription system 704 receives audio data from a client device, analyzes the audio data in connection with meeting context data utilizing the digital transcription model 706, and generates a digital transcript. Additional detail regarding the digital transcription system 704 generating digital transcripts utilizing the digital transcription model 706 is provided below with respect to FIGS. 8-18.

As mentioned above, the environment 700 includes client devices 708*a*-708*n*. Each of the client devices 708*a*-708*n* includes a corresponding client application 710*a*-710*n*. In various embodiments, a client application communicates audio data captured by a client device to the digital transcription system 704. For example, the client applications 710*a*-710*n* can include a meeting application, video conference application, audio application, or other application that allows the client devices 708*a*-708*n* to record audio/video as well as transmit the recorded media to the digital transcription system 704.

To illustrate, during a meeting, a meeting participant uses a first client device 708*a* to capture audio data of the meeting. For example, the first client device 708*a* (e.g., a conference telephone or smartphone) captures audio data utilizing a microphone 712 associated with the first client device 708*a*. In addition, the first client device 708*a* sends (e.g., in real time or after the meeting) the audio data to the digital transcription system 704. In additional embodiments, another client device (e.g., client device 708*n*) captures data related to user inputs detected during the meeting. For instance, a meeting participant utilizes a laptop client device to take notes during a meeting. In some embodiments, more than one client device provides audio data to the digital transcription system 704 and/or allows users to provide input during the meeting.

As shown, the environment 700 also includes an optional third-party system 716. In one or more embodiments, the third-party system 716 provides the digital transcription system 704 assistance in transcribing audio data into digital transcripts. For example, the digital transcription system 704 utilizes audio processing capabilities from the third-party system 716 to analyze audio data based on a digital lexicon generated by the digital transcription system 704. While shown as a separate system in FIG. 7, in various embodiments, the third-party system 716 is integrated within the digital transcription system 704.

Figure 7:
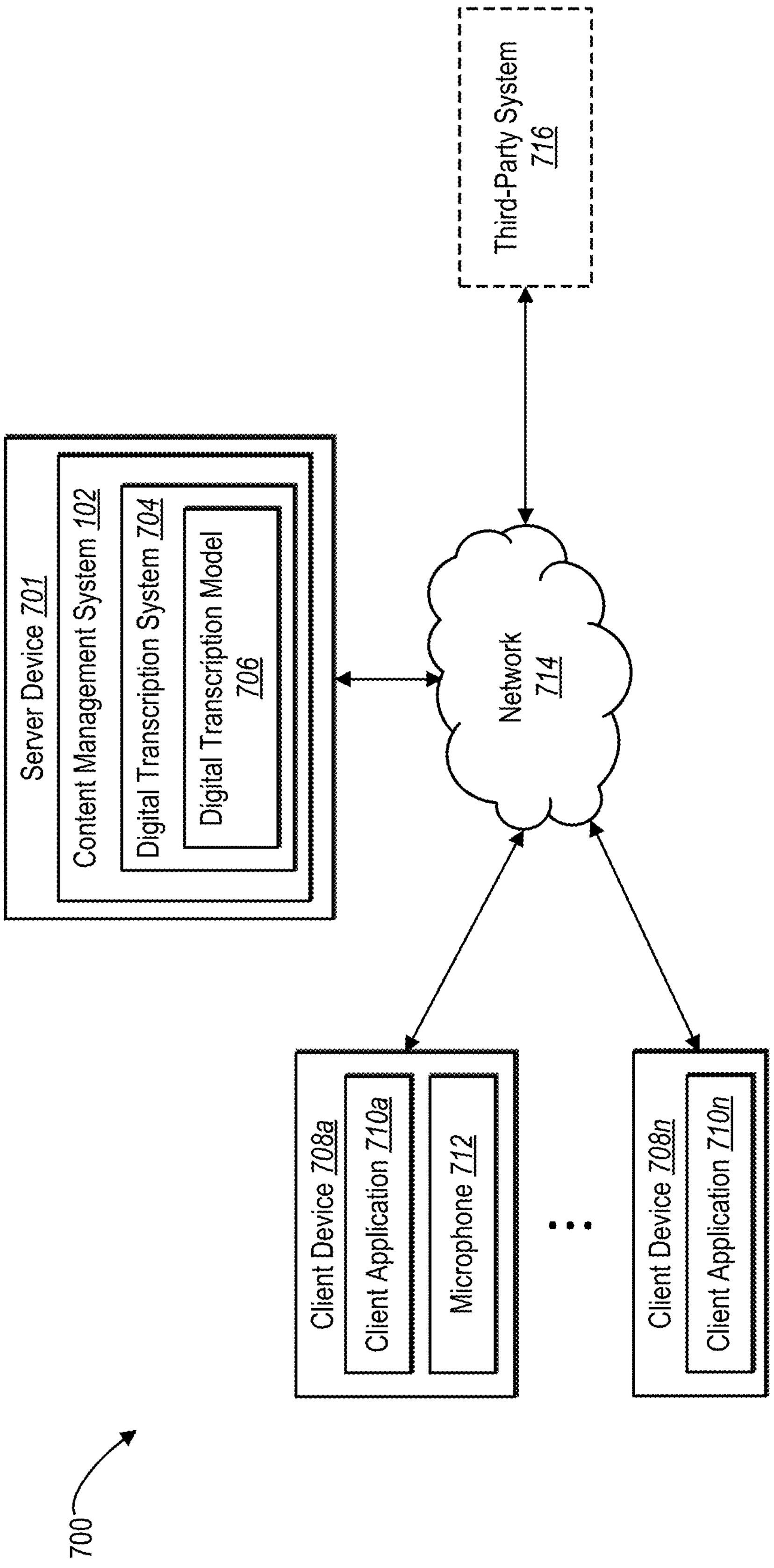
FIG. 7 illustrates a schematic diagram of an environment in which a content management system having a digital transcription system operates in accordance with one or more embodiments.

Although the environment 700 of FIG. 7 is depicted as having a small number of components, the environment 700 may have additional or alternative components as well as alternative configurations. As one example, digital transcription system 704 can be implemented on or across multiple computing devices. As another example, the digital transcription system 704 may be implemented in whole by the server device 701 or the digital transcription system 704 may be implemented in whole by the first client device 708*a*. Alternatively, the digital transcription system 704 may be implemented across multiple devices or components (e.g., utilizing both the server device 701 and one or more client devices 708*a*-708*n*).

Figure 8:
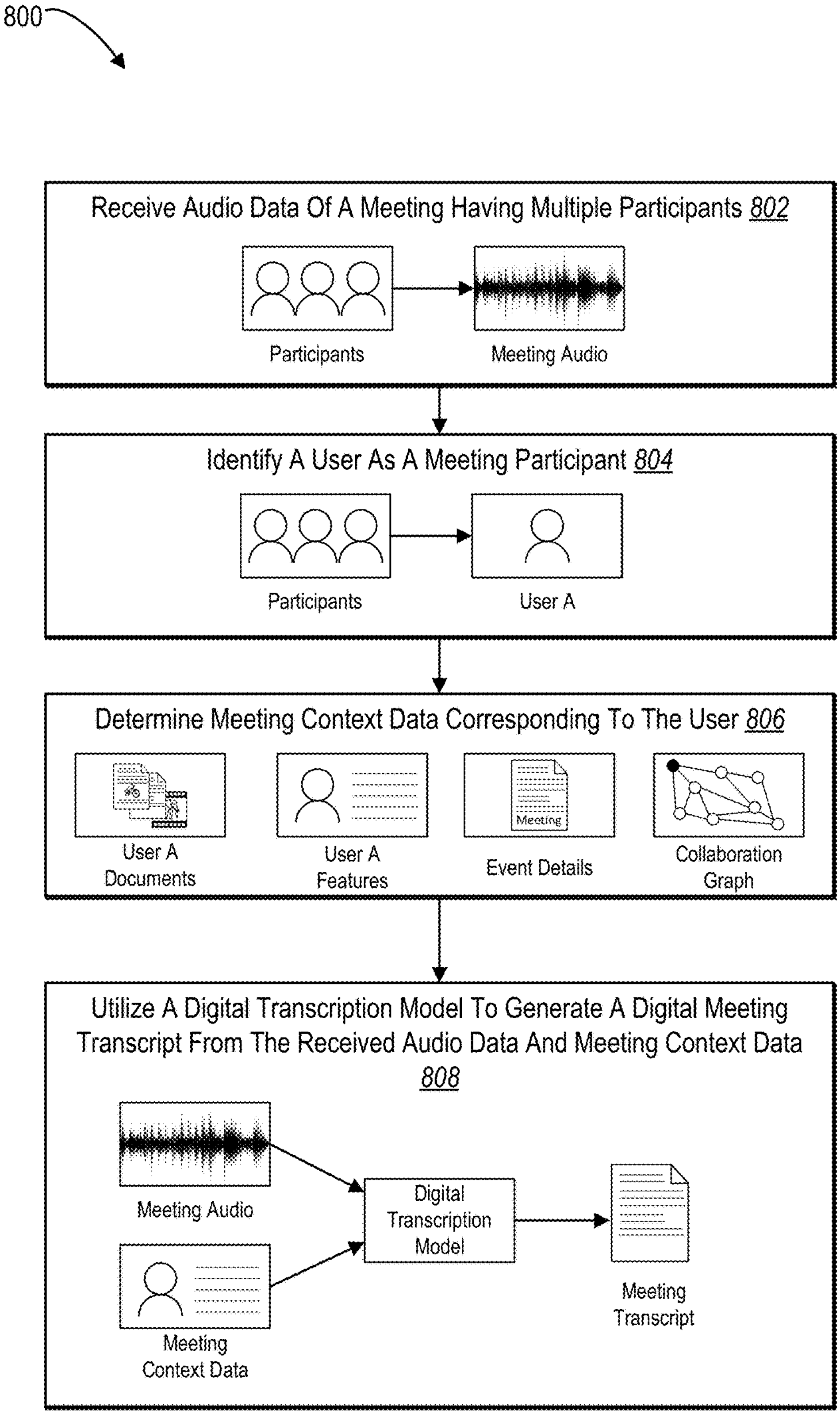
FIG. 8 illustrates a schematic diagram of generating a digital transcript of a meeting utilizing a digital transcription model in accordance with one or more embodiments.

As mentioned above, the digital transcription system 704 can generate digital transcripts from audio data and meeting context data. In particular, FIG. 8 illustrates a series of acts 800 by which the digital transcription system 704 generates a digital meeting transcript. The digital transcription system 704 can be implemented by one or more computing devices, such as one or more server devices (e.g., server device 701), one or more client devices (e.g., client device 708*a*-708*n*), or a combination of server devices and client devices.

As shown in FIG. 8, the series of acts 800 includes the act 802 of receiving audio data of a meeting having multiple participants. For example, multiple users meet to discuss one or more topics and record the audio data of the meeting on a client device, such as a telephone, smartphone, laptop computer, or voice recorder. The digital transcription system 704 then receives the audio from the client device.

In addition, the series of acts 800 includes the act 804 of identifying a user as a meeting participant. In one or more embodiments, the digital transcription system 704 identifies one of the meeting participants in response to receiving audio data of the meeting. In alternative embodiments, the digital transcription system 704 identifies one or more meeting participants before the meeting occurs, for example, upon a user creating a meeting invitation or a calendar event for the meeting. In various embodiments, the digital transcription system 704 identifies one or more meeting participants based on digital documents and/or event details, as further described below.

Further, the series of acts 800 includes the act 806 of determining meeting context data. In particular, upon identifying a user as a meeting participant, the digital transcription system 704 can identify and access meeting context data associated with the user. For example, meeting context data can include digital documents and/or user features corresponding to a meeting participant. In addition, meeting context data can include event details and/or a collaboration graph.

In one or more embodiments, the digital transcription system 704 accesses digital documents stored on a content management system associated with the user. In addition, the digital transcription system 704 can access user features of the user as well as event details (e.g., from a meeting agenda, digital event item, or meeting notes). In some embodiments, the digital transcription system 704 can also access a collaboration graph to determine where to obtain additional data relevant to the meeting. Additional detail regarding meeting context data is provided in connection with FIGS. 10A, 11A, 12, and 14.

As shown, the series of acts 800 also includes the act 808 of utilizing a digital transcription model to generate a digital meeting transcript from the received audio data and meeting context data. In one or more embodiments, the digital transcription system 704 generates and/or utilizes a digital transcription model (e.g., the digital transcription model 706) that generates a digital lexicon based on the meeting context data. The digital transcription system 704 then utilizes the digital lexicon to improve the word recognition accuracy of the digital meeting transcript. For example, the digital transcription system 704 utilizes the digital transcription model and the digital lexicon to accurately transcribe the audio. In another example, the digital transcription system 704 utilizes a third-party system to transcribe the audio utilizing the digital lexicon (e.g., third-party system 716).

In one or more embodiments, the digital transcription system 704 trains a digital lexicon neural network (i.e., a digital transcription model) to generate the digital lexicon for a meeting. For example, the digital transcription system 704 trains a neural network to receive meeting context data associated with a meeting or meeting participant and output a digital lexicon. Additional detail regarding utilizing a digital transcription model and/or a digital lexicon neural network to generate a digital lexicon is provided below in connection with FIGS. 10A-10B.

In some embodiments, the digital transcription system 704 creates and/or utilizes a digital transcription model that directly generates the digital meeting transcript from audio data and meeting context data. For example, the digital transcription system 704 utilizes meeting context data associated with a meeting or a meeting participant to generate a highly accurate digital meeting transcript along with audio data of the meeting. In one or more embodiments, the digital transcription system 704 trains a digital transcription neural network (i.e., a digital transcription model) to generate the digital meeting transcription from audio data and meeting context data. Additional detail regarding utilizing a digital transcription model and/or a digital transcription neural network to generate digital meeting transcripts is provided below in connection with FIGS. 11A-11B.

Figure 9:
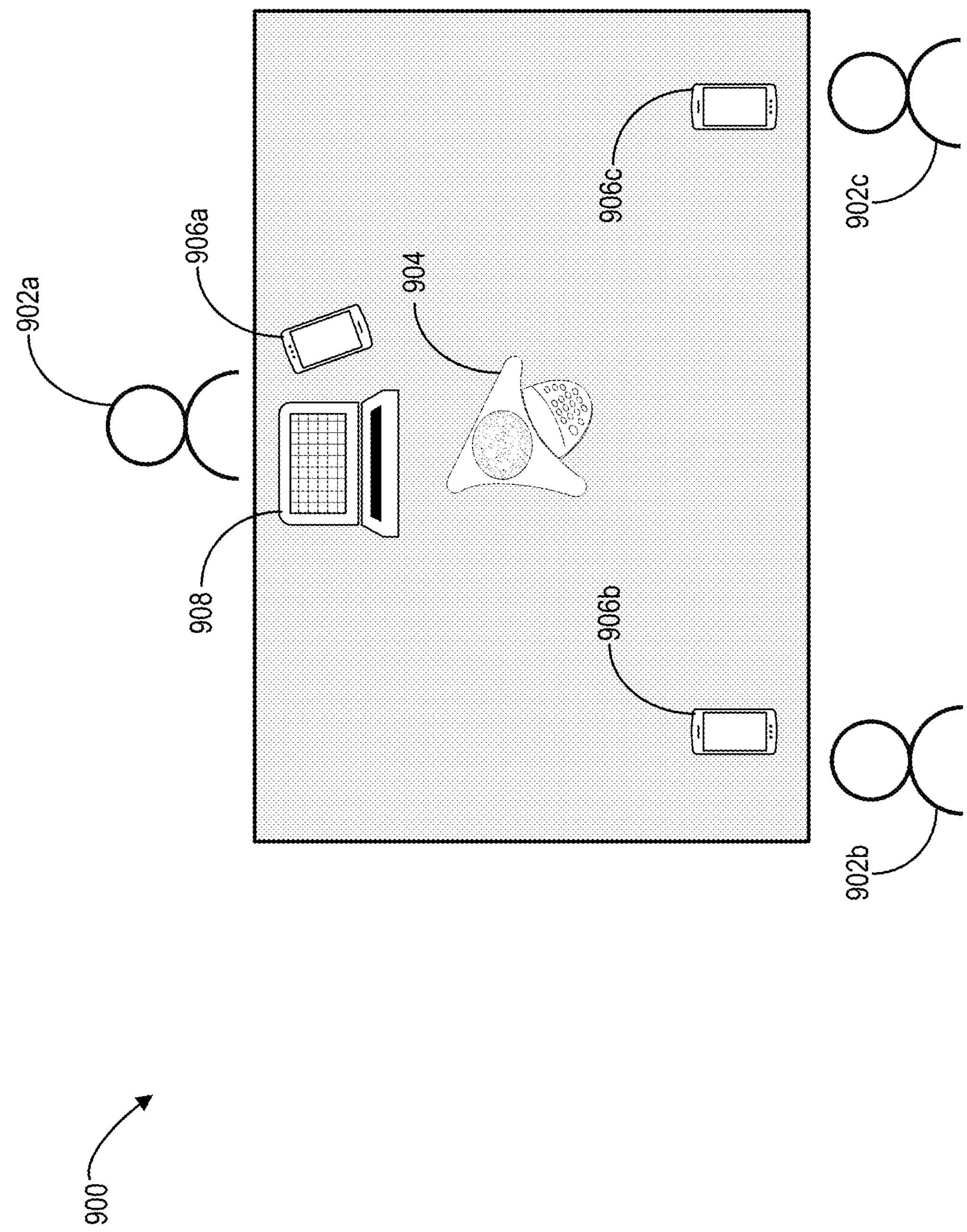
FIG. 9 illustrates a diagram of a meeting environment involving multiple users in accordance with one or more embodiments.

FIG. 9 illustrates a diagram of a meeting environment 900 involving multiple users in accordance with one or more embodiments. In particular, FIG. 9 shows a plurality of users 902*a*-902*c* involved in a meeting. During the meeting, each of the users 902*a*-902*c* can use one or more client devices during the meeting to record audio data and capture inputs (e.g., user inputs) via the client devices.

As shown, the meeting environment 900 includes multiple client devices. In particular, the meeting environment 900 includes a communication client device 904 associated with multiple users, such as a conference telephone device capable of connecting a call between the users 902*a*-902*c* and one or more remote users. The meeting environment 900 also includes handheld client devices 906*a*-906*c* associated with each of the users 902*a*-902*c*. Further, the meeting environment 900 also shows a portable client device 908 (e.g., laptop or tablet) associated with the first user 902*a*. Moreover, the meeting environment 900 can include additional client devices, such as a video client device that captures both audio and video (e.g., a webcam) and/or a playback client device (e.g., a television).

One or more of the client devices shown in the meeting environment 900 can capture audio data of the meeting. For instance, the third user 902*c* records the meeting audio using the third handheld client device 906*c*. In addition, one or more of the client devices can assist the users in participating in the meeting. For example, the second user 902*b* utilizes the second handheld client device 906*b* to view details associated with the meeting, access a meeting agenda, and/or take notes during the meeting.

Similarly, the users 902*a*-902*c* can use one or more of the client devices to run a client application that streams audio or video, sends and receives text communications (e.g., instant messaging and email), and/or shares information with other users (local and remote) during the meeting. For instance, the first user 902*a* provides supplemental materials or content to the other meeting participants during the meeting using the portable client device 908.

As shown in FIG. 9, a user can also be associated with more than one client device. For instance, the first user 902*a* is associated with the first handheld client device 906*a* and the portable client device 908. Further, the first user 902*a* is associated with communication the client device 904. Each client device can provide a different functionality to the first user 902*a* during a meeting. For example, the first user 902*a* utilizes the first handheld client device 906*a* to record the meeting or communicate with other meeting participants non-verbally. In addition, the first user 902*a* utilizes the portable client device 908 (e.g., laptop or tablet) to display information associated with the meeting (e.g., meeting agenda, slides, or other content) as well as take meeting notes.

In one or more embodiments, the digital transcription system 704 communicates with a client device (e.g., a client application on a client device) to obtain audio data and/or user input information associated with the meeting. For example, the second handheld client device 906*b* captures and provides audio to the digital transcription system 704 in real time or after the meeting. In another example, the third handheld client device 906*c* provides a copy of a meeting agenda to the digital transcription system 704 and/or provides notifications when the third user 902*c* interacted with the handheld client device 906*c* during the meeting. Also, as mentioned above, the portable client device 908 can provide, to the digital transcription system 704, metadata (e.g., timestamps) regarding the timing of each note with respect the meeting.

In some embodiments, a client device automatically records meeting audio data. For example, the communication client device 904 automatically records and temporarily stores meeting calls (e.g., locally or remotely). When the meeting ends, the digital transcription system 704 can prompt a meeting participant whether to keep and/or transcribe the recording. If the meeting participants requests a digital transcript of the meeting, in some embodiments, the digital transcription system 704 further prompts the user for meeting context data and/or regarding the sensitivity of the meeting. If the meeting is indicated as sensitive by the meeting participant (or automatically determined as sensitive by the digital transcription system 704, as described below), the digital transcription system 704 can locally transcribe the meeting. Otherwise, the digital transcription system 704 can generate a digital transcript of the meeting on a cloud computing device. In either case, the digital transcription system 704 can employ protective measures, such as encryption, to safeguard both the audio data and the digital transcript.

Similarly, the digital transcription system 704 can move, discard, or archive audio data and/or digital transcripts after a predetermined amount of time. For example, the digital transcription system 704 follows a document retention policy to process audio data that has not been accessed in over a year, for which a digital transcript exists. In some embodiments, the digital transcription system 704 redacts portions of the digital transcript (or audio data) after a predetermined amount of time. More information about redacting portions of a digital transcript is provided below in connection with FIG. 13.

As mentioned above, the digital transcription system 704 can receive audio data of the meeting from one or more client devices associated with meeting participants. For example, after the meeting, a client device that recorded audio data from the meeting synchronizes the audio data with the digital transcription system 704. In some embodiments, the digital transcription system 704 detects a user uploading audio from a meeting to the content management system 102 (e.g., by storing an audio data file in a folder that synchronizes with the content management system 102). In various embodiments, the audio is tagged with one or more timestamps, which the digital transcription system 704 can utilize to determine a correlation between a meeting, a meeting participant associated with the client device providing the audio.

Once the digital transcription system 704 obtains the audio data (and any device input data), the digital transcription system 704 can initiate the transcription process. As explained below in detail, the digital transcription system 704 can provide the audio data and meeting context data for at least one of the meeting participants to a digital transcription model, which generates a digital transcript of the meeting. Further, the digital transcription system 704 can provide a copy of the digital transcript to one or more meeting participants and/or store the digital transcript in a shared folder accessible by the meeting participants.

Turning now to FIGS. 10A-11B, additional detail is provided regarding the digital transcription system 704 creating and utilizing a digital transcription model to generate a digital transcript from audio data of a meeting. As mentioned above, the digital transcription system 704 can create, train, tune, execute, and/or update a digital transcription model to generate a highly accurate digital transcript of a meeting from audio data and meeting context data associated with a meeting participant. In some instances, the digital transcription model generates a digital lexicon based on meeting context data to improve the accuracy of the digital transcription of the meeting (e.g., FIGS. 10A-10B). In other instances, the digital transcription model directly generates a digital transcript based on audio data of a meeting and meeting context data associated with a meeting participant (e.g., FIGS. 11A-11B).

Figure 10A:
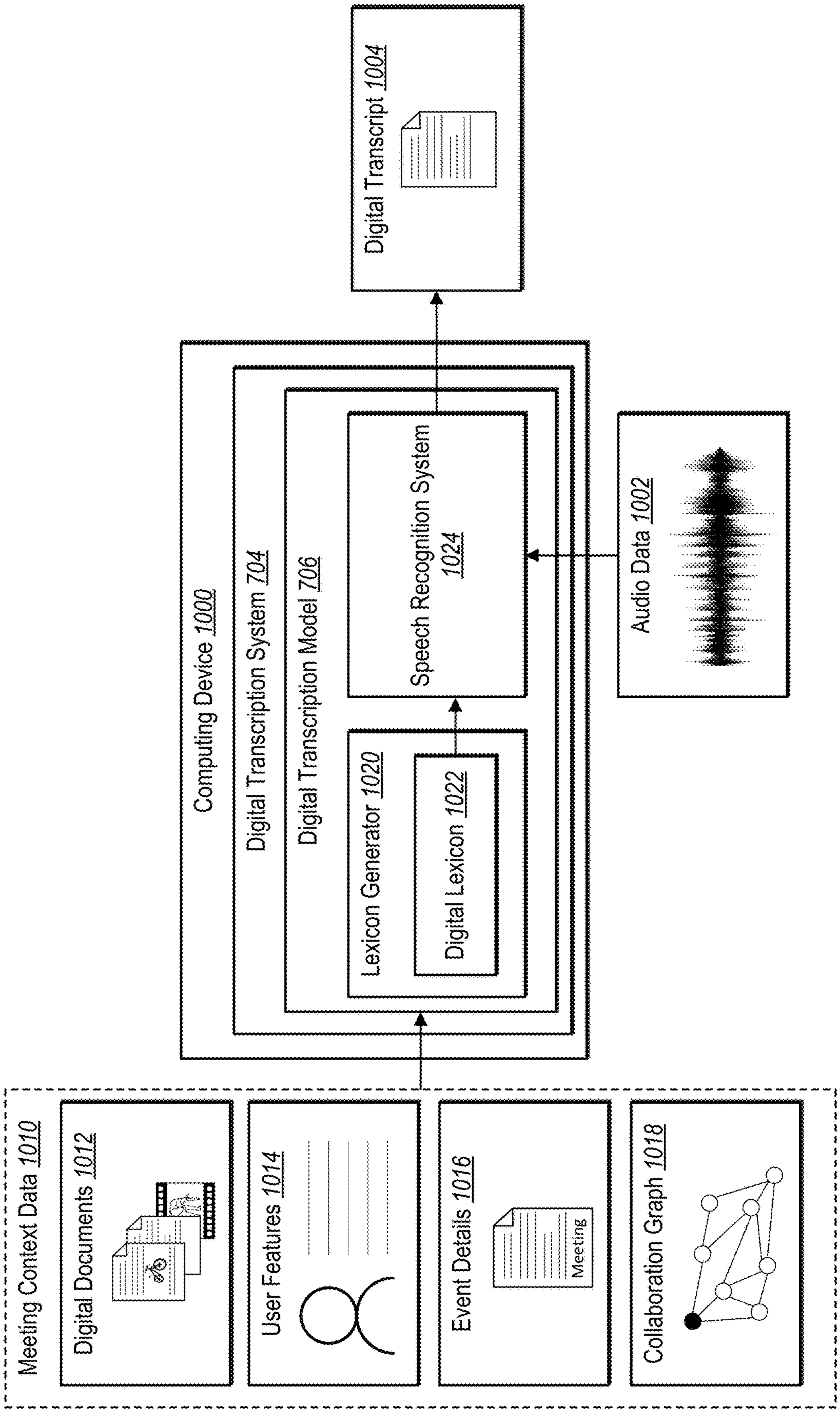
FIG. 10A illustrates a block diagram of utilizing a digital lexicon created by a digital transcription model to generate a digital transcript in accordance with one or more embodiments.

As shown, FIG. 10A includes a computing device 1000 having the digital transcription system 704. In various embodiments, the computing device 1000 can represent a server device as described above (i.e., the server device 701). In alternative embodiments, the computing device 1000 represents a client device (e.g., the first client device 308*a*).

As also shown, the digital transcription system 704 includes the digital transcription model 706, which has a lexicon generator 1020 and a speech recognition system 1024. In addition, FIG. 10A includes audio data 1002 of a meeting, meeting context data 1010, and a digital transcript 1004 of the meeting generated by the digital transcription model 706.

In one or more embodiments, the digital transcription system 704 receives the audio data 1002 and utilizes the digital transcription model 706 to generate the digital transcript 1004 based on the meeting context data 1010. More specifically, the lexicon generator 1020 within the digital transcription model 706 creates a digital lexicon 1022 for the meeting based on the meeting context data 1010 and the speech recognition system 1024 generates the digital transcript 1004 based on the audio data 1002 of the meeting and the digital lexicon 1022.

As mentioned above, the lexicon generator 1020 generates a digital lexicon 1022 for a meeting based on the meeting context data 1010. The lexicon generator 1020 can create the digital lexicon 1022 heuristically or utilizing a trained machine-learning model, as described further below. Before describing how the lexicon generator 1020 generates a digital lexicon 1022, additional detail is first provided regarding identifying a user as a meeting participant as well as the meeting context data 1010.

In various embodiments, when a user requests a digital transcript of audio data of a meeting, the digital transcription system 704 prompts the user for meeting participants and/or event details. For example, the digital transcription system 704 prompts the user whether they attended the meeting and/or other users that attended the meeting. In some embodiments, the digital transcription system 704 prompts the user via a client application on the user's client device (e.g., client application 110*a*), which also facilitates uploading the audio data 1002 of the meeting to the digital transcription system 704.

In alternative embodiments, the digital transcription system 704 can automatically identify meeting participants and/or event details upon receiving the audio data 1002. In one or more embodiments, the digital transcription system 704 identifies the user that created and/or submitted the audio data 1002 to the digital transcription system 704. For example, the digital transcription system 704 looks up the client device that captured the audio data 1002 and determines which user is associated with the client device. In another example, the digital transcription system 704 identifies a user identifier from the audio data 1002 corresponding to the user that created and/or provided the audio data 1002 to the digital transcription system 704. In a further example, the user captures the audio data 1002 within a client application on a client device where the that the user is logged in to the client application.

In various embodiments, the digital transcription system 704 can determine the meeting and/or a meeting participant based on correlating meetings and/or user data to the audio data 1002. For example, in one or more embodiments, the digital transcription system 704 accesses a lists of meetings and correlates timestamp information from the audio data 1002 to determine the given meeting from the list of meetings and, in some cases, meeting participants. In other embodiments, the digital transcription system 704 accesses digital calendar items of users within an organization or company and correlates a scheduled meeting time with the audio data 1002.

In additional and/or alternative embodiments, the digital transcription system 704 identifies location data from the audio data 1002 indicating where the audio data 1002 was created and correlates the location of meetings (e.g., indicated in digital calendar items) and/or users (e.g., indicated from a user's client device). In various embodiments, the digital transcription model 706 utilizes speech recognition to identify a participant's voice from the audio data 1002 to determine that the user was a meeting participant.

Upon identifying one or more users as a meeting participant that correspond to the audio data 1002, the digital transcription system 704 can determine meeting context data 1010 associated with the one or more meeting participants. In one or more embodiments, the digital transcription system 704 determines the meeting context data 1010 associated with a meeting participant upon receiving the audio data 1002 of a meeting. In alternative embodiments, the digital transcription system 704 accesses the meeting context data 1010 associated with a user prior to a meeting.

As shown, the meeting context data 1010 includes digital documents 1012, user features 1014, event details 1016, and a collaboration graph 1018. In one or more embodiments, the digital documents 1012 associated with a user include all of the documents in an organization (i.e., an entity) that are accessible (and/or authored/co-authored) by the user. For instance, the documents for an organization are maintained on a content management system. The user may have access to a subset or portion of those documents. For example, the user has access to documents associated with a first project but not documents associated with a second project. In one or more embodiments, the content management system utilizes metadata tags or other labels to indicate which of the documents within the organization are accessible by the user.

The digital documents 1012 associated with a user can include other documents associated with the user. For example, the digital documents 1012 include documents collaborated upon between sets of multiple users, of which the user is a co-author, a collaborator, or a participant. In various embodiments, the digital documents 1012 can include electronic messages (e.g., emails, instant messages, text messages, etc.) of the user and/or media attachments included in electronic messages. In addition, in some embodiments, the digital documents 1012 can include web links or files associated with a user (e.g., a user's browser history).

In various embodiments, upon accessing the digital documents 1012 associated with a user, the digital transcription system 704 can filter the digital documents 1012 based on meeting relevance. For instance, in one or more embodiments, the digital transcription system 704 identifies digital documents 1012 of the user that are associated with the meeting. For example, the digital transcription system 704 identifies the digital documents 1012 of the user that correspond to the event details 1016. In some embodiments, the digital transcription system 704 filters digital documents based on recency, folder location, labels, tags, keywords, user associations, etc. In addition, the digital transcription system 704 can identify/filter digital documents based on a meeting participant authoring, editing, sharing, or viewing a digital document.

As shown, the meeting context data 1010 includes user features 1014. In various embodiments, the user features 1014 associated with a user include user profile information, company information, user accounts, and/or client devices. For example, the user features 1014 of a user include user profile information such as the user's name, biographical information, social information, and/or demographical information. In addition, the user features 1014 of a user include company information (i.e., entity information) of the user such as the user's company name, company location, job title, job position within the company, job description, team assignments, project assignments, project descriptions, job history.

Further, the user features 1014 of a user can include accounts and affiliations of the user as well as a record of client devices associated with the user. For example, the user may be a member of an engineering society or a sales network. As another example, the user may have accounts with one or more services or applications. Additionally, the user may be associated with personal client devices, work client devices, handheld client devices, etc. In some embodiments, the digital transcription system 704 utilizes these user features 1014 to identify additional digital documents 1012 associated with the user and/or to detect additional user features 1014.

In addition, the meeting context data 1010 includes event details 1016. In one or more embodiments, the event details 1016 includes locations, time, duration, and/or subject. The digital transcription system 704 can identify event details 1016 from a digital event item (e.g., a calendar event), meeting agendas, participant lists, and/or meeting notes. To illustrate, a meeting agenda can indicate relevant context and information about a meeting such as a meeting occurrence (e.g., meeting date, location, and time), a participant list, and meeting items (e.g., discussion items, action items, and assignments). An example of a meeting agenda is provided below in connection with FIG. 12.

In addition, a meeting participant list can indicate users that were invited, accepted, attended, missed, arrived late, left, early, etc., as well as how users attended the meeting (e.g., in person, call in, video conference, etc.) Further, meeting notes can include notes provided by one or more users at the meeting, timestamp information associated with when one or more notes at the meeting were recorded, whether multiple users recorded similar notes, etc.

Further, in some embodiments, the event details 1016 includes calendar events (e.g., meeting event items) of a meeting, such as a digital meeting invitation. Often, a calendar event indicates relevant context and information about a meeting such as meeting title or subject, date and time, location, participants, agenda items, etc. In some cases, the information in the calendar event overlaps with the meeting agenda information. An example of a calendar event for a meeting is provided below in connection with FIG. 12.

As shown, the meeting context data 1010 includes the collaboration graph 1018. In general, the collaboration graph 1018 provides relationships between users, projects, interests, organizations, documents, etc. Additional description of the collaboration graph 1018 is provided below in connection with FIG. 14.

As mentioned above, the digital transcription system 704 utilizes the lexicon generator 1020 within the digital transcription model 706 to create a digital lexicon 1022 for a meeting, where the digital lexicon 1022 is generated based on the meeting context data 1010 of a meeting participant. More particularly, in various embodiments, the lexicon generator 1020 receives the meeting context data 1010 associated with a meeting participant. For instance, the lexicon generator 1020 receives digital documents 1012, user features 1014, event details 1016, and/or a collaboration graph 1018 associated with the meeting participant. Utilizing the content of the meeting context data 1010, the lexicon generator 1020 creates the digital lexicon 1022 associated with the meeting.

In various embodiments, the digital transcription system 704 first filters the content of the meeting context data 1010 before generating a digital lexicon. For example, the digital transcription system 704 filters the meeting context data 1010 based on recency (e.g., within 1 week, 30 days, 1 year, etc.), relevance to event details, location within a content management system (e.g., within a project folder), access rights of other users, and/or other associations to the meeting. For instance, the digital transcription system 704 compares the content of the event details 1016 to the content of the digital documents 1012 to determine which of the digital documents are most relevant or are above a threshold relevance level. In alternative embodiments, the digital transcription system 704 utilizes all of the meeting context data 1010 to create a digital lexicon for the user.

As mentioned above, the lexicon generator 1020 can create the digital lexicon 1022 heuristically or utilizing a trained neural network. For instance, in one or more embodiments, the lexicon generator 1020 utilizes a heuristic function to analyze the content of the meeting context data 1010 to generate the digital lexicon 1022. To illustrate, the lexicon generator 1020 generates a frequency distribution of words and phrases from digital documents 1012. In some embodiments, after removing common words and phrases (e.g., a, and, the, from, etc.), the lexicon generator 1020 identifies the words that appear most frequently and adds those words to the digital lexicon 1022. In one or more embodiments, the lexicon generator 1020 weights the words and phrases in the frequency distribution based on words and phrases that appear in the event details 1016 and the user features 1014.

In some embodiments, the lexicon generator 1020 adds weight to words and phrases in the frequency distribution that have a higher usage frequency in the digital documents 1012 than in everyday usage (e.g., compared to a public document corpus or all of the documents associated with the user's company). Then, based on the weighted frequencies, the lexicon generator 1020 can determine which words and phrases to include in the digital lexicon 1022.

Just as the lexicon generator 1020 can utilize content in the digital documents 1012 of a meeting participant to create the digital lexicon 1022, the lexicon generator 1020 can similarly create a digital lexicon from the user features 1014, the event details 1016, and/or the collaboration graph 1018. For example, the lexicon generator 1020 includes words and phrases from the event details 1016 in the digital lexicon 1022, often given those words and phrases greater weight because of their direct relevance to the context of the meeting. Additionally, the lexicon generator 1020 can parse and extract words and phrases from the user features 1014, such as a project description, to include in the digital lexicon 1022.

As an example of generating a digital lexicon 1022 based on event details 1016, in one or more embodiments, the digital transcription system 704 can utilize user notes taken during or after the meeting (e.g., a meeting summary) to generate at least a part of the digital lexicon 1022. For example, the lexicon generator 1020 prioritizes words and phrases captured during the meeting when generated the digital lexicon 1022. For instance, a word or phrase captured near the beginning of the meeting from notes can be added to the digital lexicon 1022 (as well as used to improve real-time transcription later in the same meeting when the word or phrase again used). Likewise, the lexicon generator 1020 can give further weight to words recorded by multiple meeting participants.

In one or more embodiments, the lexicon generator 1020 employs the collaboration graph 1018 to create the digital lexicon 1022. For example, the lexicon generator 1020 locates the meeting participant on the collaboration graph 1018 for an entity (e.g., an organization or company) and determines which digital documents, projects, co-users, etc. are most relevant to the meeting. Additional description regarding a collaboration graph is provided below in connection with FIG. 14.

Figure 10B:
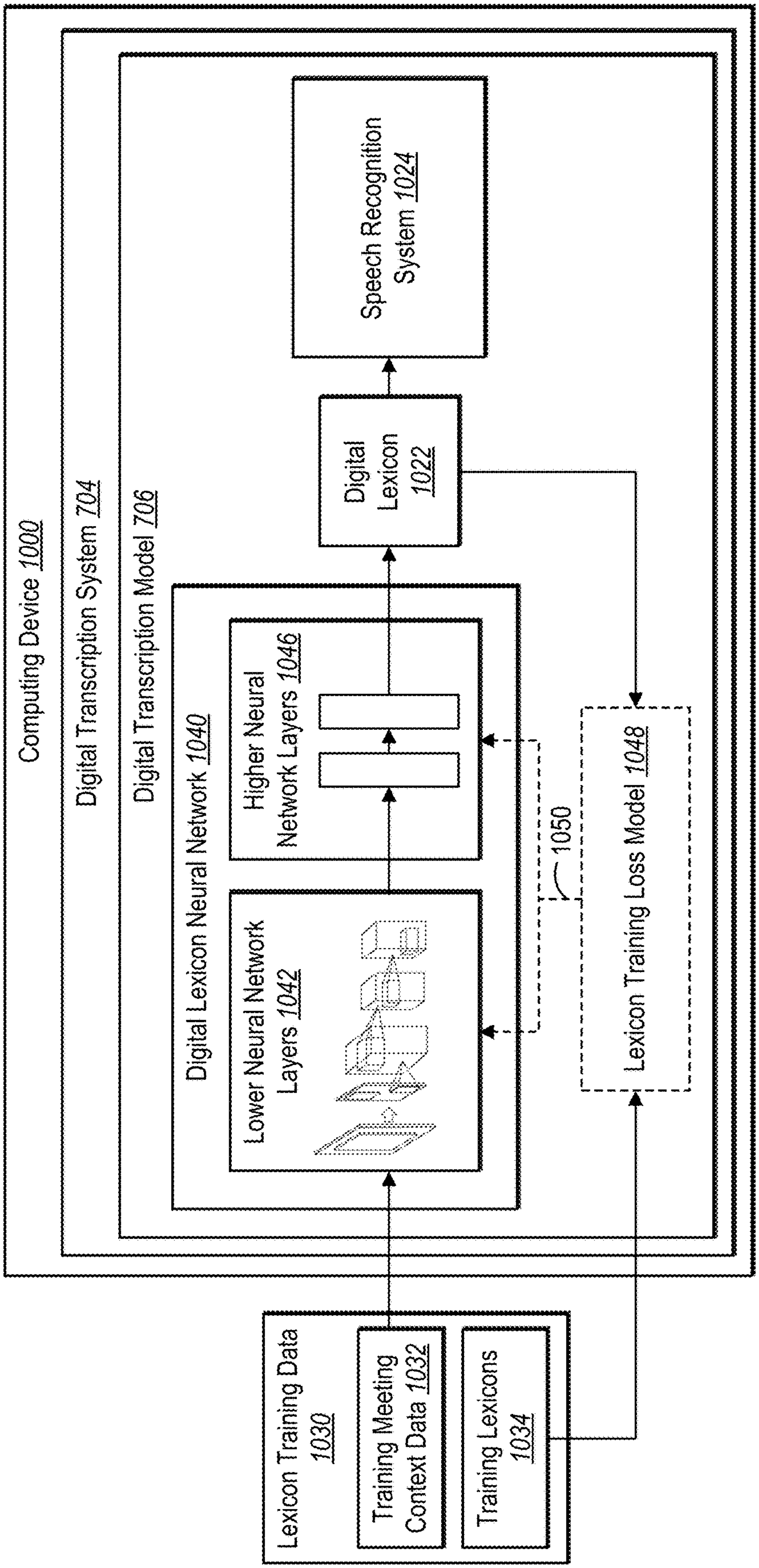
FIG. 10B illustrates a block diagram of training a digital lexicon neural network to generate a digital lexicon in accordance with one or more embodiments.

In some embodiments, the lexicon generator 1020 is a trained digital lexicon neural network that creates the digital lexicon 1022 from the meeting context data 1010. In this manner, the digital transcription system 704 provides the meeting context data 1010 for one or more users to the trained digital lexicon neural network, which outputs the digital lexicon 1022. FIG. 10B below provides additional description regarding training a digital lexicon neural network.

As described above, in one or more embodiments, the digital transcription system 704 provides the meeting context data 1010 to the digital transcription model 706 to generate the digital lexicon 1022 via the lexicon generator 1020. In alternative embodiments, upon receiving the audio data 1002 of a meeting and identifying a meeting participant, the digital transcription system 704 accesses a digital lexicon 1022 previously created for the meeting participant and/or other users that participated in the meeting.

As shown in FIG. 10A, the digital transcription system 704 provides the digital lexicon 1022 to the speech recognition system 1024. Upon receiving the digital lexicon 1022 and the audio data 1002, the speech recognition system 1024 can transcribe the audio data 1002. In particular, the speech recognition system 1024 can increase the weight of potential words included in the digital lexicon 1022 than other words when detecting and recognizing speech from the audio data 1002 of the meeting.

To illustrate, the speech recognition system 1024 determines that a sound in the audio data 1002 has a 60% probability (e.g., prediction confidence level) of being "metal" and a 75% probability of being "medal." Based on identifying the word "metal" in the meeting context data 1010, the lexicon generator 1020 can increase the probability of the word "metal" (e.g., add 20% or weight the probability by a factor of 1.5, etc.). In some embodiments, each of the words in the digital lexicon 1022 have an associated weight that is to be applied to the prediction score for corresponding recognized words (e.g., based on their relevant to a meeting's context).

In one or more embodiments, such as the illustrated embodiment, the speech recognition system 1024 is implemented as part of the digital transcription model 706. In some embodiments, the speech recognition system 1024 is implemented outside of the digital transcription model 706 but within the digital transcription system 704. In alternative embodiments, the speech recognition system 1024 is located outside of the digital transcription system 704, such as being hosted by a third-party service. In each case, the digital transcription system 704 provides the audio data 1002 and the digital lexicon 1022 to the speech recognition system 1024, which generates the digital transcript 1004.

In various embodiments, the digital transcription system 704 employs an ensemble approach to improved accuracy of a digital transcript of a meeting. To illustrate, in some embodiments, the digital transcription system 704 provides the audio data 1002 and the digital lexicon 1022 to multiple speech recognition systems (e.g., two native systems, two third-party systems, or a combination of native and third-party systems), which each generate a digital transcript. The digital transcription system 704 then compares and combines the digital transcripts into the digital transcript 1004.

Further, in some embodiments, to further improve transcription accuracy, the digital transcription system 704 can pre-process the audio data 1002 before utilizing it to generate the digital transcript 1004. For example, the digital transcription system 704 applies noise reduction, adjusts gain controls, increases or decreases the speed, applies low-pass and/or high-pass filters, normalizes volumes, adjusts sampling rates, applies transformations, etc., to the audio data 1002.

As mentioned above, the digital transcription system 704 can create and store a digital lexicon for a user. To illustrate, the digital transcription system 704 utilizes the same digital lexicon for multiple meetings. For example, in the case of a reoccurring weekly meeting on the same subject with the same participants, the digital transcription system 704 can utilize a previously generated digital lexicon 1022. Further, the digital transcription system 704 can update the digital lexicon 1022 offline as new meeting context data is provided to the content management system rather than in response to receiving new audio data of the reoccurring meeting.

As another illustration, the digital transcription system 704 can create and utilize a digital lexicon on a per-user basis. In this manner, the digital transcription system 704 utilizes a previously created digital lexicon for a user rather than recreate a digital lexicon each time audio data for a meeting is received where the user is a meeting participant. Additionally, the digital transcription system 704 can create multiple digital lexicons for a user based on different meeting contexts (e.g., a first subject and a second subject). For example, if a user participates in sales meetings as well as engineering meetings, the digital transcription system 704 can create and store a sales digital lexicon and an engineering digital lexicon for the user. Then, upon detecting a context of a meeting as a sales or an engineering meeting, the digital transcription system 704 can select the corresponding digital lexicon. In some embodiments, the digital transcription system 704 detects that a meeting subject changes part-way through transcribing the audio data 1002 and changes the digital lexicon is being used to influence speech transcription predictions.

Similarly, in various embodiments, the digital transcription system 704 can create, store, and utilize multiple digital lexicons that correspond to various meeting contexts (e.g., different subjects or other contextual changes). For example, the digital transcription system 704 creates a project-based digital lexicon based on the meeting context data of users assigned to the project. In another example, the digital transcription system 704 detect a repeat meeting between users and generates a digital lexicon for further instances of the meeting. In some embodiments, the digital transcription system 704 creates a default digital lexicon corresponding to company, team, or group of users to utilizes when a meeting participant or meeting participants are not associated with an adequate amount of meeting context data to generate a digital lexicon.

As mentioned above, FIG. 10B describes training a digital lexicon neural network. In particular, FIG. 10B illustrates a block diagram of training a digital lexicon neural network 1040 that generates the digital lexicon 1022 in accordance with one or more embodiments. As shown, FIG. 10B includes the computing device 1000 from FIG. 10A. Notably, the lexicon generator 1020 in FIG. 10A is replaced with the digital lexicon neural network 1040 and an optional lexicon training loss model 1048. Additionally, FIG. 10B includes lexicon training data 1030.

As shown, the digital lexicon neural network 1040 is a convolutional neural network (CNN) that includes lower neural network layers 1042 and higher neural network layers 1046. For instance, the lower neural network layers 1042 (e.g., convolutional layers) generate lexicon feature vectors from meeting context data that the higher neural network layers 1046 (e.g., classification layers) transform the feature vectors into the digital lexicon 1022. In one or more embodiments, the digital lexicon neural network 1040 is an alternative type of neural network, such as a recurrent neural network (RNN), a residual neural network (ResNet) with or without skip connections, or a long-short-term memory (LSTM) neural network. Further, in alternative embodiments, the digital transcription system 704 utilizes other types of neural networks to generate a digital lexicon 1022 from the meeting context data 1010.

In one or more embodiments, the digital transcription system 704 trains the digital lexicon neural network 1040 utilizing the lexicon training data 1030. As shown, the lexicon training data 1030 includes training meeting context data 1032 and training lexicons 1034. To train the digital lexicon neural network 1040, the digital transcription system 704 feeds the training meeting context data 1032 to the digital lexicon neural network 1040, which generates a digital lexicon 1022.

Further, the digital transcription system 704 provides the digital lexicon 1022 to the lexicon training loss model 1048, which compares the digital lexicon 1022 to a corresponding training lexicon 1034 (e.g., a ground truth) to determine a lexicon error amount 1050. The digital transcription system 704 then back propagates the lexicon error amount 1050 to the digital lexicon neural network 1040. More specifically, the digital transcription system 704 provides the lexicon error amount 1050 to the lower neural network layers 1042 and the higher neural network layers 1046 to tune and fine-tune the weights and parameters of these layers to generate a more accurate digital lexicon. The digital transcription system 704 can train the digital lexicon neural network 1040 in batches until the network converges or until the lexicon error amount 1050 drops below a threshold.

In some embodiments, the digital transcription system 704 continues to train the digital lexicon neural network 1040. For example, in response to generating a digital lexicon 1022, a user can return an edited or updated version of the digital lexicon 1022. The digital lexicon neural network 1040 can then use the updated version to further fine-tune and improve the digital lexicon neural network 1040.

As described above, in various embodiments, the digital transcription system 704 utilizes a digital transcription model 706 to create a digital lexicon from meeting context data, which in turn is used to generate a digital transcript of a meeting having improved accuracy over conventional systems. In alternative embodiments, the digital transcription system 704 utilizes a digital transcription model 706 to generate a digital transcript of a meeting directly from meeting context data, as described in FIGS. 11A-11B.

Figure 11A:
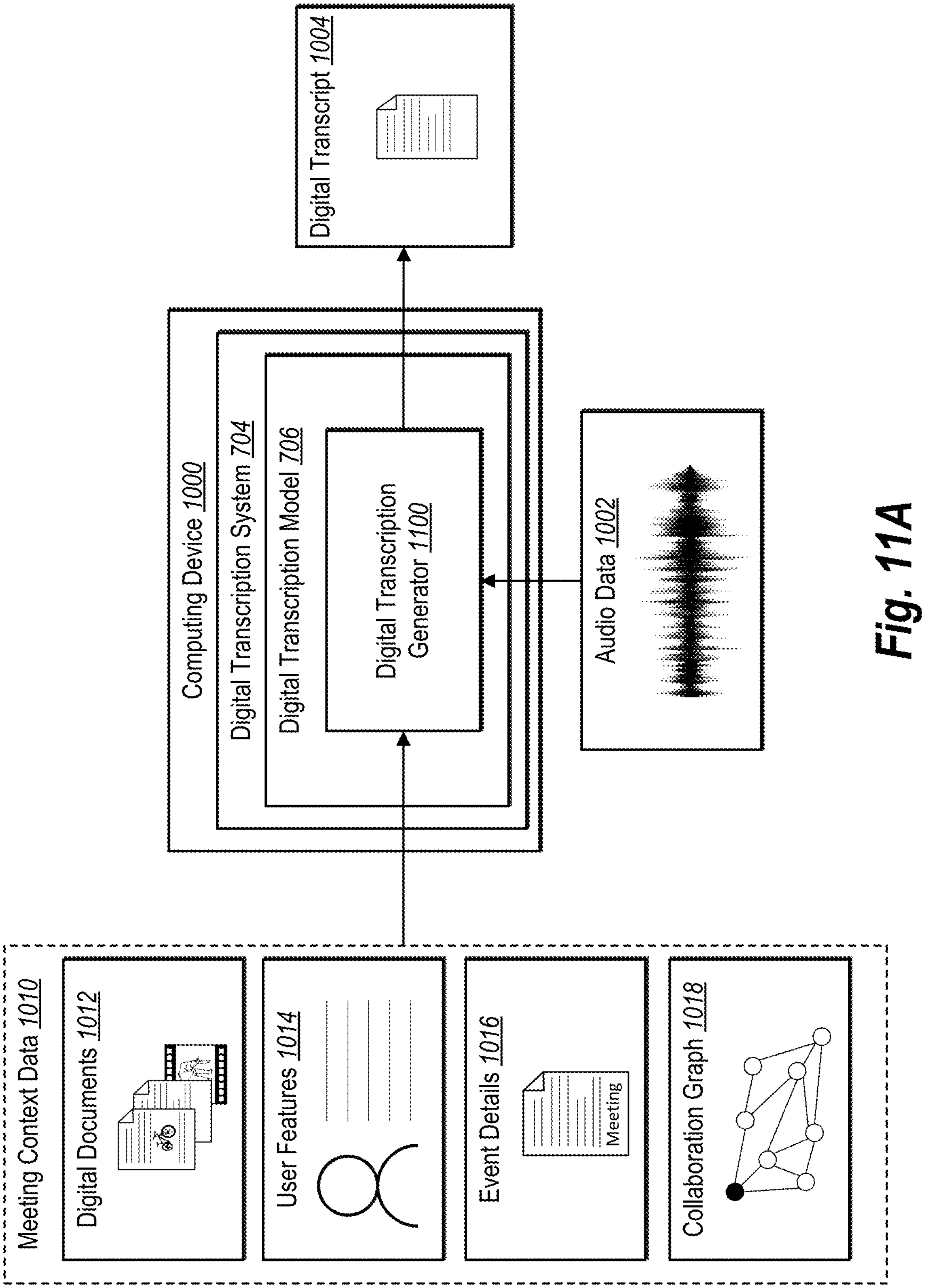
FIG. 11A illustrates a block diagram of utilizing a digital transcription model to generate a digital transcript in accordance with one or more embodiments.
Figure 11B:
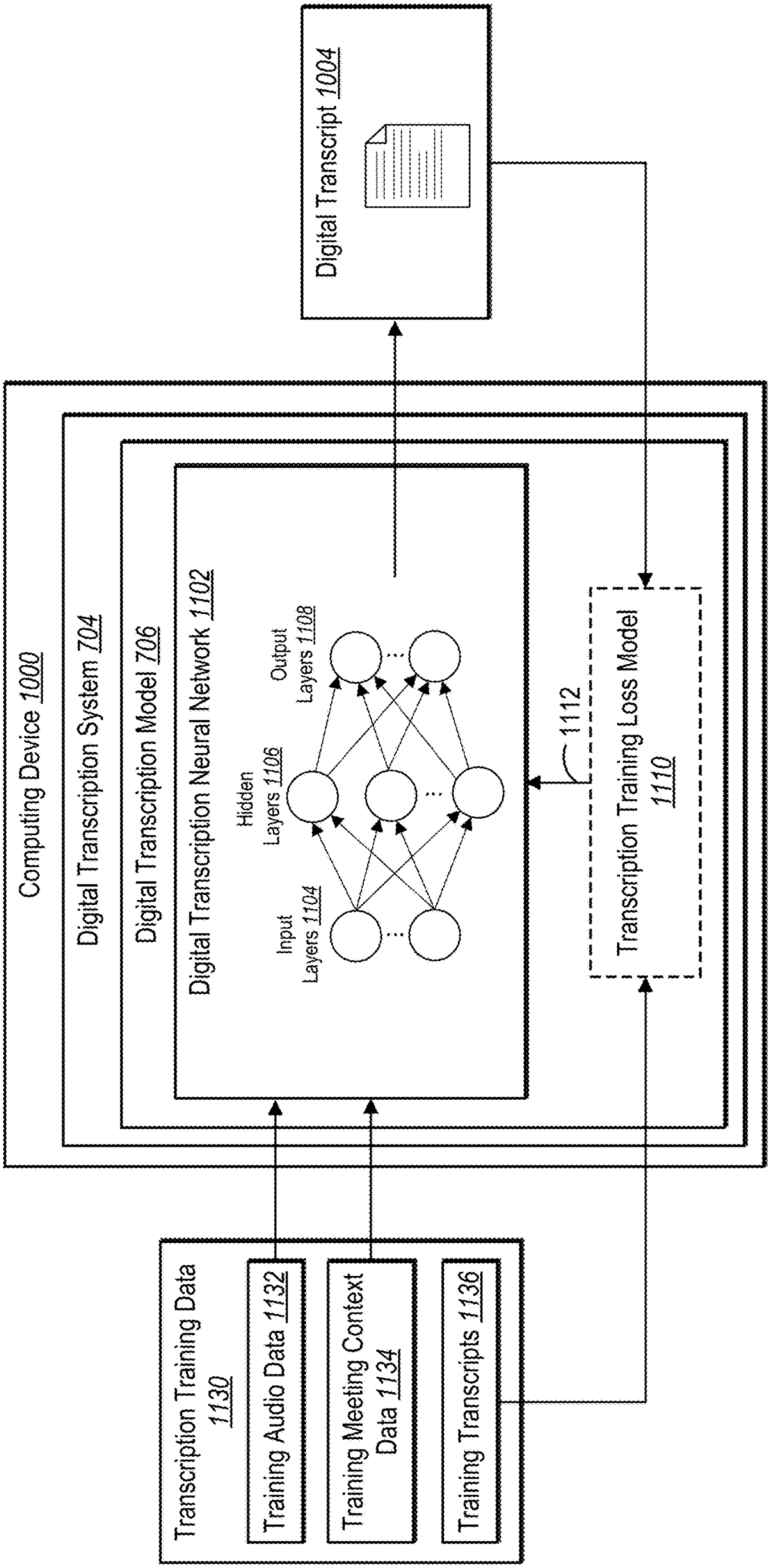
FIG. 11B illustrates a block diagram of a digital transcription neural network trained to generate a digital transcript in accordance with one or more embodiments.

To illustrate, FIG. 11A illustrates a block diagram of utilizing a digital transcription model to generate a digital transcript from audio data and meeting context data in accordance with one or more embodiments. As shown, the computing device includes the digital transcription system 704, the digital transcription model 706, and a digital transcription generator 1100. As with FIG. 10A, the digital transcription system 704 receives audio data 1002 of a meeting, determines the meeting context data 1010 in relation to users that participated in the meeting, and generates a digital transcript 1004 of the meeting.

More specifically, the digital transcription generator 1100 within the digital transcription model 706 generates the digital transcript 1004 based on the audio data 1002 of the meeting and the meeting context data 1010 of a meeting participant. In one or more embodiments, the digital transcription generator 1100 heuristically generates the digital transcript 1004. In alternative embodiments, the digital transcription generator 1100 is a neural network that generates the digital transcript 1004.

As just mentioned, in one or more embodiments, the digital transcription generator 1100 within the digital transcription model 706 utilizes a heuristic function to generate the digital transcript 1004. For example, the digital transcription generator 1100 forms a set of rules and/or procedures with respect to the meeting context data 1010 that increases the speech recognition accuracy and prediction of the audio data 1002 when generating the digital transcript 1004. In another example, the digital transcription generator 1100 applies words, phrases, and content, of the meeting context data 1010 to increase accuracy when generating a digital transcript 1004 of the meeting from the audio data.

In some embodiments, the digital transcription generator 1100 applies heuristics such as number of meeting attendees, job positions, meeting location, remote user locations, time of day, etc. to improve prediction accuracy of recognized speech in the audio data 1002 of a meeting. For example, upon determining that a sound in the audio data 1002 could be "lunch" or "launch," the digital transcription generator 1100 weights "lunch" with a higher probability than "launch" if the meeting is around lunchtime (e.g., noon).

In various embodiments, the digital transcription system 704 improves generation of the digital transcript using a contextual weighting heuristic. For instance, the digital transcription system 704 determines the context or subject of a meeting from the audio data 1002 and/or meeting context data 1010. Next, when recognizing speech from the audio data 1002, the digital transcription system 704 weights predicted words for sounds that correspond to the identified meeting subject. Moreover, the digital transcription system 704 applies diminishing weights to predicted words of a sound based on how far removed the word is from the meeting subject. In this manner, when the digital transcription system 704 is determining between multiple possible words for a recognized sound in the audio data 1002, the digital transcription system 704 is influenced to select the word that shares the greatest affinity to the identified meeting subject (or other meeting context).

In one or more embodiments, the digital transcription system 704 can utilize user notes (e.g., as event details 1016) taken during the meeting as a heuristic to generate a digital transcript 1004 of a meeting. For instance, the digital transcription system 704 identifies a timestamp corresponding to notes recorded during the meeting by one or more meeting participants. In response, the digital transcription system 704 identifies the portion of the audio data 1002 at or before the timestamp and weights the detected speech that corresponds to the notes. In some instances, the weight is increased if multiple meeting participants recorded similar notes around the same time in the meeting.

In additional embodiments, the digital transcription system 704 can receive both meeting notes and the audio data 1002 in real time. Further, the digital transcription system 704 can detect a word or phrase in the notes early in the meeting, then accurately transcribe the word or phrase in the digital transcript 1004 each time the word or phrase is detected later in the meeting. In cases where the meeting has little to no meeting context data, this approach can be particularly beneficial in improving the accuracy of the digital transcript 1004.

As mentioned above, the digital transcription system 704 can utilize initial information about a meeting to retrieve the most relevant meeting context data. In some embodiments, the digital transcription system 704 can generate an initial digital transcript of all or a portion of the audio data before accessing the meeting context data 1010. The digital transcription system 704 then analyzes the first digital transcript to retrieve relevant content (e.g., relevant digital documents). Alternatively, as described above, the digital transcription system 704 can determine the subject of a meeting from analyzing event details or by user input and then utilize the identified subject to gather additional meeting context data (e.g., relevant documents or information from a collaboration graph related to the subject).

In alternative embodiments to employing a heuristic function, the digital transcription generator 1100 within the digital transcription model 706 utilizes a digital transcription neural network to generate the digital transcript 1004. For instance, the digital transcription system 704 provides the audio data 1002 of the meeting and the meeting context data 1010 of a meeting participant to the digital transcription generator 1100, which is trained to correlate content from the meeting context data 1010 with speech from the audio data 1002 and generate a highly accurate digital transcript 1004. Embodiments of training a digital transcription neural network are described below with respect to FIG. 11B.

Irrespective of the type of digital transcription model 706 that the digital transcription system 704 employs to generate a digital transcript, the digital transcription system 704 can utilize additional approaches and techniques to further improve accuracy of the digital transcript. To illustrate, in one or more embodiments, the digital transcription system 704 receives multiple copies of the audio data of a meeting recorded at different client devices. For example, multiple meeting participants record and provide audio data of the meeting. In these embodiments, the digital transcription system 704 can utilize one or more ensemble approaches to generate a highly accurate digital transcript.

In some embodiments, the digital transcription system 704 combines audio data from the multiple recordings before generating a digital transcript. For example, the digital transcription system 704 analyzes the sound quality of corresponding segments from the multiple recordings and selects the recording that provides the highest quality sound for a given segment (e.g., the recording device closer to the speaker will often capture a higher-quality recording of the speaker).

In alternative embodiments, the digital transcription system 704 transcribes each recording separately and then merges and compares the two digital transcripts. For example, when two different meeting participants each provide audio data (e.g., recordings) of a meeting, the digital transcription system 704 can access different meeting context data associated with each user. In some embodiments, the digital transcription system 704 uses the same meeting context data for both recordings but utilizes different weightings for each recording based on the which portions of the meeting context data are more closely associated with the user submitting the particular recording. Upon comparing the separate digital transcripts, when a conflict between words in the two digital transcripts occur, in some embodiments, the digital transcription system 704 can select the word with a higher prediction confidence level and/or the recording having better sound quality for the word.

In one or more embodiments, the digital transcription system 704 can utilize the same audio data with different embodiments of the digital transcription model 706 and/or subcomponents of the digital transcription model 706, then combine the resulting digital transcripts to improve the accuracy of the digital transcript. To illustrate, in some embodiments, the digital transcription system 704 utilizes a first digital transcription model that generates a digital transcript upon creating a digital lexicon and a second digital transcription model that generates a digital transcript utilizing a trained digital transcription neural network. Other combinations and embodiments of the digital transcription model 706 are possible as well.

As mentioned above, the digital transcription system 704 can train the digital transcription generator 1100 as a digital transcription neural network. To illustrate, FIG. 5B shows a block diagram of training a digital transcription neural network to generate a digital transcript in accordance with one or more embodiments. As shown, FIG. 11B includes the computing device 1000 having the digital transcription system 704, where the digital transcription system 704 further includes the digital transcription model 706 having the digital transcription neural network 1102 and a transcription training loss model 1110. In addition, FIG. 5B shows transcription training data 1130.

As also shown, the digital transcription neural network 1102 is illustrated as a recurrent neural network (RNN) that includes input layers 1104, hidden layers 1106, and output layers 1108. While a simplified version of a recurrent neural network is shown, the digital transcription system 704 can utilize a more complex neural network. As an example, the recurrent neural network can include multiple hidden layer sets. In another example, the recurrent neural network can include additional layers, such as embedding layers, dense layers, and/or attention layers.

In some embodiments, the digital transcription neural network 1102 comprises a specialized type of recurrent neural network, such as a long-short-term memory (LSTM) neural network. To illustrate, in some embodiments, a long short-term memory neural network includes a cell having an input gate, an output gate, and a forget gate as well as a cell input. In addition, a cell can remember previous states and values (e.g., words and phrases) over time (including hidden states and values) and the gates control the amount of information that is input and output from a cell. In this manner, the digital transcription neural network 1102 can learn to recognize sequences of words that correspond to phrases or sentences used in a meeting.

In alternative embodiments, the digital transcription system 704 utilizes other types of neural networks to generate a digital transcript 1004 from the meeting context data and the audio data. For example, in some embodiments, the digital transcription neural network 1102 is a convolutional neural network (CNN) or a residual neural network (ResNet) with or without skip connections.

In one or more embodiments, the digital transcription system 704 trains the digital transcription neural network 1102 utilizing the transcription training data 1130. As shown, the transcription training data 1130 includes training audio data 1132, training meeting context data 1134, and training transcripts 1136. For example, the training transcripts 1136 correspond to the training audio data 1132 in the transcription training data 1130 such that the training transcripts 1136 serve as a ground truth for the training audio data 1132.

To train the digital transcription neural network 1102, in one or more embodiments, the digital transcription system 704 provides the training audio data 1132 and the training meeting context data 1134 (e.g., vectorized versions of the training data) to the input layers 1104. The input layers 1104 encode the training data and provide the encoded training data to the hidden layers 1106. Further, the hidden layers 1106 modify the encoded training data before providing it to the output layers 1108. In some embodiments, the output layers 1108 include classifying and/or decoding the modified encoded training data. Based on the training data, the digital transcription neural network 1102 generates a digital transcript 1004, which the digital transcription system 704 provides to the transcription training loss model 1110. In addition, the digital transcription system 704 provides the training transcripts 1136 from the transcription training data 1130 to the transcription training loss model 1110.

In various embodiments, the transcription training loss model 1110 utilizes the training transcripts 1136 for meetings as a ground truth to verify the accuracy of digital transcripts generated from corresponding training audio data 1132 of the meetings as well as evaluate how effectively the digital transcription neural network 1102 is learning to extract contextual information about the meetings from the corresponding training meeting context data 1134. In particular, the transcription training loss model 1110 compares the digital transcript 1004 to corresponding training transcripts 1136 to determine a transcription error amount 1112.

Upon determining the transcription error amount 1112, the digital transcription system 704 can back propagate the transcription error amount 1112 to the input layers 1104, the hidden layers 1106, and the output layers 1108 to tune and fine-tune the weights and parameters of these layers to learn to better extract context information from the training meeting context data 1134 as well as generate more accurate digital transcripts. Further, the digital transcription system 704 can train the digital transcription neural network 1102 in batches until the network converges, the transcription error amount 1112 drops below a threshold amount, or the digital transcripts are above a threshold accuracy level (e.g., 95% accurate).

Even after the digital transcription neural network 1102 is initially trained, the digital transcription system 704 can continue to fine-tune the digital transcription neural network 1102. To illustrate, a user may provide the digital transcription neural network 1102 with an edited or updated version of a digital transcript generated by the digital transcription neural network 1102. In response, the digital transcription system 704 can utilize the updated version of the digital transcript to further improve the speech recognition prediction capabilities of the digital transcription neural network 1102.

In some embodiments, the digital transcription system 704 can generate at least a portion of the transcription training data 1130. To illustrate, the digital transcription system 704 accesses digital documents corresponding to one or more users. Upon accessing the digital documents, the digital transcription system 704 utilizes a text-to-speech synthesizer to generate the training audio data 1132 by reading and recording the text of the digital document. In this manner, the accessed digital document (i.e., meeting context data) itself serves as the ground truth for the corresponding training audio data 1132.

Further, the digital transcription system 704 can supplement training data with multi-modal data sets that include training audio data coupled with training transcripts. To illustrate, in various embodiments, the digital transcription system 704 initially trains the digital transcription neural network 1102 to recognize speech. For example, the digital transcription system 704 utilizes the multi-modal data sets (e.g., a digital document with audio from a text-to-speech algorithm) to train the digital transcription neural network 1102 to perform speech-to-text operations. Then, in a second training stage, the digital transcription system 704 trains the digital transcription neural network 1102 with the transcription training data 1130 to learn how to improve digital transcripts based on the meeting context data of a meeting participant.

In additional embodiments, the digital transcription system 704 trains the digital transcription neural network 1102 to better recognize the voice of a meeting participant. For example, one or more meeting participants reads a script that provides the digital transcription neural network 1102 with both training audio data and a corresponding digital transcript (e.g., ground truth). Then, when the user is detected speaking in the meeting, the digital transcription system 704 learns to understand the user's speech patterns (e.g., rate of speech, accent, pronunciation, cadence, etc.). Further, the digital transcription system 704 improves accuracy of the digital transcript by weighting words spoken by the user with meeting context data most closely associated with the user.

In various embodiments, the digital transcription system 704 utilizes training video data in addition to the training audio data 1132 to train the digital transcription neural network 1102. The training video data includes visual and labeled speaker information that enables the digital transcription neural network 1102 to increase the accuracy of the digital transcript. For example, the training video data provides speaker information that enables the digital transcription neural network 1102 to disambiguate unsure speech, such as detect the speaker based on lip movement, which speaker is saying what when multiple speakers talk at the same time, and/or the emotion of a speaker based on facial expression (e.g., the speaker is telling a joke or is very serious), each of which can be noted in the digital transcript 1004.

As detailed above, the digital transcription system 704 utilizes the trained digital transcription neural network 1102 to generate highly accurate digital transcripts from at least one recording of audio data of a meeting and meeting context data. In one or more embodiments, upon providing the digital transcript to one or more meeting participants, the digital transcription system 704 enables users to search the digital transcript by keyword or phrases.

In additional embodiments, the digital transcription system 704 also enables phonetic searching of words. For example, the digital transcription system 704 labels each word in the digital transcript with the phonetic sound recognized in the audio data. In this manner, the digital transcription system 704 enables users to find words or phrases were pronounced in a meeting even if the digital transcription system 704 uses a different word for the digital transcript, such as when new words are acronyms are made up in a meeting.

Figure 12:
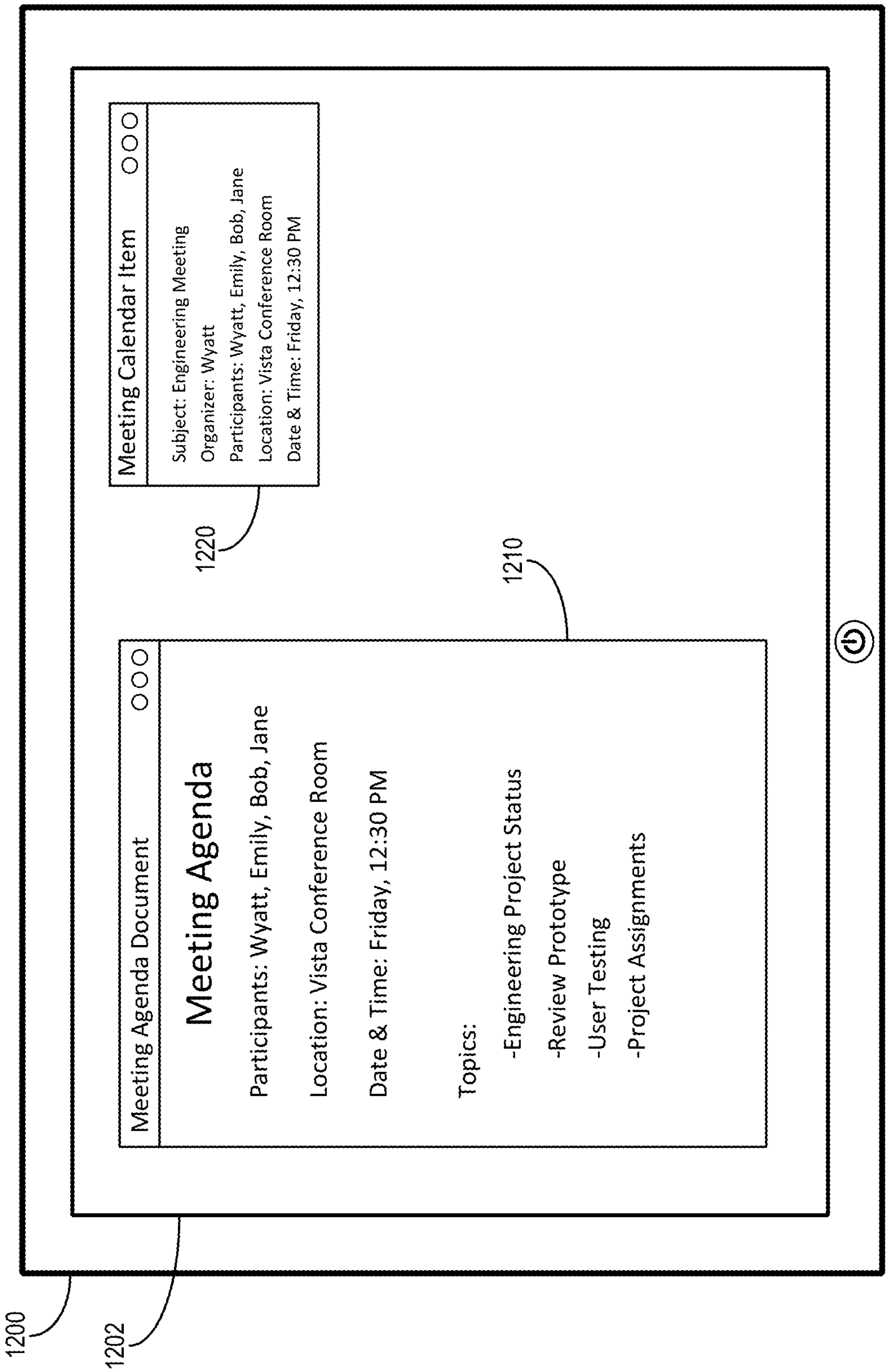
FIG. 12 illustrates an example graphical user interface that includes a meeting document and a meeting event item in accordance with one or more embodiments.

Turning now to FIG. 12, this figure illustrates a client device 1200 having a graphical user interface 1202 that includes a meeting agenda 1210 and a meeting calendar item 1220 in accordance with one or more embodiments. As mentioned above, the digital transcription system 704 can obtain event details from a variety of digital documents. Further, in some embodiments, the digital transcription system 704 utilizes the event details to identify meeting subjects and/or filter digital documents that best correspond to the meeting.

As shown, the meeting agenda 1210 includes event details about a meeting, such as the participants, location, date and time, and subjects. The meeting agenda 1210 can include additional details such as job position, job description, minutes or notes from previous meetings, follow-up meeting dates and subjects, etc. Similarly, the meeting calendar item 1220 includes event details such as the subject, organizer, participants, location, and date and time of the meeting. In some instances, the meeting calendar item 1220 also provides notes and/or additional comments about the meeting (e.g., topics to be discussed, assignments, attachments, links, call-in instructions, etc.).

In one or more embodiments, the digital transcription system 704 automatically detects the meeting agenda 1210 and/or the meeting calendar item 1220 from the digital documents within the meeting context data for an identified meeting participant. For example, the digital transcription system 704 correlates the meeting time and/or location from the audio data with the date, time, and/or location indicated in the meeting agenda 1210. In this manner, the digital transcription system 704 can identify the meeting agenda 1210 as a relevant digital document with event details.

In another example, the digital transcription system 704 determines that the time of the meeting calendar item 1220 matches the time that the audio data was captured. For instance, the digital transcription system 704 has access to, or manages the meeting calendar item 1220 for a meeting participant. Further, if a meeting participant utilizes a client application associated with the digital transcription system 704 on their client device to capture the audio data of the meeting at the time of the meeting calendar item 1220, the digital transcription system 704 can automatically associate the meeting calendar item 1220 with the audio data for the meeting.

In alternative embodiments, the meeting participant manually provides the meeting agenda 1210 and/or confirms that the meeting calendar item 1220 correlates with the audio data of the meeting. For example, the digital transcription system 704 provides a user interface in a client application that receives user input of both the audio data of the meeting and the meeting agenda 1210 (as well as input of other meeting context data). As another example, a client application associated with the digital transcription system 704 is providing the meeting agenda 1210 to a meeting participant, who then utilizes the client application to record the meeting and capture the audio data. In this manner, the digital transcription system 704 automatically associates the meeting agenda 1210 with the audio data for the meeting.

As mentioned previously, the digital transcription system 704 can extract a subject from the meeting agenda 1210 and/or meeting calendar item 1220. For example, the digital transcription system 704 identifies the subject of the meeting from the meeting calendar item 1220 (e.g., the subject field) or from the meeting agenda 1210 (e.g., a title or header field). Further, the digital transcription system 704 can parse the meeting subject to identify at least one topic of the meeting (e.g., engineering meeting).

In some embodiments, the digital transcription system 704 infers a subject from the meeting agenda 1210 and/or meeting calendar item 1220. For example, the digital transcription system 704 identifies job positions and descriptions for the meeting participants. Then, based on the combination of job positions, job descriptions, and/or user assignments, the digital transcription system 704 infers a subject (e.g., the meeting is likely an invention disclosure meeting because it includes lawyers and engineers).

As described above, in various embodiments, the digital transcription system 704 utilizes the identified meeting subject to filter and/or weight digital documents received from one or more meeting participants. For instance, the digital transcription system 704 identifies and retrieves all digital documents from a meeting participant that correspond to the identified meeting subject. In some embodiments, the digital transcription system 704 identified a previously created digital lexicon that corresponds to the meeting subject, and in some cases, also corresponds to one or more of the meeting participants.

As mentioned above, the digital transcription system 704 can utilize the meeting agenda 1210 and/or the meeting calendar item 1220 to identify additional meeting participants, for example, from the participants list. Then, in some embodiments, the digital transcription system 704 accesses additional meeting context data of the additional meeting participants, as explained earlier. Further, in various embodiments, upon accessing meeting context data corresponding to multiple meeting participants, if the digital transcription system 704 identifies digital documents relating to the meeting subject stored by each of the meeting participants (or shared across the meeting participants), the digital transcription system 704 can assign a higher relevance weight to those digital documents as corresponding to the meeting.

In some embodiments, the meeting agenda 1210 and/or the meeting calendar item 1220 provide indications as to which meeting participants has the most relevant meeting context data for the meeting. For example, the meeting organizer, the first listed participant, and/or one of the first listed participants may maintain a more complete set of digital documents or have more relevant user features with respect to the meeting. Similarly, a meeting presenter may have additional digital documents corresponding to the meeting that are not kept by other meeting participants. The digital transcription system 704 can weight documents or other meeting context data corresponding to more relevant, experienced, or knowledgeable participants.

The digital transcription system 704 can also apply different weights based on the proximity or affinity of digital documents (or other meeting context data). For example, in one or more embodiments, the digital transcription system 704 provides a first weight to words found in the meeting agenda 1210. The digital transcription system 704 then applies a second (lower) weight to words found in digital documents within the same folder as the meeting agenda

1210. Moreover, the digital transcription system 704 further assigns a third (still lower) weight to words in digital documents in a parent folder. In this manner, the digital transcription system 704 can apply weights according to the tree-like folder structure in which the digital documents are stored.

As another example, in various embodiments, the digital transcription system 704 applies a first weight to words found in digital documents authored by the user and/or meeting participants. In addition, the digital transcription system 704 can apply a second (lower) weight to words found in other digital documents authored by the immediate teammates of the meeting participants. Further, the digital transcription system 704 can apply a third (still lower) weight to words in digital documents authored by others within the same organization.

Figure 13:
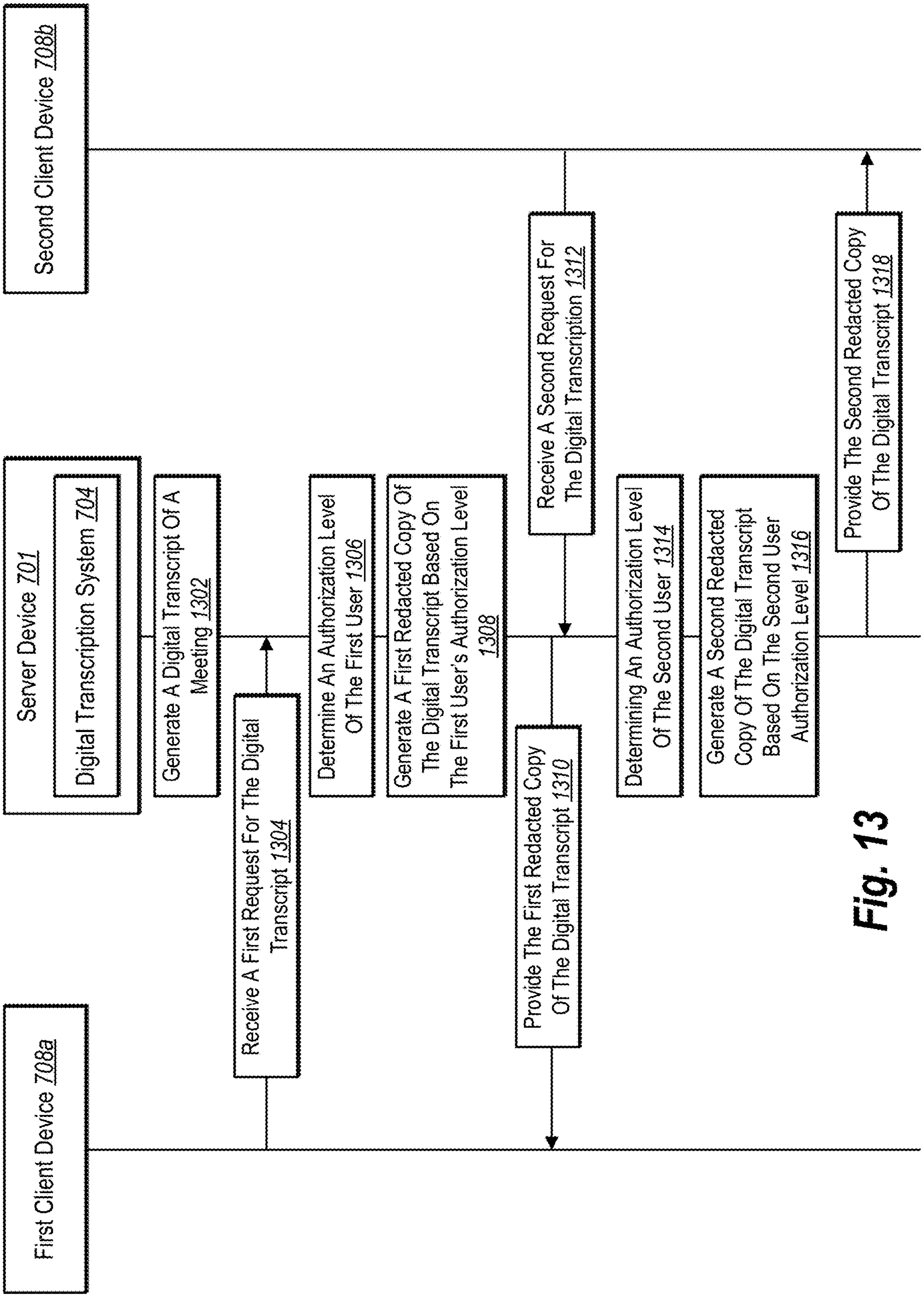
FIG. 13 illustrates a sequence diagram of providing redacted digital transcripts to users in accordance with one or more embodiments.

Turning now to FIG. 13, additional detail is provided regarding automatically redacting sensitive information from a digital transcript. To illustrate, FIG. 13 shows a sequence diagram of providing redacted digital transcripts to users in accordance with one or more embodiments. In particular, FIG. 13 includes the digital transcription system 704 on the server device 701, a first client device 708*a,* and a second client device 708*b*. The server device 701 in FIG. 13 can correspond the server device 701 described above with respect to FIG. 7. Similarly, the first client device 708*a* and the second client device 708*b* in FIG. 13 can correspond to the client devices 708*a*-708*n* described above.

As shown in FIG. 13, the digital transcription system 704 performs an act 1302 of generating generates a digital transcript of a meeting. In particular, the digital transcription system 704 generates a digital transcript from audio data of a meeting as described above. For example, the digital transcription system 704 utilizes the digital transcription model 706 to generate a digital transcript of a meeting based on audio data of the meeting and meeting context data.

In addition, the digital transcription system 704 performs an act 1304 of receiving a first request for the digital transcript from the first client device 708*a*. For instance, a first user associated with the first client device 708*a* requests a copy of the digital transcript from the digital transcription system 704. In some embodiments, the first user participated in the meeting and/or provided the audio data of the meeting. In alternative embodiments, the first user is requesting a copy of the digital transcript of the meeting without having attended the meeting.

As shown, the digital transcription system 704 also performs an act 1306 of determining an authorization level of the first user. The level of authorization can correspond to whether the digital transcription system 704 provides a redacted copy of the digital transcript to the first user and/or which portions of the digital transcript to redact. The first user may have full-authorization rights, partial-authorization rights, or no authorization rights, where authorization rights determine a user's authorization level.

In one or more embodiments, the digital transcription system 704 determines the authorization level of the first user based on one or more factors. As one example, the level of authorization rights can be tied to a user's job description or title. For instance, a project manager or company principal may be provided a higher authorization level than a designer or an associate. As another example, the level of authorization rights can be tied to a user's meeting participation. For example, if the user attended and/or participated in the meeting, the digital transcription system 704 grants authorization rights to the user. Similarly, if a user spoke in the meeting, the digital transcription system 704 can leave portions of the digital transcript where the user was speaking unredacted. Further, if the user participated in past meetings sharing the same context, the digital transcription system 704 grants authorization rights to the user.

As shown, the digital transcription system 704 performs an act 1308 of generating a first redacted copy of the meeting based on the first user's authorization level. In one or more embodiments, the digital transcription system 704 generates a redacted copy of the digital transcript from an unredacted copy of the digital transcript. In alternative embodiments, the digital transcription system 704 (e.g., the digital transcription model 706) generates a redacted copy of the digital transcript directly from the audio data of the meeting based on the first user's authorization level.

The digital transcription system 704 can generate the redacted copy of the digital transcript to exclude confidential and/or sensitive information. For example, the digital transcription system 704 redacts topics, such as budgets, compensation, user assessments, personal issues, or other previously redacted topics. In addition, the digital transcription system 704 redacts (or filters) topics not related to the primary context (or secondary contexts) of the meetings such that the redacted copied provides a streamlined version of the meeting.

In one or more embodiments, the digital transcription system 704 utilizes a heuristic function that detects redaction cues in the meeting from the audio data or unredacted transcribed copy of the digital transcript. For example, the keywords "confidential," "sensitive," "off the record," "pause the recording," etc., trigger an alert for the digital transcription system 704 to identify portions of the meeting to redact. Similarly, the digital transcription system 704 identifies previously redacted keywords or topics. In addition, the digital transcription system 704 identifies user input on a client device that provides a redaction indication.

In one or more embodiments, the digital transcription system 704 can redact one or more words, sentences, paragraphs, or sections in the digital transcript located before or after a redaction cue. For example, the digital transcription system 704 analyzes the words around the redaction cue to determine which words, and to what extent to redact. For instance, the digital transcription system 704 determines that a user's entire speaking turn is discussing a previously redacted topic. Further, the digital transcription system 704 can determine that multiple speakers are discussing a redacted topic for multiple speaking turns.

In alternative embodiments, the digital transcription system 704 utilizes a machine-learning model to generate a redacted copy of the meeting. For example, the digital transcription system 704 provides training digital transcripts redacted at various authorization levels to a machine-learning model (e.g., a transcript redaction neural network) to train the network to redact content from the meeting based on a user's authorization level.

As shown, the digital transcription system 704 performs an act 1310 of providing the first redacted copy of the digital transcript to the first user via the first client device 108*a*. In one or more embodiments, the first redacted copy of the digital transcript can show portions of the meeting that were redacted, such as by blocking out the redacted portions. In alternative embodiments, the digital transcription system 704 excludes redacted portions of the first redacted copy of the digital transcript, with or without an indication that the portions have been redacted.

In optional embodiments, the digital transcription system 704 provides the first redacted copy of the digital transcript to an administrating user with full authorization rights for review and approval prior to providing the copy to the first user. For example, the digital transcription system 704 provides a copy of the first digital transcript to the administrating user indicating the portions that are being redacted for the first user. The administrating user can confirm, modify, add, and remove redacted portions from the first redacted copy of the digital transcript before it is provided to the first user.

As shown, the digital transcription system 704 performs an act 1312 of receiving a second request for the digital transcript from the second client device 708*b*. For example, a second user associated with the second client device requests a copy of the digital transcript of the meeting from the digital transcription system 704. In some embodiments, the second user requests a copy of the digital transcript from with a client application on the second client device 708*b*.

As shown, after receiving the second request, the digital transcription system 704 performs an act 1314 of determining an authorization level of the second user. Determining user authorization levels for a user is described above. In addition, for purposes of explanation, the digital transcription system 704 determines that the second user has a different authorization level than the first user.

Based on determining that the second user has a different authorization level than the first, the digital transcription system 704 performs an act 1316 of generating a second redacted copy of the digital transcript based on the second user's authorization level. For example, the digital transcription system 704 allocates a sensitivity rating to each portion of the meeting and utilizes the sensitivity rating to determine which portions of the meeting to include in the second redacted copy of the digital transcript. In this manner, the two redacted copies of the digital transcript generated by the digital transcription system 704 include different amounts of redacted content based on the respective authorization levels of the two users.

As shown, the digital transcription system 704 performs an act 1318 of providing the second redacted copy of the digital transcript to the second user via the second client device 708*b*. As described above, the second redacted copy of the digital transcript can indicate the portions of the meeting that were redacted. In addition, the digital transcription system 704 can enable the second user to request that one or more portions of the second redacted copy of the digital transcript of the meeting be removed.

In various embodiments, the digital transcription system 704 automatically provides redacted copies of the digital transcript to meeting participants and/or other users associated with the meeting. In these embodiments, the digital transcription system 704 can generate and provide redacted copies of the digital transcript of the meeting without first receiving individual user requests.

Additionally, in one or more embodiments, the digital transcription system 704 can create redacted copies of the audio data for one or more users. For example, the digital transcription system 704 redacts portions of the audio data that correspond to the redacted portions of the digital transcript copies (e.g., per user). In this manner, the digital transcription system 704 prevents users from circumventing the redacted copies of the digital transcript to obtain unauthorized access to sensitive information.

Figure 14:
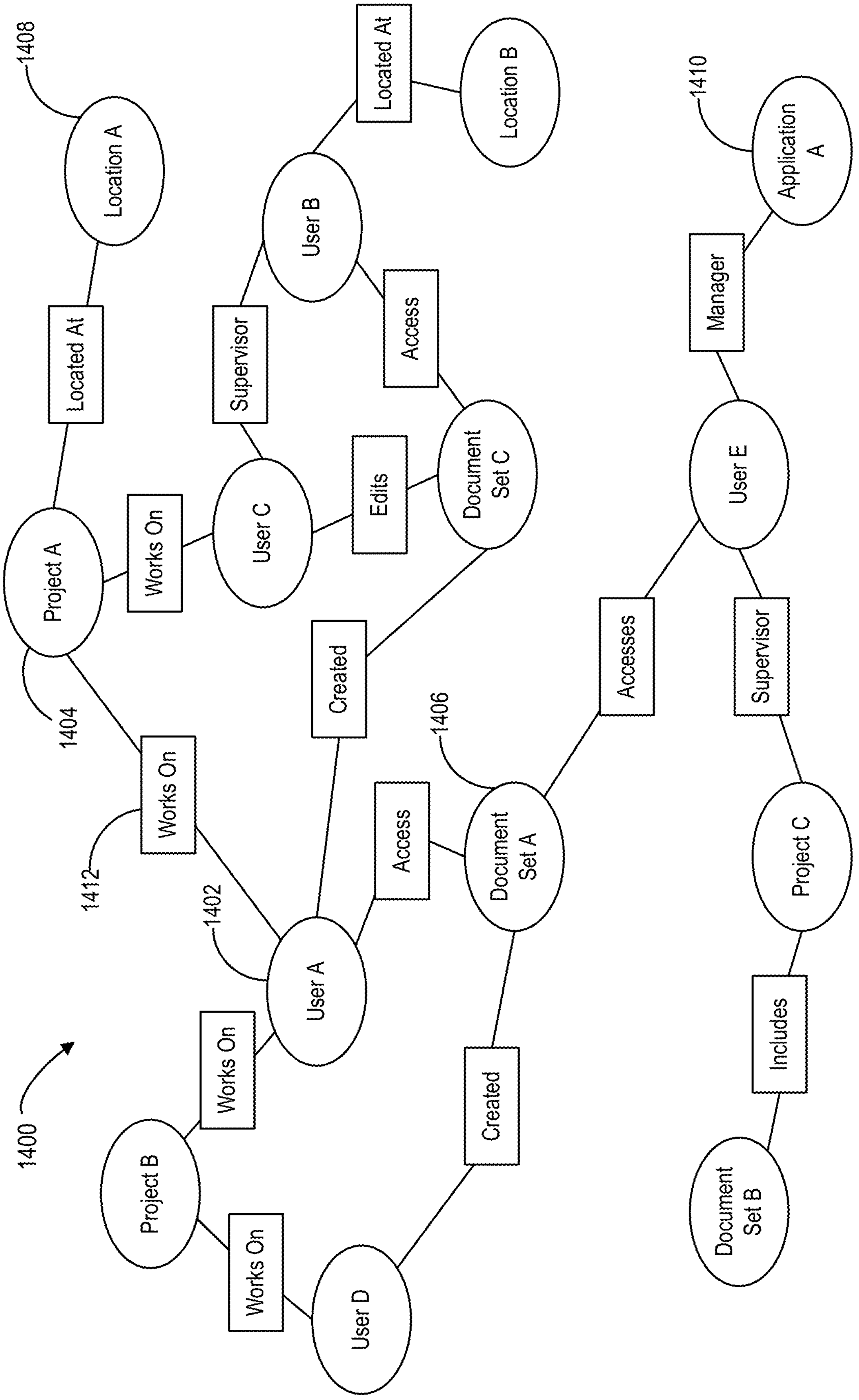
FIG. 14 illustrates an example collaboration graph of a digital content management system in accordance with one or more embodiments.

As mentioned above, the digital transcription system 704 can utilize a collaboration graph to locate, gather, analyze, filter, and/or weigh meeting context data of one or more users. FIG. 14 illustrates an example collaboration graph 1400 of a digital content management system in accordance with one or more embodiments. In one or more embodiments, the digital transcription system 704 generates, maintains, modifies, stores, and/or implements one or more collaboration graphs in one or more data stores. Notably, while the collaboration graph 1400 is shown as a two-dimensional visual map representation, the collaboration graph 1400 can include any number of dimensions.

For ease of explanation, the collaboration graph 1400 corresponds to a single entity (e.g., company or organization). However, in some embodiments, the collaboration graph 1400 connects multiple entities together. In alternative embodiments, the collaboration graph 1400 corresponds to a portion of an entity, such as users working on a projects.

As shown, the collaboration graph 1400 includes multiple nodes 1402-1410 including user nodes 1402 associated with users of an entity as well as concept nodes 1404-1410. Examples of concept nodes shown include project nodes 1404, document set nodes 1406, location nodes 1408, and application nodes 1410. While a limited number of concept nodes are shown, the collaboration graph 1400 can include any number of different concepts nodes.

In addition, the collaboration graph 1400 includes multiple edges 1412 connecting the nodes 1412-1416. The edges 1412 can provide a relational connection between two nodes. For example, the edge 1412 connects the user node of "User A" with the concept node of "Project A" with the relational connection of "works on." Accordingly, the edge 1412 indicates that User A works on Project A.

As mentioned above, the digital transcription system 704 can employ the collaboration graph 1400 in connection with a user's context data. For example, the digital transcription system 704 locates the user within the collaboration graph 1400 and identifies other nodes adjacent to the user as well as how the user is connected to those adjacent nodes (e.g., a user's personal graph). To illustrate, User A (i.e., the user node 1402) works on Project A and Project B, accesses Document Set A, and created Document Set C. Thus, when retrieving meeting context data for User A, the digital transcription system 704 can access content associated with one or more of these concept nodes (in addition to other digital documents, user features, and/or event details associated with the user).

In some embodiments, the digital transcription system 704 can access content associated with nodes within a threshold node distance of the user (e.g., number of hops). For example, the digital transcription system 704 accesses any node within three hops of the user node 1402 as part of the user's context data. In this example, the digital transcription system 704 accesses content associated with every node in the collaboration graph 1400 except for the node of "Document Set B."

In one or more embodiments, as the distance grows between the initial user node and a given node (e.g., for each hop away from the initial user node), the digital transcription system 704 reduces the relevance weights assigned to the content in the given node (e.g., weighting based on collaboration graph 1400 reach). To illustrate, the digital transcription system 704 assigns 700% weight to nodes within a distance of two hops of the user node 1402. Then, for each additional hop, the digital transcription system 704 reduces the assigned relevance weight by 20%.

In alternative embodiments, the digital transcription system 704 assigns full weight to all nodes in the collaboration graph 1400 when retrieving context data for a user. For example, the digital transcription system 704 employs the collaboration graph 1400 for the organization as a whole as a default graph when a user is not associated with enough meeting context data. In other embodiments, the digital transcription system 704 maintains a default graph that is a subset of the collaboration graph 1400, which the digital transcription system 704 utilizes when a user's personal graph is insufficient. Further, the digital transcription system 704 can maintain subject-based default graphs, such as a default engineering graph (including engineering users, projects, document sets, and applications) or a default sales graph.

In some embodiments, rather than selecting a user node as the initial node (e.g., to form a personal graph), the digital transcription system 704 selects another concept node, such as a project node (e.g., to form a project graph) or a document set node (e.g., to form a document set graph), or a meeting node. For example, the digital transcription system 704 first identifies a project node from event details of a meeting associated with the user. Then, the digital transcription system 704 utilizes the collaboration graph 1400 to identify digital documents and/or other context data associated with the meeting.

Figure 15:
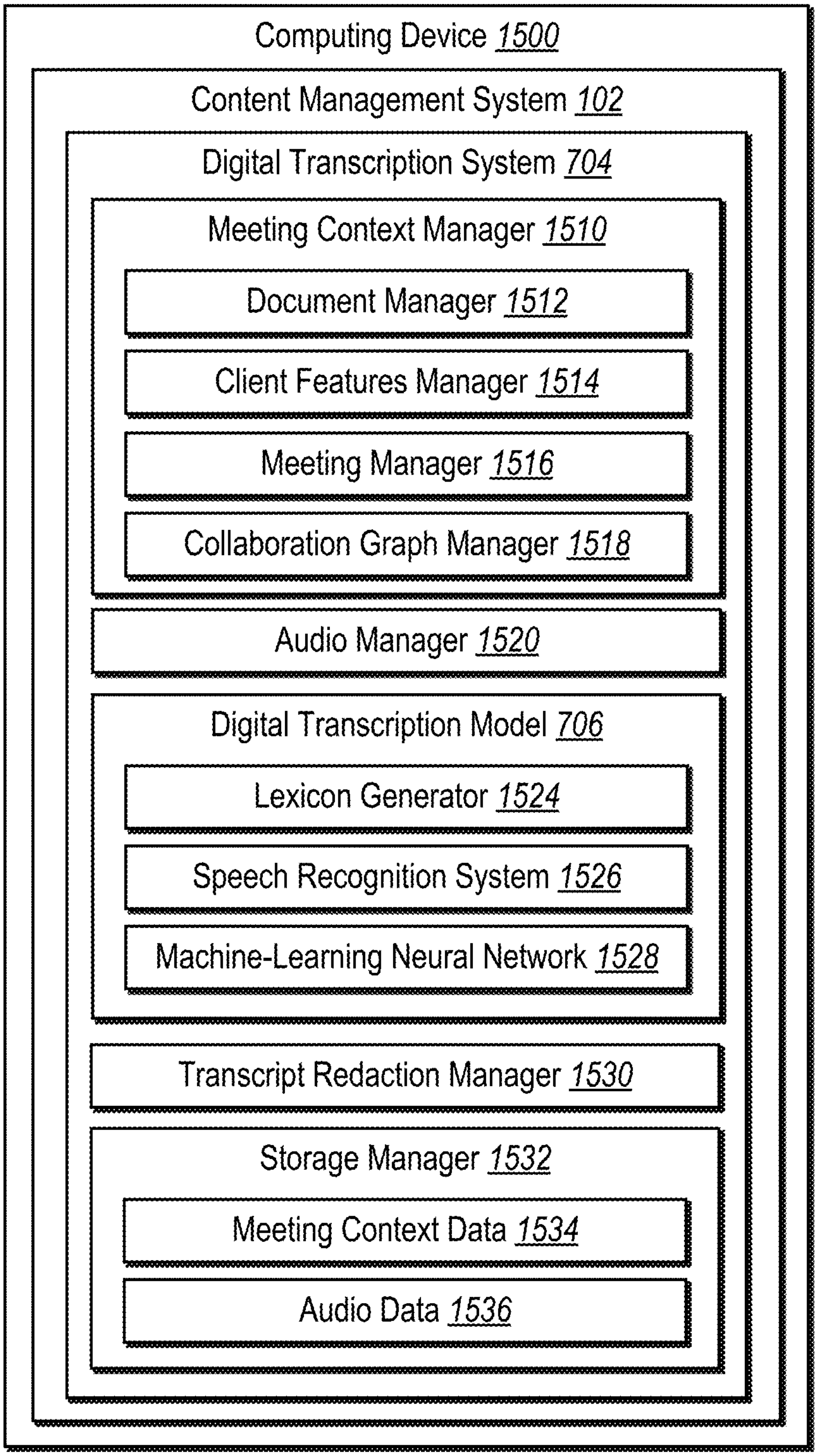
FIG. 15 illustrates a block diagram of the digital transcription system with a digital content management system in accordance with one or more embodiments.

Turning now to FIG. 15, additional detail is provided regarding components and capabilities of example architecture for the digital transcription system 704 that may be implemented on a computing device 1500. In one or more embodiments, the computing device 1500 is an example of the server device 701 or the first client device 708*a* described with respect to FIG. 7, or a combination thereof.

As shown, the computing device 1500 includes the content management system 702 having the digital transcription system 704. In one or more embodiments, the content management system 702 refers to a remote storage system for remotely storing digital content item on a storage space associated with a user account. As described above, the content management system 702 can maintain a hierarchy of digital documents in a cloud-based environment (e.g., local or remotely) and provide access to given digital documents for users. Additional detail regarding the content management system 702 is provided below with respect to FIG. 18.

The digital transcription system 704 includes a meeting context manager 1510, an audio manager 1520, the digital transcription model 706, a transcript redaction manager 1530, and a storage manager 1532, as illustrated. In general, the meeting context manager 1510 manages the retrieval of meeting context data. As also shown, the meeting context manager 1510 includes a document manager 1512, a user features manager 1514, a meeting manager 1516, and a collaboration graph manager 1518. The meeting context manager 1510 can store and retrieve meeting context data 1534 from a database maintained by the storage manager 1532.

In one or more embodiments, the document manager 1512 facilitates the retrieval of digital documents. For example, upon identifying a meeting participant, the document manager 1512 accesses one or more digital documents from the content management system 702 associated with the user. In various embodiments, the document manager 1512 also filters or weights digital documents in accordance with the above description.

The user features manager 1514 identifies one or more user features of a user. In some embodiments, the user features manager 1514 utilizes user features of a user to identify relevant digital documents associated with the user and/or a meeting, as described above. Examples of user features are provided above in connection with FIG. 10A.

The meeting manager 1516 accesses event details of a meeting corresponding to audio data. For instance, the meeting manager 1516 correlates audio data of a meeting to meeting participants and/or event details, as described above. In some embodiments, the meeting manager 1516 stores (e.g., locally or remotely) identifies event details from copies of meeting agendas or meeting event items.

In one or more embodiments, the collaboration graph manager 1518 maintains a collaboration graph that includes a relational mapping of users and concepts for an entity. For example, the collaboration graph manager 1518 creates, updates, modifies, and accesses the collaboration graph of an entity. For instance, the collaboration graph manager 1518 accesses all nodes within a threshold distance of an initial node (e.g., the node of the identified meeting participant). In some embodiments, the collaboration graph manager 1518 generates a personal graph from a subset of nodes of a collaboration graph that is based on a given user's node. Similarly, the collaboration graph manager 1518 can create project graphs or document set graphs that center around a given project or document set node in the collaboration graph. An example of a collaboration graph is provided in FIG. 14.

As shown, the digital transcription system 704 includes the audio manager 1520. In various embodiments, the audio manager 1520 captures, receives, maintains, edits, deletes, and/or distributes audio data 1536 of a meeting. For example, in one or more embodiments, the audio manager 1520 records a meeting from at least one microphone on the computing device 1500. In alternative embodiments, the audio manager 1520 receives audio data 1536 of a meeting from another computing device, such as a user's client device. In some embodiments, the audio manager 1520 stores the audio data 1536 in connection with the storage manager 1532. Further, in some embodiments, the audio manager 1520 pre-processes audio data as described above. Additionally, in one or more embodiments, the audio manager 1520 discards, archives, or reduces the size of an audio recording after a predetermined amount of time.

As also shown, the digital transcription system 704 includes the digital transcription model 706. As described above, the digital transcription system 704 utilizes the digital transcription model 706 to generate a digital transcript of a meeting based on the meeting context data 1534. As also described above in detail, the digital transcription model 706 can operate heuristically or one or more trained machine-learning neural networks. As illustrated, the digital transcription model 706 includes a lexicon generator 1524, a speech recognition system 1526, and a machine-learning neural network 1528.

In various embodiments, the lexicon generator 1524 generates a digital lexicon based on the meeting context data 1534 for one or more users that participated in a meeting. Embodiments of the lexicon generator 1524 are described above with respect to FIG. 10A. In addition, as described above, the speech recognition system 1526 generates the digital transcript from audio data and a digital lexicon. In some embodiments, the speech recognition system 1526 is integrated into the digital transcription system 704 on the computing device 1500. In other embodiments, the speech recognition system 1526 is located remote from the digital transcription system 704 and/or maintained by a third party.

As shown, the digital transcription model 706 includes a machine-learning neural network 1528. In one or more embodiments, the machine-learning neural network 1528 is a digital lexicon neural network that generates digital lexicons, such as described with respect to FIG. 10B. In some embodiments, the machine-learning neural network 1528 is a digital transcription neural network that generates digital transcripts, such as described with respect to FIG. 11B.

The digital transcription model 706 also includes the transcript redaction manager 1530. In various embodiments, the transcript redaction manager 1530 receives a request for a digital transcript of a meeting, determines whether the digital transcript should be redacted based on the requesting user's authorization rights, generates a redacted digital transcript, and provides a redacted copy of the digital transcript of the meeting in response to the request. In particular, the transcript redaction manager 1530 can operate in accordance with the description above with respect to FIG. 13.

The components 1510-1536 can include software, hardware, or both. For example, the components 1510-1536 include one or more instructions stored on a computer-readable storage medium and executable by processors of one or more computing devices, such as a client device or server device. When executed by the one or more processors, the computer-executable instructions of the computing device 1500 and/or digital transcription system 704 can cause the computing device(s) to perform the feature learning methods described herein. Alternatively, the components 1510-1536 can include hardware, such as a special-purpose processing device to perform a certain function or group of functions. Alternatively, the components 1510-1536 can include a combination of computer-executable instructions and hardware.

Furthermore, the components 1510-1536 are, for example, implemented as one or more operating systems, as one or more stand-alone applications, as one or more modules of an application, as one or more plug-ins, as one or more library functions or functions called by other applications, and/or as a cloud computing model. Thus, the components 1510-1536 can be implemented as a stand-alone application, such as a desktop or mobile application. Furthermore, the components 1510-1536 can be implemented as one or more web-based applications hosted on a remote server. The components 1510-1536 can also be implemented in a suite of mobile device applications or "apps."

Figure 16:
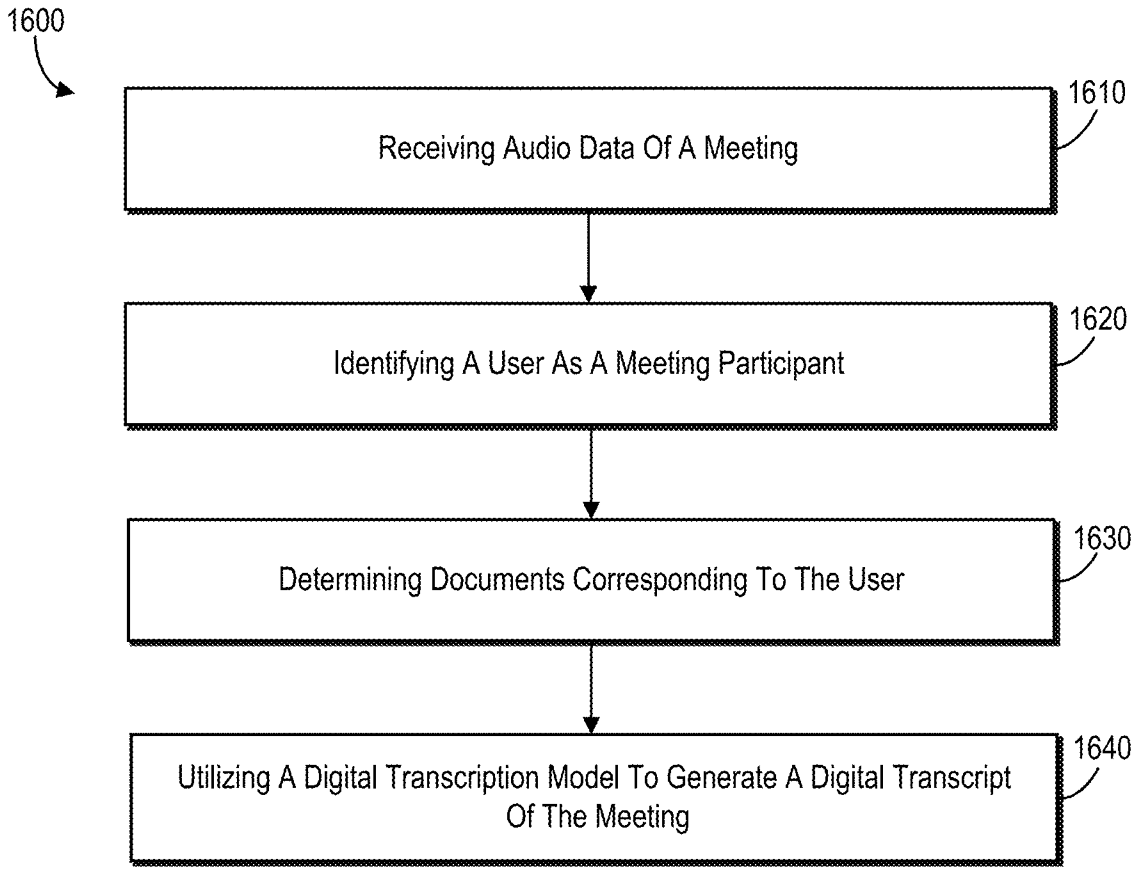
FIG. 16 illustrates a flowchart of a series of acts of utilizing a digital transcription model to generate a digital transcript of a meeting in accordance with one or more embodiments.

FIGS. 7-15, the corresponding text, and the examples provide several different systems, methods, techniques, components, and/or devices of the digital transcription system 704 in accordance with one or more embodiments. In addition to the above description, one or more embodiments can also be described in terms of flowcharts including acts for accomplishing a particular result. For example, FIG. 16 illustrates flowcharts of an example sequence of acts in accordance with one or more embodiments. In addition, FIG. 16 may be performed with more or fewer acts. Further, the acts may be performed in differing orders. Additionally, the acts described herein may be repeated or performed in parallel with one another or parallel with different instances of the same or similar acts.

While FIG. 16 illustrates series of acts 1600 according to particular embodiments, alternative embodiments may omit, add to, reorder, and/or modify any of the acts shown. The series of acts of FIG. 16 can be performed as part of a method. Alternatively, a non-transitory computer-readable medium can comprise instructions, when executed by one or more processors, cause a computing device (e.g., a client device and/or a server device) to perform the series of acts of FIG. 16. In still further embodiments, a system performs the acts of FIG. 16.

To illustrate, FIG. 16 shows a flowchart of a series of acts 1600 of utilizing a digital transcription model to generate a digital transcript of a meeting in accordance with one or more embodiments. As shown, the series of acts 1600 includes the act 1610 of receiving audio data of a meeting. In one or more embodiments, the act 1610 includes receiving, from a client device, audio data of a meeting attended by a user. In some embodiments, the act 1610 includes receiving audio data of a meeting having multiple participants.

As shown, the series of acts 1600 includes the act 1620 of identifying a user as a meeting participant. In one or more embodiments, the act 1620 includes identifying a digital event item (e.g., a meeting calendar event) associated with the meeting and parsing the digital event item to identify the user as the participant of the meeting. In some embodiments, the act 1620 includes identifying the user as the participant of the meeting from a digital document associated with the meeting. In additional embodiments, the digital document associated with the meeting includes a meeting agenda that indicates meeting participants, a meeting location, a meeting time, and a meeting subject.

The series of acts 1600 also includes an act 1630 of determining documents corresponding to the user. In particular, the act 1630 can involve determining one or more digital documents corresponding to the user in response to identifying the user as the participant of the meeting. In some embodiments, the act 1630 includes identifying one or more digital documents associated with a user prior to the meeting (e.g., not in response to identifying the user as the participant of the meeting). In various embodiments, the act 1630 includes identifying one or more digital documents corresponding to the meeting upon receiving the audio data of the meeting.

In one or more embodiments, the act 1630 includes parsing one or more digital documents to identify words and phrases utilized within the one or more digital documents, generating a distribution of the words and phrases utilized within the one or more digital documents, weighting the words and phrases utilized within the one or more digital documents based on a meeting subject, and generating a digital lexicon associated with the user based on the distribution and weighting of the words and phrases utilized within the one or more digital documents.

Additionally, the series of acts 1600 includes an act 1640 of utilizing a digital transcription model to generate a digital transcript of the meeting. In particular, in various embodiments, the act 1640 can involve utilizing a digital transcription model to generate a digital transcript of the meeting based on the audio data and the one or more digital documents corresponding to the user.

In some embodiments, the act 1640 includes accessing additional digital documents corresponding to one or more additional users that are participants of the meeting and utilizing the additional digital documents corresponding to one or more additional users that are participants of the meeting to generate the digital transcript. In various embodiments, the act 1640 includes determining user features corresponding to the user and generating the digital transcript of the meeting based on the user features corresponding to the user. In additional embodiments, the user features corresponding to the user include a job position held by the user.

In various embodiments, the act 1640 includes identifying one or more additional users as participants of the meeting; determining, from a collaboration graph, additional digital documents corresponding to the one or more additional users; and generating the digital transcript of the meeting further based on the additional digital documents corresponding to the one or more additional users. In some embodiments, the act 1640 includes identifying a portion of the audio data that includes a spoken word, detecting a plurality of potential words that correspond to the spoken word, weighting a prediction probability of each of the potential words utilizing a digital lexicon associated with the user, and selecting the potential word having the most favorable weighted prediction probability of representing the spoken word in the digital transcript.

In one or more embodiments, the act 1640 includes determining, from a collaboration graph, additional digital documents corresponding to the meeting; and generating the digital transcript of the meeting further based on the additional digital documents corresponding to the meeting. In some embodiments, the act 1640 includes analyzing the one or more digital documents to generate a digital lexicon associated with the user. In additional embodiments, the act 1640 includes accessing the digital lexicon associated with the user in response to identifying the user as a participant of the meeting and utilizing the digital transcription model to generate the digital transcript of the meeting based on the audio data and the digital lexicon associated with the user.

Similarly, in one or more embodiments, the act 1640 includes generating a digital lexicon associated with the meeting by analyzing the one or more digital documents corresponding to the user. In additional embodiments, the act 1640 includes generating the digital transcript of the meeting utilizing the audio data and the digital lexicon associated with the meeting. In various embodiments, the act 1640 includes accessing a digital lexicon associated with the meeting and generating the digital transcript of the meeting based on the audio data and the digital lexicon associated with the meeting.

In some embodiments, the act 1640 includes analyzing the one or more digital documents to generate an additional (e.g., second) digital lexicon associated with the user, determining that the first digital lexicon associated with the user corresponds to a first subject and that the second digital lexicon associated with the user corresponds to a second subject, and utilizing the first digital lexicon to generate the digital transcript of the meeting based on determining that the meeting corresponds to the first subject. In additional embodiments, the act 1640 includes utilizing the second digital lexicon to generate a second digital transcript of the meeting based on determining that the meeting subject changed to the second subject.

In various embodiments, the act 1640 includes utilizing the trained digital transcription neural network to generate the digital transcript of the meeting based on the audio data and the one or more digital documents corresponding to the meeting user. For example, the audio data is a first input and the one or more digital documents is a second input to the digital transcription neural network.

In some embodiments, training the digital transcription neural network includes generating synthetic audio data from a plurality of digital training documents corresponding to a meeting subject utilizing a text-to-speech model, providing the synthetic audio data to the digital transcription neural network, and training the digital transcription neural network utilizing the digital training documents as a ground-truth to the synthetic audio data.

In one or more embodiments, the series of acts 1600 includes additional acts, such as the act of providing the digital transcript of the meeting to a client device associated with a user. In some embodiments, the series of acts 1600 includes the acts of receiving, from a client device associated with the user, a request for a digital transcript; determining an access level of the user; and redacting portions of the digital transcript based on the determined access level of the user and audio cues detected in the audio data. In additional embodiments, providing the digital transcript of the meeting to the client device associated with the user includes providing the redacted digital transcript.

Embodiments of the present disclosure can include or utilize a special-purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives, Flash memory, phase-change memory, other types of memory, other optical disk storage, magnetic disk storage or other magnetic storage devices, or any other medium used to store desired program code means in the form of computer-executable instructions or data structures, and accessible by a general-purpose or special-purpose computer.

Computer-executable instructions include, for example, instructions and data which, when executed by a processor, cause a general-purpose computer, special-purpose computer, or special-purpose processing device to perform a certain function or group of functions. In some embodiments, a general-purpose computer executes computer-executable instructions to turn the general-purpose computer into a special-purpose computer implementing elements of the disclosure. The computer-executable instructions can be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and the claims, a "cloud computing environment" is an environment in which cloud computing is employed.

Figure 17:
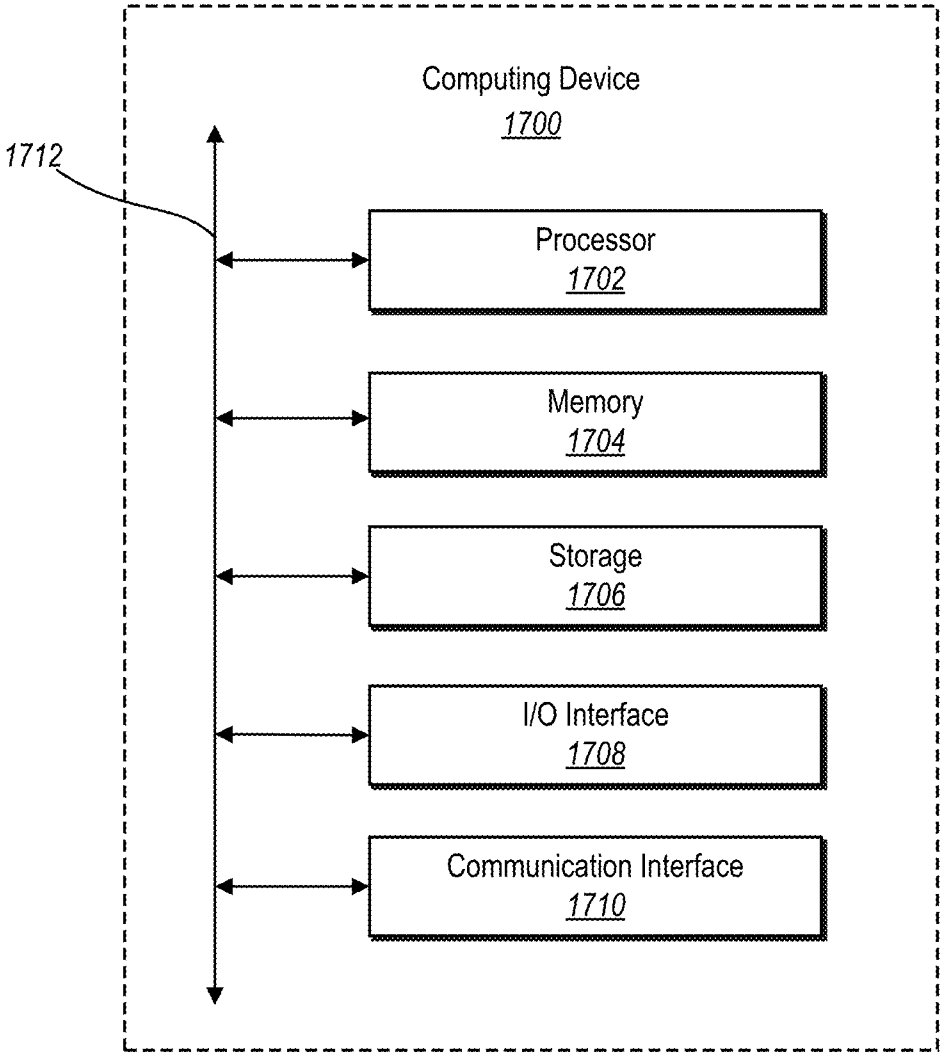
FIG. 17 illustrates a block diagram of an example computing device for implementing one or more embodiments of the present disclosure.

FIG. 17 illustrates a block diagram of an example computing device 1700 that can be configured to perform one or more of the processes described above. One will appreciate that client devices and/or computing devices described herein and/or the content management system 102 may comprise one or more computing devices such as the computing device 1700. In one or more embodiments, the computing device 1700 can be a non-mobile device (e.g., a desktop computer or another type of client device). In some embodiments, the computing device 1700 can be a mobile device (e.g., a mobile telephone, a smartphone, a PDA, a tablet, a laptop, a camera, a tracker, a watch, a wearable device, etc.). Further, the computing device 1700 can be a server device that includes cloud-based processing and storage capabilities.

As shown in FIG. 17, the computing device 1700 can include one or more processor(s) 1702, memory 1704, a storage device 1706, input/output ("I/O") interfaces 1708, and a communication interface 1710, which can be communicatively coupled by way of a communication infrastructure (e.g., bus 1712). While the computing device 1700 is shown in FIG. 17, the components illustrated in FIG. 17 are not intended to be limiting. Additional or alternative components can be used in other embodiments. Furthermore, in certain embodiments, the computing device 1700 includes fewer components than those shown in FIG. 17. Components of the computing device 1700 shown in FIG. 17 will now be described in additional detail.

In particular embodiments, the processor(s) 1702 includes hardware for executing instructions, such as those making up a computer program. As an example, and not by way of limitation, to execute instructions, the processor(s) 1702 can retrieve (or fetch) the instructions from an internal register, an internal cache, memory 1704, or a storage device 1706 and decode and execute them. In particular embodiments, processor 1702 may include one or more internal caches for data, instructions, or addresses. As an example and not by way of limitation, processor 1702 may include one or more instruction caches, one or more data caches, and one or more translation lookaside buffers (TLBs). Instructions in the instruction caches may be copies of instructions in memory 1704 or storage 1706.

The computing device 1700 includes memory 1704, which is coupled to the processor(s) 1702. The memory 1704 can be used for storing data, metadata, and programs for execution by the processor(s). The memory 1704 can include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1704 can be internal or distributed memory.

The computing device 1700 includes a storage device 1706 includes storage for storing data or instructions. As an example, and not by way of limitation, the storage device 1706 can include a non-transitory storage medium described above. The storage device 1706 can include a hard disk drive (HDD), flash memory, a Universal Serial Bus (USB) drive or a combination these or other storage devices.

As shown, the computing device 1700 includes one or more I/O interfaces 1708, which are provided to allow a user to provide input to (such as digital strokes), receive output from, and otherwise transfer data to and from the computing device 1700. These I/O interfaces 1708 can include a mouse, keypad or a keyboard, a touchscreen, camera, optical scanner, network interface, modem, other known I/O devices or a combination of the I/O interfaces 1708. The touchscreen can be activated with a stylus or a finger.

The I/O interfaces 1708 can include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interfaces 1708 are configured to provide graphical data to a display for presentation to a user. The graphical data can be representative of one or more graphical user interfaces and/or any other graphical content as can serve a particular implementation.

The computing device 1700 can further include a communication interface 1710. The communication interface 1710 can include hardware, software, or both. The communication interface 1710 provides one or more interfaces for communication (such as, for example, packet-based communication) between the computing device and one or more other computing devices or one or more networks. As an example, and not by way of limitation, communication interface 1710 can include a network interface controller (NIC) or network adapter for communicating with an Ethernet or other wire-based network or a wireless NIC (WNIC) or wireless adapter for communicating with a wireless network, such as a WI-FI. The computing device 1700 can further include a bus 1712. The bus 1712 can include hardware, software, or both that connects components of computing device 1700 to each other.

Figure 18:
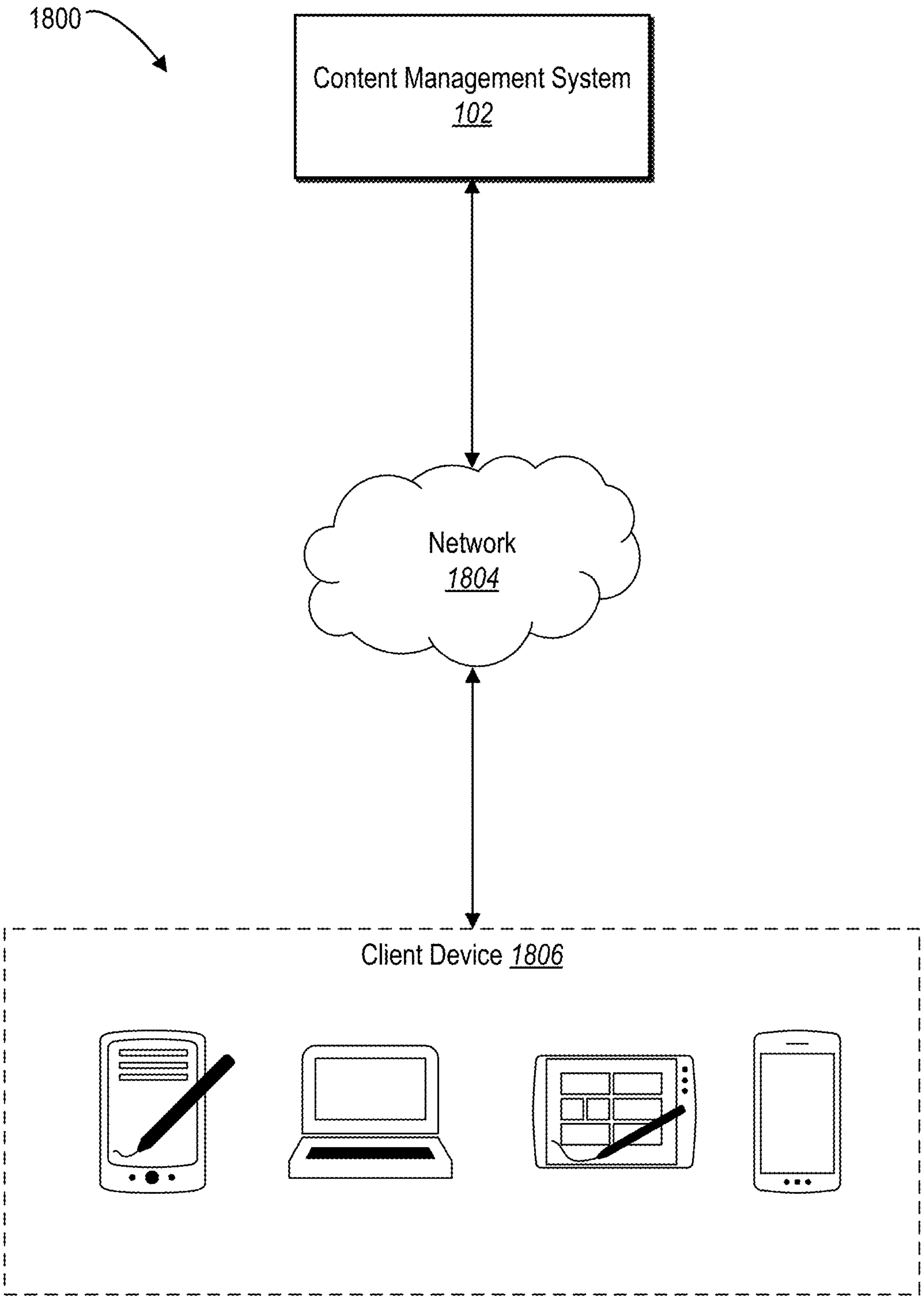
FIG. 18 illustrates a networking environment of the content management system operates in accordance with one or more embodiments.

FIG. 18 is a schematic diagram illustrating environment 1800 within which the content management system 102 and/or the digital transcription system 704 described above can be implemented. The content management system 102 may generate, store, manage, receive, and send digital content (such as digital videos). For example, the content management system 102 may send and receive digital content to and from the client devices 1806 by way of the network 1804. In particular, the content management system 102 can store and manage a collection of digital content. The content management system 102 can manage the sharing of digital content between computing devices associated with a plurality of users. For instance, the content management system 102 can facilitate a user sharing digital content with another user of the content management system 102.

In particular, the content management system 102 can manage synchronizing digital content across multiple client devices associated with one or more users. For example, a user may edit digital content using the client device 1806. The content management system 102 can cause the client device 1806 to send the edited digital content to the content management system 102. The content management system 102 then synchronizes the edited digital content on one or more additional computing devices.

In addition to synchronizing digital content across multiple devices, one or more embodiments of the content management system 102 can provide an efficient storage option for users that have large collections of digital content. For example, the content management system 102 can store a collection of digital content on the content management system 102, while the client device 1806 only stores reduced-sized versions of the digital content. A user can navigate and browse the reduced-sized versions of the digital content on the client device 1806. In particular, one way in which a user can experience digital content is to browse the reduced-sized versions of the digital content on the client device 1806.

Another way in which a user can experience digital content is to select a reduced-size version of digital content to request the full-or high-resolution version of digital content from the content management system 102. In particular, upon a user selecting a reduced-sized version of digital content, the client device 1806 sends a request to the content management system 102 requesting the digital content associated with the reduced-sized version of the digital content. The content management system 102 can respond to the request by sending the digital content to the client device 1806. The client device 1806, upon receiving the digital content, can then present the digital content to the user. In this way, a user can have access to large collections of digital content while minimizing the amount of resources used on the client device 1806.

The client device 1806 may be a desktop computer, a laptop computer, a tablet computer, a personal digital assistant (PDA), an in-or out-of-car navigation system, a handheld device, a smartphone or other cellular or mobile phone, or a mobile gaming device, other mobile device, or other suitable computing devices. The client device 1806 may execute one or more client applications, such as a web browser (e.g., MICROSOFT WINDOWS INTERNET EXPLORER, MOZILLA FIREFOX, APPLE SAFARI, GOOGLE CHROME, OPERA, etc.) or a native or special-purpose client application (e.g., FACEBOOK for iPhone or iPad, FACEBOOK for ANDROID, etc.), to access and view content over the network 1804.

The network 1804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the client devices 1806 may access the content management system 102.

In the foregoing specification, the present disclosure has been described with reference to specific example embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

receiving audio data captured by a recording device during a meeting;

identifying, from a collection of digital content maintained on a content management system, digital documents stored or accessed by a user account of a participant in the meeting;

identifying a subject associated with the meeting from one or more of a meeting agenda, a calendar invitation, an attachment to the calendar invitation, or a collaboration graph indicating relationships between users, projects, and documents of an organization associated with the meeting;

determining, by analyzing the subject associated with the meeting and subjects associated with the digital documents, meeting context data for the meeting, the meeting context data including at least a subset of the digital documents corresponding to the subject associated with the meeting; and generating, utilizing a digital transcription neural network to process the audio data and the meeting context data, a digital transcript of the meeting, the digital transcript including words identified within the meeting context data and the audio data.

2. The computer-implemented method of claim 1, wherein determining the meeting context data comprises selecting the subset of the digital documents by comparing the subject associated with the meeting and the subjects associated with the digital documents.

3. The computer-implemented method of claim 1, wherein determining the meeting context data comprises:

determining, by comparing content of the digital documents with event details of the meeting, relevance levels for respective documents of the digital documents, wherein the event details include the subject for the meeting; and selecting the subset of the digital documents by comparing the relevance levels to a threshold relevance level.

4. The computer-implemented method of claim 1, further comprising:

identifying an additional user account within an organization associated with the meeting, wherein the additional user account is not associated with any identified participant of the meeting;

in response to identifying the additional user account, identifying, from the collection of digital content, additional digital documents stored or accessed by the additional user account; and including at least a subset of the additional digital documents in the meeting context data for the meeting.

5. The computer-implemented method of claim 1, further comprising:

identifying meeting notes provided by one or more participants of the meeting; and including the meeting notes in the meeting context data for the meeting.

6. The computer-implemented method of claim 5, wherein the meeting notes include timestamp information indicating when one or more note entries were recorded relative to the audio data captured by the recording device during the meeting.

7. The computer-implemented method of claim 1, further comprising:

identifying one or more additional user accounts of one or more additional participants of the meeting;

identifying, from the collection of digital content, additional digital documents stored or accessed by the one or more additional user accounts; and including at least a subset of the additional digital documents in the meeting context data for the meeting.

8. The computer-implemented method of claim 7, further comprising:

receiving additional audio data captured during the meeting by one or more recording devices associated with the one or more additional participants of the meeting.

9. A system comprising:

at least one processor; and a non-transitory computer memory comprising instructions that, when executed by the at least one processor, cause the system to:

receive audio data captured by a recording device of a user account participating in a meeting;

identify, from a collection of digital content maintained on a content management system, digital documents stored or accessed by the user account participating in the meeting;

determine, by comparing content of the digital documents with event details of the meeting, relevance levels for respective documents of the digital documents;

select a subset of the digital documents based on the relevance levels; and generate, utilizing a digital transcription neural network to process the audio data and the subset of the digital documents, a digital transcript of the meeting, the digital transcript including words identified within the subset of the digital documents and the audio data.

10. The system of claim 9, wherein the collection of digital content belongs to and is maintained on the content management system for an organization associated with the meeting.

11. The system of claim 10, further comprising instructions that, when executed by the at least one processor, cause the system to identify the user account by:

identifying, based on event details of the meeting, a member of the organization as a participant in the meeting; and determining the user account belongs to the participant.

12. The system of claim 9, wherein identifying the digital documents is further based on comparing content from the collection of digital content with a subject associated with the meeting.

13. The system of claim 12, further comprising instructions that, when executed by the at least one processor, cause the system to identify the subject for the meeting from one or more of a meeting agenda, a calendar invitation, an attachment to the calendar invitation, or a collaboration graph indicating relationships between users, projects, and documents of an organization associated with the meeting.

14. The system of claim 9, further comprising instructions that, when executed by the at least one processor, cause the system to:

identify meeting notes provided by one or more participants of the meeting; and include the meeting notes in the digital documents for the meeting.

15. The system of claim 9, further comprising instructions that, when executed by the at least one processor, cause the system to:

identify one or more additional user accounts of one or more additional participants of the meeting;

identify, from the collection of digital content, additional digital documents stored or accessed by the one or more additional user accounts; and include the additional digital documents in the digital documents for the meeting.

16. A non-transitory computer-readable storage medium comprising instructions that, when executed by at least one processor, cause a computer system to:

receive audio data captured by a recording device of a participant in a meeting for an organization;

identify, based on event details of the meeting, a member of the organization as the participant in the meeting;

identify a user account of the participant;

identify, from a collection of digital content maintained on a content management system for the organization, digital documents stored or accessed by the user account of the participant in the meeting; and generate, utilizing a digital transcription neural network to process the audio data and the digital documents, a digital transcript of the meeting, the digital transcript including words identified within the digital documents and the audio data.

17. The non-transitory computer-readable storage medium of claim 16, further comprising instructions that, when executed by the at least one processor, cause the computer system to filter the digital documents for processing by the digital transcription neural network by:

comparing content of the digital documents with event details of the meeting to determine relevance levels for respective documents of the digital documents; and selecting at least a subset of the digital documents by comparing the relevance levels to a threshold relevance level.

18. The non-transitory computer-readable storage medium of claim 16, further comprising instructions that, when executed by the at least one processor, cause the computer system to process the audio data and the digital documents by:

utilizing input layers of the digital transcription neural network to encode learned feature vectors from the audio data and the digital documents;

utilizing hidden layers of the digital transcription neural network to modify the learned feature vectors according to learned parameters of the hidden layers; and providing the learned feature vectors to output layers of the digital transcription neural network to convert words spoken in the meeting from the audio data to text by translating the learned feature vectors according to learned parameters of the output layers.

19. The non-transitory computer-readable storage medium of claim 16, further comprising instructions that, when executed by the at least one processor, cause the computer system to train the digital transcription neural network by:

generating synthetic audio data from a plurality of digital training documents corresponding to a meeting subject utilizing a text-to-speech model;

providing the synthetic audio data to the digital transcription neural network to learn encoded features of the synthetic audio data; and training the digital transcription neural network utilizing the plurality of digital training documents as a ground-truth to the synthetic audio data.

20. The non-transitory computer-readable storage medium of claim 16, wherein the digital transcription neural network comprises a digital lexicon neural network configured to generate a weighted frequency distribution of words or word patterns within the digital documents based on respective relevance levels between the words or word patterns and a subject associated with the meeting.

* * * * *